United States Patent [19]
Irwin

[11] Patent Number: 5,862,136
[45] Date of Patent: Jan. 19, 1999

[54] TELECOMMUNICATIONS APPARATUS AND METHOD

[75] Inventor: George Frank Irwin, Kanata, Canada

[73] Assignee: Northern Telecom Limited, Montreal, Canada

[21] Appl. No.: 655,402

[22] Filed: May 30, 1996

[51] Int. Cl.[6] .............................. H04L 12/28; H04L 12/56
[52] U.S. Cl. ......................... 370/395; 370/375; 370/376
[58] Field of Search .................................. 370/375, 376, 370/389, 395, 398, 351–357, 412, 378, 379, 428

[56] References Cited

U.S. PATENT DOCUMENTS

| | | |
|---|---|---|
| 4,603,416 | 7/1986 | Servel et al. . |
| 4,621,357 | 11/1986 | Naiman et al. ......................... 370/376 |
| 5,144,619 | 9/1992 | Munter . |
| 5,168,492 | 12/1992 | Beshai et al. . |
| 5,331,632 | 7/1994 | Aaron et al. ........................... 370/376 |
| 5,339,318 | 8/1994 | Tanaka et al. . |
| 5,506,843 | 4/1996 | Tanaka .................................. 370/376 |
| 5,555,245 | 9/1996 | Alatalo et al. ......................... 370/375 |

FOREIGN PATENT DOCUMENTS

| | | |
|---|---|---|
| 0320772A2 | 6/1989 | European Pat. Off. . |
| 0537743A1 | 4/1993 | European Pat. Off. . |
| WO 94/11975 | 5/1994 | WIPO . |

OTHER PUBLICATIONS

"Asynchronous Time–Division Techniques: An Experimental Packet Network Integrating Videocommunication" by A. Thomas et al., 1984 International Switching Symposium.

"Prelude: An Asynchronous Time–Division Switched Network" by Jean–Pierre Coudreuse and Michel Serval, 1987 IEEE.

*Primary Examiner*—Ajit Patel
*Attorney, Agent, or Firm*—J. Edward Moorhouse; Jean-Pierre Fortin

[57] ABSTRACT

A telecommunications apparatus for transporting ATM cells having either of isochronous units of payload data and asynchronous units of payload data, between receiving and transmitting ports includes a buffer for asynchronously queuing units of payload data received from the receiving ports and for subsequently transmitting the queued units of payload data in a time division multiplex data stream toward the transmitting ports. A timeslot interchanger is used to reorder a time defined sequence of isochronous units of payload data from the first data stream into a second time defined sequence of isochronous units of payload data in a second TDM data stream. An outgoing TDM data stream is assembled by transferring the first data stream into the outgoing data stream while substituting each payload occurrence of isochronous units from the second TDM data stream, into corresponding TDM locations in the outgoing data stream. The outgoing data stream is transmitted toward the transmitting ports whereby telephone calls are connected via the isochronous units of payload data. Delay typically inherent in telephone conversations connected via prior ATM facilities and the consequent severe echo often experience by users is substantially reduced.

23 Claims, 30 Drawing Sheets

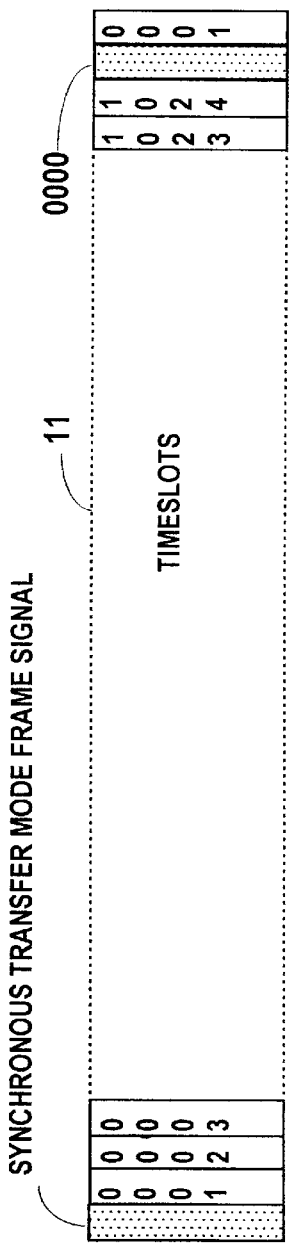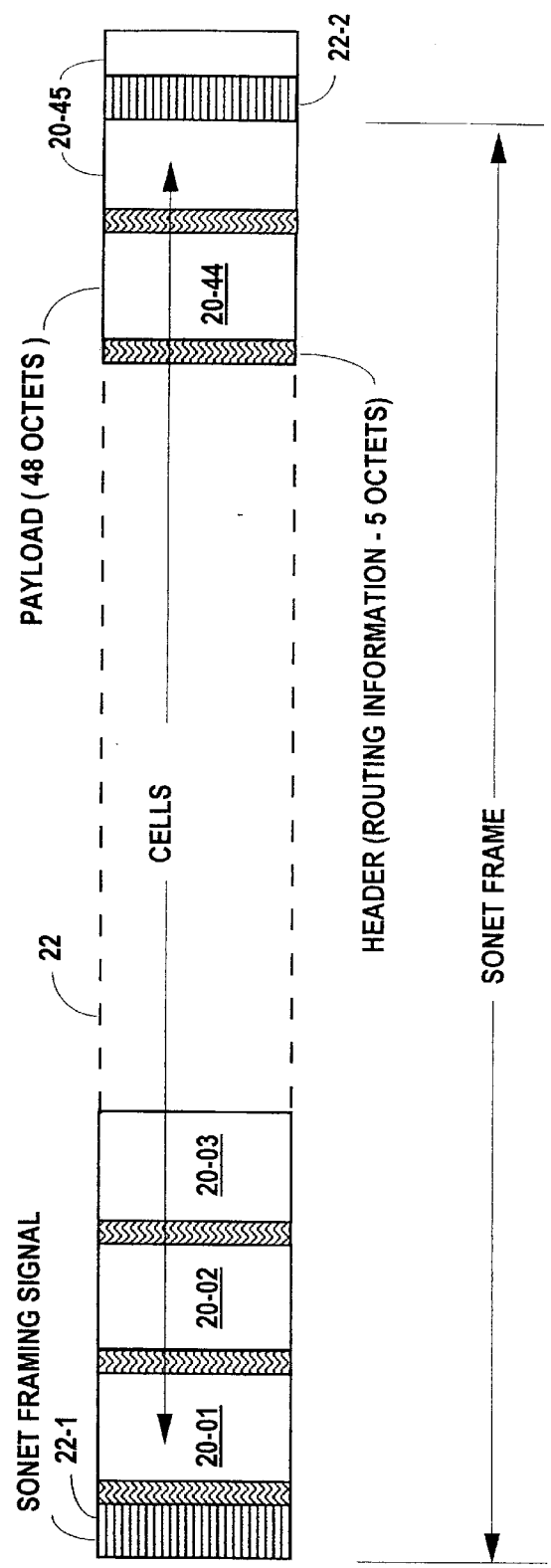

TELECOMMUNICATIONS APPARATUS AND METHOD

INTRODUCTION

The invention is in the field of telecommunications and relates to apparatus and methods for conveying information from a variety of sources toward a variety of destinations, via a common network. Examples of sources and destinations of such information may include, but are not limited to, any of voice, data, and image terminal apparatus. More particularly the invention relates to a switching facility operable in a standard asynchronous transfer mode (ATM), as well as a providing a synchronous time switching function.

BACKGROUND

The field of telecommunications has long been operated on the basis of circuit switching principles to provide voice communications. The typical telecommunications digital network for voice communications, provides a continuous bit rate service that is concatenated as n×64 Kb/s channels. Telephone station sets as well as other terminal apparatus are connected at network ports or end points via telephone lines. The network ports usually include codec equipped line interface circuits for converting analog signals, received from the telephone line, to digital signals for transmission through the telecommunications digital network and for converting digital signals, received from the telecommunications digital network, to analog signals, for reception via the telephone line. Voice signals, are usually digitally encoded into pulse code modulated (PCM) signals, in accordance with a standard, either A law or $\mu$ law. Any communication with any one of the ports is conducted by means of digital signals within assigned timeslots interleaved in transmit and receive frames in a periodic frame format. These may be referred to as a pair of transmit and receive time division multiplexed (TDM) channels. The transmit and receive channel pair are usually simply referred to as a channel. The channels are time division multiplexed with other channels in the periodically occurring frames, which themselves may be time division multiplexed with other periodically occurring frames, for the transport of information signals, such as PCM signals, between synchronous signal sources and destinations. In this example the telecommunications digital network is based on a synchronous time multiplex (STM) hierarchy which establishes a common operating frequency and phase structure between the end points or ports. This is commonly referred to as circuit switching. Information is exchanged between telephone call specified end points by the use of the TDM channels inherent to one or more circuit switches within the STM network. These circuit switches typically include both space and time switching elements in any of various combinations. More than one channel may be assigned to a communication circuit but this is only required for a special service which requires some multiple of the 64 Kb/s bandwidth. The primary characteristic of circuit switching is that once one or more channels are assigned to a given communication circuit, to provide a service, the channel assignment is reserved for the exclusive use of that service continuously throughout the duration of the service provision. In circuit switching a typical voice telephone call is allocated one path or channel for the duration of the call, however synchronous signal sources are not limited to voice band signals and may include a wide range of synchronous sources, for example from voice through to video. Two examples of TDM switches, commercially supplied by the assignee for use in telephone exchanges, are known by the trademarks DMS 10 and DMS 100.

Some time ago, packet switching was introduced for improving the efficient transport of data signals. In contrast to the steady repetitive nature of PCM signals, data signals for the most part are of a bursty or asynchronous nature. Thus to accommodate the efficient transmission of data signals they are arranged into packets of any convenient length along with a header which specifies a destination. After a packet has been assembled, a high speed transmission path is allocated, only for a time sufficient to transport the packet of data toward its destination. During the transmission, the packet is in sole possession of the transmission path. After the packet is transported the transmission path is available for the transport of another packet, possibly from a different source. The event of the transmission of a at least one packet of data from a point of origin to a point of destination is termed a data call, however the number of data packets transmitted in a data call is generally unlimited. During any one data call, call management is rationalized by assigning a virtual channel to the call. The virtual channel is always maintained for the length of the data call, although the actual allocation of the transmission path occurs only after a packet of data is ready for transmission and only for the time actually used for its transmission. The virtual channel has various benefits associated with call management and billing, and provides a vehicle for defining the bandwidth and grade of service assigned to the call. Some or many packets may eventually be transported as determined by the occurrences of data at the source, however as if to mimic synchronous switching, any one data call is associated with its virtual channel throughout the duration of the data call. The time during which the transmission path is actually occupied is a function of size of a packet divided by the bandwidth of the transmission path. Although digitized voice can be transported in this manner, the wide variances of delay caused by the operating characteristics of a practical packet network has demonstrated that packet switching is not a practical alternative to circuit switching for providing voice telephone services. Intolerable, interrupted, delayed and out of sequenced reception of voice signal transmissions are common occurrences from time to time in a typical packet system, particularly during higher traffic periods. An example of a packet switch, commercially supplied by the assignee for use in data exchanges, is known by the trademark SL 10.

The evolution of packet systems toward functionality as broad band carriers of information of synchronous origin is exemplified in a paper by A Thomas et al, titled Asynchronous Time-Division Techniques: An Experimental Packet Network Integrating Video communication, which was published at the 1984 International Switching Symposium, May 7–11 in Florence Italy. Another example was published in a 1987 IEEE paper by Jean-Pierre Coudreuse and Michel Serval, titled Prelude: An Asynchronous Time-division Switched Network.

More recently, a broadband communications standard for supporting a variety of both synchronous and asynchronous communication requirements has been widely adapted, and is now referred to as the asynchronous transfer mode (ATM) of telecommunications. The recommended standards are defined by the ATM Forum and are available from several publishers including Prentice Hall of Englwood Cliffs, N.J. 07632, under the title ATM User-Network Interface Specification Version 3.0 (ISBN 0-13-225863-3). Currently networks operable in the ATM standard are becoming available for the transport of asynchronous (bursty) signals, as well as synchronous (periodic) signals. One commercially available product is sold by the assignee with the trademark Magellan. Networks operable in the ATM standard are usually termed ATM systems or ATM networks.

The operation of ATM systems resembles some aspects of packet switching but conforms to a more rigid specification for transmission and switching. An ATM system performs transfers of information in fixed sized units, referred to in ATM jargon as cells. Each cell is like a container or a packet of a predetermined fixed size, which includes a group of 48 octets or bytes available for transporting information of user origin toward a destination. This information is often referred to as being bearer information and an octet or byte of bearer information is often referred to as a bearer octet. As the group of 48 octets are available for bearer information they are often referred to as an information field or payload portion of the cell. Each payload portion is preceded by a header field of 5 octets, which includes information pertaining to transmission and switching management of the cell. The 5 octet header field is often referred to as overhead. Regardless of whether the information signal source is bursty or periodic the standard cell format is used to transfer the bearer information in ATM.

Transmission and switching of cells within ATM networks is independent of the application bit rate, and hence ATM supports applications with a diversity of source rates, including isochronous and asynchronous sources.

The ATM protocol architecture specifies a cell transfer technique that is common to all services, and an adaptation process by which user generated information is written into and read from the fixed cell format. This is often referred to as being mapped to and from the fixed cell format. Adaptation processes are service specific, as packetization of higher layer information, passed to and from the ATM cell layer, may represent either continuous bit rate (isochronous) information or variable bit rate (bursty) information. These require different techniques to reconstruct the information for exchange between end points or ports. Connections are established either with fixed bandwidth, or with variable bandwidth that is assigned or statistically shared amongst a number of connections. For a isochronous connection, the information is transported as a short, asynchronous burst (cell) with an effective 8 KHz repetition rate that has the transport bandwidth reserved for the duration of the connection. Any bandwidth, remaining on the loop may be statistically shared by data or messaging connections.

An ATM switching facility must at least provide for:

header address translation to determine a route through a switching element;

cell transport between an input port and one or more output ports; and output scheduling for both isochronous and asynchronous connections, wherein an isochronous connection is given priority to minimize transport delays.

In an ATM switching facility, an incoming cell's header is examined by the switching element in order that it is able to direct the cell to the destined output port or output ports. Since the arrival rate of cells is not deterministic (as in the STM), there are occurrences of two or more cells arriving coincidentally and destined for the same output port. Such occurrence would result in an internal collision and cell losses unless cell buffers are used within the switching element. The cell buffers queue the cells from a multiplicity of sources for subsequent orderly transport to their destination ports. Any given cell will appear to transit the switching element with a varying delay determined by the number of arrivals that preceded the given cell's arrival. The delay through the switch is statistical rather than deterministic. Consequently, in order to minimize delay in telephone conversations, the isochronous voice traffic is typically put into a different queue from the asynchronous data traffic, that is voice queue with a higher transport priority than a data queue.

By contrast, in STM the incoming information always arrives at exactly the same point in time relative to a periodic frame that carries multiple channels. Hence, a synchronous timeslot interchanger uses a deterministic means to transfer data from a fixed incoming time location to another fixed outgoing time location, by assigning a fixed delay to an incoming channel such that the information will be synchronously transferred at the correct time, into an outgoing channel.

In general, most telecommunications switches include a central switching facility that is used to interconnect peripheral equipment. The peripheral equipment provides physical access via telephone lines to telephone sets and any other forms of terminal equipment. The term telephone line is intended herein to be taken as any means by which a terminal equipment is connected to a communications network and includes but is not limited to, radio links, fibre optic lines, coaxial cables, twisted copper pairs and pole mounted open conductors. Interconnect loops provide either non-blocking or blocking access between the peripheral equipment and the central switching facility. Traditionally, the interconnect loop is a digital synchronous TDM loop connected between the switching facility and the peripheral equipment wherein a channel conveys bearer information exchanged during a call or session. These digital TDM loops typically provide frames of 24 or 32 channels, or multiples thereof, within a 125 microsecond frame period. The aggregation of the total number of channels available on all loops represents the switching capacity of the switching facility. The contents of any incoming channel may be switched to any outgoing channel with a granularity of a single octet. The single bearer octet has no routing information associated with it. In STM, the octet's position within the TDM frame inherently identifies its source and its destination. This is sometimes referred to as DS0 switching. In DS0 switching, a byte or octet is switched from its timeslot in an incoming frame to a predetermined timeslot in an outgoing frame.

If the STM interconnect loop is replaced with an ATM interconnect loop the user generated information no longer has a predetermined fixed timing reference. Furthermore, the granularity of switching of bearer information is broader and includes all 48 bytes of cell. The user generated information requires an address to be transported with it in order for the ATM switch to establish the intended connection. One or more digital voice channels may be contained within the information field of an ATM cell. An ATM switching facility used for switching digital voice channels must re-establish a 125 microsecond periodic frame structure in order to exchange octet connections between the ATM switching facility and STM peripheral equipment.

One method for transmitting a telephone conversation in the ATM is to map encoded voice sample octet occurrences as they occur at the standard 125 microsecond rate into the payload portion of a cell until the cell is full. The cell is then transferred to its header defined destination where the octets are retrieved at the 125 microsecond rate. The functions of mapping to and from the cell each cause a one way transport delay of $(48 \times 125\ \mu s) = 6$ milliseconds. This is in contrast to delays of less than 2 milliseconds at most in an STM system, however this is of little consequence in typical two party conversations, providing that telephone set hybrid circuits function optimally. This much longer delay, introduced by the ATM switch, makes echo of a given energy much more noticeable than it would be using an STM switch. In the case of three or more party conference calls, and particularly if one or more of the hybrid circuit operations is less than ideal, the delay results in an obnoxious echo. Present echo canceller technology does not seem to offer a practical solution for a satisfactory eradicating the echo in multiparty conference calls.

A simple solution to the problem of undue delay is to commit a whole cell to the transport of only one bearer octet of not more than a few samples. This means that the first octet or only a few of the octets at the beginning of the payload portion of each cell are used. As the cell is not held until all 48 octets are mapped before transport, cells are transported more frequently and the delay is reduced to an extent that the echo is more tolerable. This is an effective but inefficient solution which wastes large amounts of bandwidth, in the form of partially filled cells. Furthermore such an ATM system when primarily used for voice telephony is not a practical alternative to an STM system.

A less attractive solution involves the loading of one or two whole STM frame occurrences into a cell for transport, every 125 μs or 250 μs, thereby avoiding undue delay. However this requires that the source peripheral equipment and the destination peripheral equipment be interfaced with the ATM facility via respective STM facilities, which themselves perform switching functions similar to central office functions. This is an expensive alternative which in a high traffic voice environment is tantamount to relegating the ATM facility to tandem switching.

Neither of these solutions provides an efficient interface between the ATM and the STM and hence the ATM has tended to be limited in its applications to data and high bandwidth services, where if there is any voice traffic, it is insignificant.

In a typical TDM telephone switching facility, the core of the switching system consists of a call controller connected intimately with time and space switching elements of a switching matrix. Lines and trunks are coupled in groups to the switching matrix, while signalling and supervision concerned with the setting up and tearing down of telephone calls is collected and distributed via group controllers. More particularly each of the group controllers is subservient to the call controller and waits at the call controller's discretion, as it were, to communicate therewith. The primary function of the call controller is that of directing the functions of the space and time switching elements of the STM switching matrix and diagnosing any malfunctions therein. Consequently, the physical structure and operating instructions which characterize the call controller, are optimized in relation to the specific structure of the switching matrix. The advances in the technology of computers and processors are usually time consuming and even prohibitively difficult to adapt into the call controllers of existing switching systems. Any changes in the call controller can have far reaching and often unpredicted deleterious effects because of the intimate relationship between the call controller and the STM switching matrix.

SUMMARY OF THE INVENTION

It is an object of the invention to provide a method of operating in the ATM while accommodating significant voice traffic both efficiently and without undue transport delay.

Accordingly the invention is implemented by apparatus and method for performing timeslot switching within a cell based transport and switching structure.

Accordingly a telecommunications apparatus for transporting packets having either of isochronous units of payload data and asynchronous units of payload data, between receiving and transmitting ports, includes a buffer means for asynchronously queuing units of payload data received from the receiving ports and for subsequently transmitting the queued units of payload data in a data stream toward the transmitting ports. The telecommunications apparatus is characterized in that the data stream is transmitted in a time division multiplex (TDM) format.

It is also an objective of the invention to advantageously use the ATM standard interface to remove the traditional intimacy of a call controller and a STM switching matrix. In one example the call control function for a switching facility is provided by a remote call controller coupled to the switching system via one of its plurality of ATM ports. In another example a call controller so coupled is shared commonly among a plurality of similar switching systems to effectively provide several switching facilities. In yet another example, the call controller is in communication via an ATM switch node for directing the call switching functions of one or more of the switching systems to effectively provide one or more respective switching facilities.

A telecommunications facility in accordance with the invention includes; input ports and output ports, an asynchronous buffer for storing cell payload words from the input ports in queues related to the output ports, a timeslot switch for switching payload data words from timeslots of origin to timeslots of destination, an interface apparatus for transporting payload data words of isochronous origins from the queues to the timeslot switch, for transporting switched payload data words from the timeslot switch to the output ports, and for transporting payload data words of asynchronous origins directly from the queues toward the output ports.

In an example, a telecommunications facility includes; input ports and output ports, a packet switch for transporting ingressing packet payload data from an input port of origin for presentation as egressing packet payload data at an output port of destination, a timeslot switch for switching payload data words from timeslots of origin to timeslots of destination, a transport controller being responsive to ingressing packet headers for directing operations of the packet switch and for providing an egressing packet header for each packet presented at one of the output ports, and a synchronous switching controller for directing operation of the timeslot switch, in response to information pertinent to payload data of synchronous origin and destination within any of the ingressing packet headers.

More particularly the telecommunications facility comprises
  a multiplexer for receiving data packets at any of a plurality of input ports and multiplexing data packets into a common incoming data stream; a controller being responsive to information contained in headers of data packets in the common incoming data stream, for generating queue control information, for generating outgoing headers for data packets destined for any of a plurality of outport ports, and for abstracting timeslot switching information; a queuing buffer for receiving the common incoming data stream and being responsive to the queue control information for queuing the payload bytes of each data packet and for subsequently selecting and transferring queued payload bytes of each data packet into an outgoing data stream; a timeslot switch including means being responsive to the timeslot switching information for abstracting a payload of synchronous data bytes from the outgoing data stream, for reordering a sequence of the abstracted data bytes, and for reinserting the synchronous data bytes into the outgoing data stream; and a distributor for directing the outgoing headers along with the respective packet payloads to those of the plurality of output ports to which the payloads are destined.

In one example the telecommunications facility comprises a multiplexer for receiving data packets at any of a plurality of input ports and multiplexing data packets into a common incoming data stream; a controller being responsive to information contained in headers of data packets in the common incoming data stream, for generating queue control information, for generating outgoing headers for data packets destined for any of a plurality of outport ports, and for abstracting timeslot switching information; a queuing buffer for receiving the common incoming data stream and being responsive to the queue control information for queuing the payload bytes of each data packet and for subsequently selecting and transferring queued payload bytes of each data packet into an outgoing data stream; a timeslot switch including means being responsive to the timeslot switching information for abstracting a plurality of payloads of synchronous data bytes from the outgoing data stream, for reordering a sequence of the abstracted data bytes, and for inserting the synchronous data bytes as a delayed plurality of payloads into the outgoing data stream; and a distributor for directing the outgoing headers along with the respective packet payloads to those of the plurality of output ports to which the payloads are destined.

A method of switching ATM cells with payloads of either isochronous origins and asynchronous origins between input ports and output ports in accordance with the invention, includes; storing cell payload words from the input ports within asynchronous buffer queues related to the output ports, transporting payload data words of isochronous origins from the queues for timeslot switching, timeslot switching payload data words from payload timeslots of origin to payload timeslots of destination, transporting the switched payload data words toward the output ports, and transporting payload data words of asynchronous origins directly from the queues toward the output ports.

A method for switching telecommunications information contained in fixed length data packets each consisting of a header and a payload from any of a plurality of input ports to any of a plurality of output ports, comprises the steps of;

multiplexing the data packets received at the input ports into a common incoming data stream;

in response to information contained in headers of data packets in the common incoming data stream, generating queue information, and an outgoing headers stream, and in response to a synchronous data indication within the information contained in the headers in the common incoming data stream, generating timeslot switching information;

receiving and buffering the common incoming data stream, and in response to the queue information, selecting data packet payloads from the buffered data stream and transferring the data packet payloads in the order of selection into an outgoing data stream;

in response to the timeslot switching information, reordering the bytes of a payload of synchronous data in the outgoing data stream, whereby timeslot switching is effected within the payload; and assembling fixed length outgoing data packets from the outgoing headers stream and the outgoing data stream, and directing the outgoing data packets to those of the plurality of output data ports to which the packets are destined.

In one example of the method, the bytes of a plurality of payloads of synchronous data, having been received within a fixed period of time, are reordered in the outgoing data stream, whereby timeslot switching is effected throughout the plurality of the payloads.

The invention is also a method for interfacing a timeslot switching means with an incoming cell payload transport means for transporting cell payloads from a port of origin and an outgoing cell payload transport means for transporting cell payloads to a port of destination, wherein the cell payload is arranged in plural bit data groups each group being one of idle and busy. In an event that any of the plural bit data groups is from a terminal of isochronous operation, the method comprising the step of passing payload data in plural bit groups from the incoming cell payload transport means directly to the outgoing cell payload transport means; and in an event that any one of the plural bit data groups of a cell is from a terminal of isochronous operation with any remaining plural bit data group being idle the method comprising the steps of passing payload data in plural bit groups from the incoming cell payload transport means to the timeslot switching means, and in an event of a cell of similar origin and destination having been previously received, simultaneously passing other data of the previously received cell in reordered plural bit groups from the timeslot switching means to the outgoing cell payload transport means.

A variation in the performance of the method occurs in an event that the cell payload has not been preceded from the port of origin within a fixed time by a cell payload of a similar origin and destination. In this event said other data is not passed to the outgoing cell payload transport means.

Another variation in the performance of the method occurs in an event that the cell payload is not being followed from the port of origin within the fixed time by a cell payload of a similar destination. In this event said other data is passed to the outgoing cell payload transport means without data being passed from the incoming cell payload transport means to the timeslot switching means.

BRIEF DESCRIPTION OF THE DRAWINGS

A description of an example embodiment of the invention is provided with reference to the accompanying drawings in which:

FIG. 1 is a diagram showing frame oriented time division multiplexed octets arranged in a format typical of present and prior STM switching facilities used for voice communications;

FIG. 1a is a diagram showing ATM cells multiplexed in a SONET frame format;

FIG. 18 shows the relationship between FIGS. 18b and 18c, as they are coupled with channel circuits, one of which is shown in FIG. 18a. FIG. 18a is a schematic diagram which illustrates a channel circuit A of the interface DS0 multiplexer in more detail;

DESCRIPTION

FIGS. 1, 1a, 2, 3 and 4 are generally representative of prior art and are discussed briefly, as a basis for assisting the reader in an understanding of examples of the invention.

Referring to FIG. 1, a periodic superframe 11 of bearer octets 0001–1024 and a synchronous transfer mode frame signal 0000 occurring at an 8 KHz rate, is typical of the signal format used in the STM switching facility. A stage of time switching may introduce an average delay of one frame period or less in the transport of the octets in the STM.

Referring to FIG. 1a, a SONET STS-3c frame 22 (a 155 MHz transport frame) provides a synchronous payload envelope bounded by sonet framing signals labelled 22-1 and 22-2. The synchronous payload envelope is capable of transporting 44 cells, illustrated as cells 20-01 through 20-44, and 8 octets of the next cell illustrated as cell 20-45, every 125 $\mu$s. As the cell rate is not an integer number in 125 $\mu$s, the cell boundaries, at the 8 KHz frame rate, change from frame to frame and only reoccur with each fifty-third SONET STS-3c frame.

Figure 2:
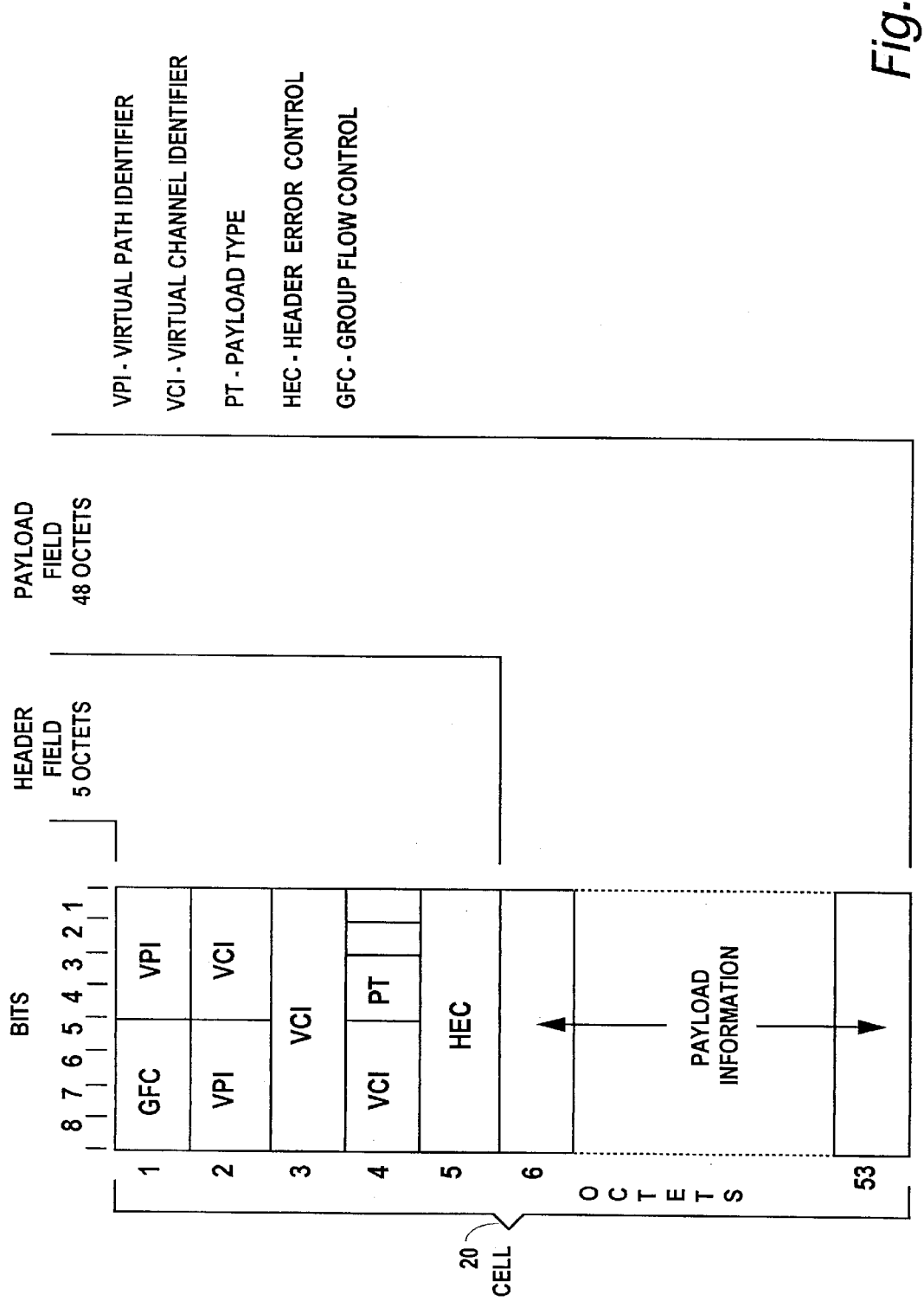
FIG. 2 is a diagram showing a 53 octet cell format, standardized for ATM switching facilities recently introduced for broadband communications.

FIG. 2 illustrates a cell 20 which is the standard transportation unit in an ATM switching facility. The cell 20 consists of an information field containing bearer octets 06–53, and a header field containing octets 01–05. In octet 01, bits 5–8 pertain to group flow control. Bits 1–4 in octet 01 in combination with bits 5–8 in octet 02 are used to associate the cell with a virtual path. In octet 02, bits 1–4 in combination with bits 1–8 in octet 03 and bits 5–8 in octet 04 are used to associate the cell with a virtual channel. Bits 3 and 4 in octet 04 are used to identify the type of information in the bearer octets 06–53, for example bearer or signalling information. Octet 05 is used for error control in regard to the information contained in the preceding octets 01–04.

Figure 3:
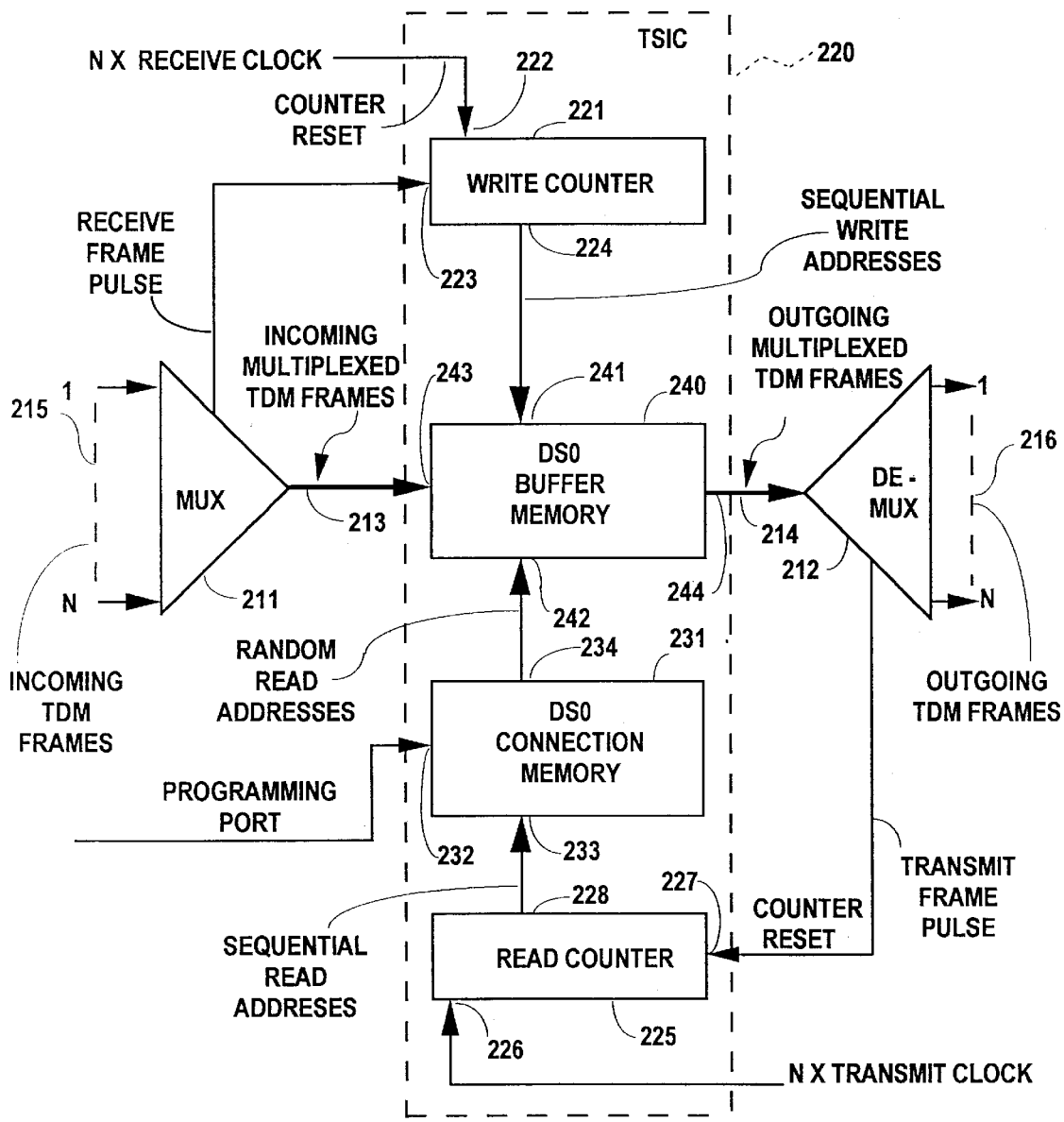
FIG. 3 is a block schematic diagram illustrating the general form of a synchronous timeslot interchange system, which is exemplary in principle of systems used for time switching, often referred to as DS0 switching, in the STM.

FIG. 3 is illustrative of some principles of timeslot switching as are commonly employed in STM communications networks. In FIG. 3, a synchronous timeslot interchange switching subsystem operates on frames to provide a controlled exchange of information between timeslots of incoming frames and timeslots of outgoing frames. The synchronous timeslot interchange switching subsystem includes an input multiplexer 211 and an output demultiplexer 212 which are interconnected with a timeslot interchange circuit (TSIC) 220. The input multiplexer 211 orders TDM channels from input lines 215 into a single high speed data stream, on a bus 213, such that the frames on each input line are aligned into a local high speed frame structure, similar to the superframe 11 illustrated in FIG. 1. By establishing this alignment, each channel on the incoming lines is assigned a predetermined fixed time location within the high speed frame structure. The incoming assignment is fixed in accordance to the timing structure of the multiplexed loops 215. Similarly, the output demultiplexer 212 reorders an outgoing high speed data stream, provided by the TSIC 220 on a bus 214 into outgoing TDM frames of channels which are distributed by the output demultiplexer 212, to output lines 216, in a predetermined fixed channel relationship.

The TSIC 220 is synchronized to frame timing that is common to the input multiplexer 211 and an output demultiplexer 212, such that a DS0 buffer memory 240 and a DS0 connection memory 231 are both synchronized to operating rates of incoming and outgoing multiplexed TDM frame buses 213 and 214. Octets from the incoming bus 213 are synchronously written via an input port 243, into the DS0 buffer memory 240 at a sequential series of memory addresses that match the frame and timeslot order of the incoming frames. The sequential addresses are supplied from an output 224 of a write counter 221 to a write address port 241 of the DS0 buffer memory 240. The write counter 221 is reset via its reset input 223 at the beginning of each synchronous frame period of 125 μs and thereafter counts receive clock signals applied via a count input 222. After an octet is written into the DS0 buffer memory 240, the information is available for reading at any time during the next 125 μs time period. Within each 125 μs time period, a selectable delay is associated with each written octet. The delay is selected by a non sequential or random timeslot address which was previously specified and loaded into the DS0 connection memory 231. The random timeslot addresses are sequentially read from the DS0 connection memory 231, and applied to a read address port 242 of the DS0 buffer memory 240 in synchronism with the operating rate of the outgoing bus 214. Accordingly the octets in the DS0 buffer memory 240 are randomly read via an output port 244, into the outgoing bus 214. To perform this function, the DS0 connection memory 231 is driven by sequential addresses supplied via its address port 233, from an output 228 of a read counter 225. The read counter 225 is reset via its reset input 227 at the beginning of each synchronous frame period of 125 μs and counts transmit clock signals applied at a count input 226. The DS0 connection memory 231 is programmed through its program port 232 via a program bus 235, by placing an incoming timeslot address into a storage location corresponding to a destination outgoing timeslot address. The information that arrived on the incoming bus 213 during the incoming time slot, is stored and then read into the outgoing timeslot during the outgoing frame occurrence on the outgoing bus 214. Accordingly the temporal ordering of the information contained in the incoming octets is altered to a temporal ordering in the outgoing octets appropriate for the information to be received at the intended destinations.

Figure 4:
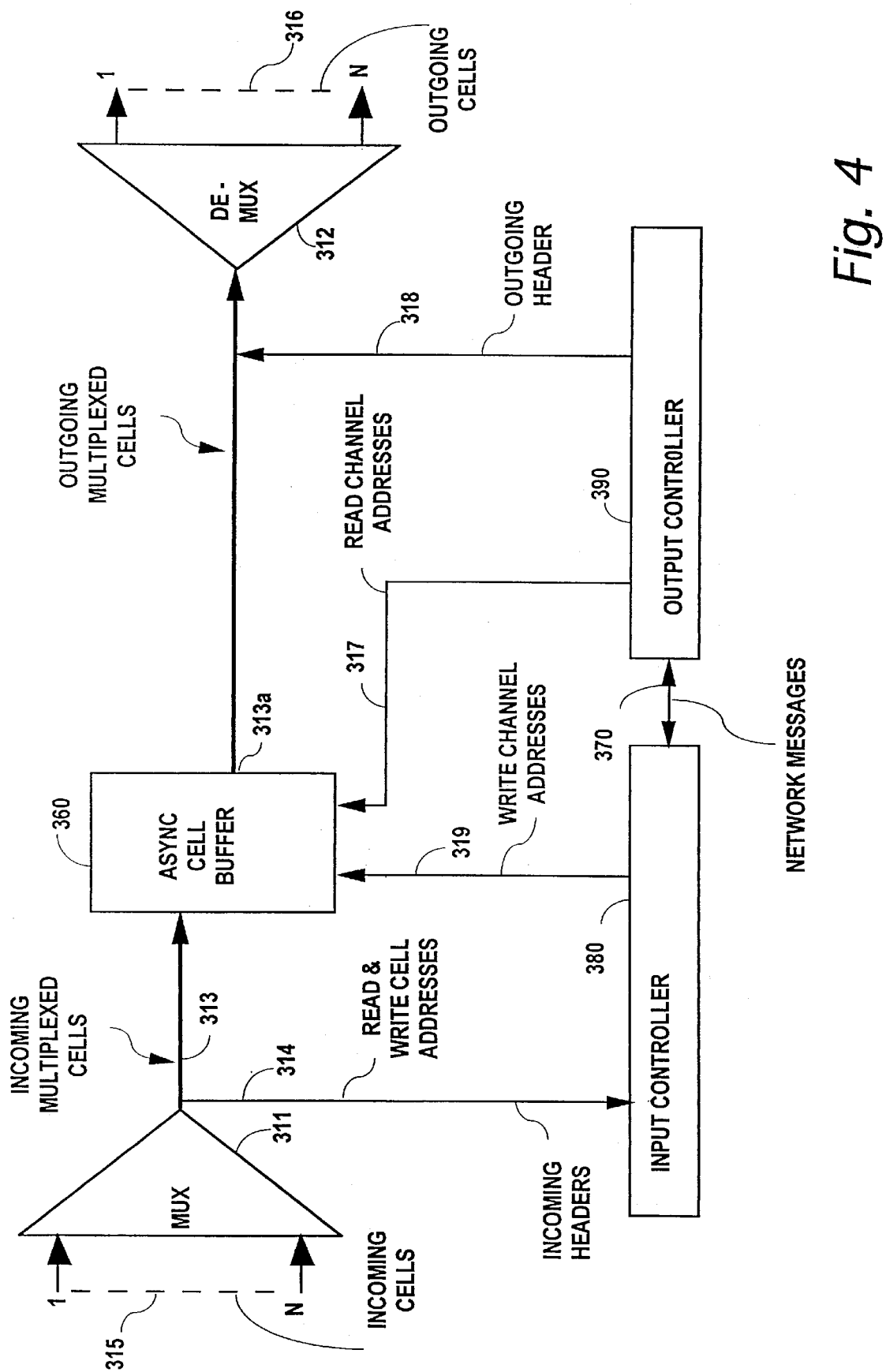
FIG. 4 is a block schematic diagram illustrating the general form of a packet system, which is exemplary in principle of systems used in accordance with the ATM cell switching standard.

Some general aspects of the asynchronous transfer mode of operation are illustrated in FIG. 4. The system may be implemented with a common memory in the form of an asynchronous cell buffer 360, that is logically managed and partitioned to provide queuing buffers. The use of queuing buffers for data switching is well known to persons skilled in the ATM switching arts. A queuing buffer or queue is used to receive an incoming cell and to retransmit the cell at a later time when a transmission path to an intermediate or a final destination is available. Incoming cells are received by a multiplexer 311 via communications lines 1-n, labelled 315. Header portions of the incoming multiplexed cells are multiplexed into a high speed bus 314 for use by an input controller 380. Payload portions of the incoming cells are multiplexed into a high speed bus 313, for receipt and storage by the asynchronous cell buffer 360. Read and write channel addresses are generated in the input controller 380 and coupled to control the functioning of the asynchronous cell buffer 360. If the arrivals of cells of a particular destination suddenly increase, its assigned queue in the buffer 360 simply stores what cannot be immediately transmitted for transmission at a later moment. The payload portion of each cell is coupled to a demultiplexer 312 via an asynchronous output bus 313a. An output controller 390 is interconnected with the input controller 380 via a micro processor bus 370. In operation the output controller 390 generates an appropriate outgoing header portion for each outgoing cell, such that the header portion is received by the demultiplexer 312 via a bus 318, immediately preceding the payload portion. The demultiplexer 312 distributes the outgoing cells across communications lines 1-n, labelled 316, in accordance with the header information. As before mentioned excessive rates of incoming cell arrivals with information destined for a particular one of the communications lines 316, are buffered by the asynchronous cell buffer 360. Hence depending upon traffic density, cell transmissions through the ATM switching apparatus exemplified in FIG. 4, experience variations in the time for traversing the apparatus between the incoming lines 315 and the outgoing lines 316.

Figure 5:
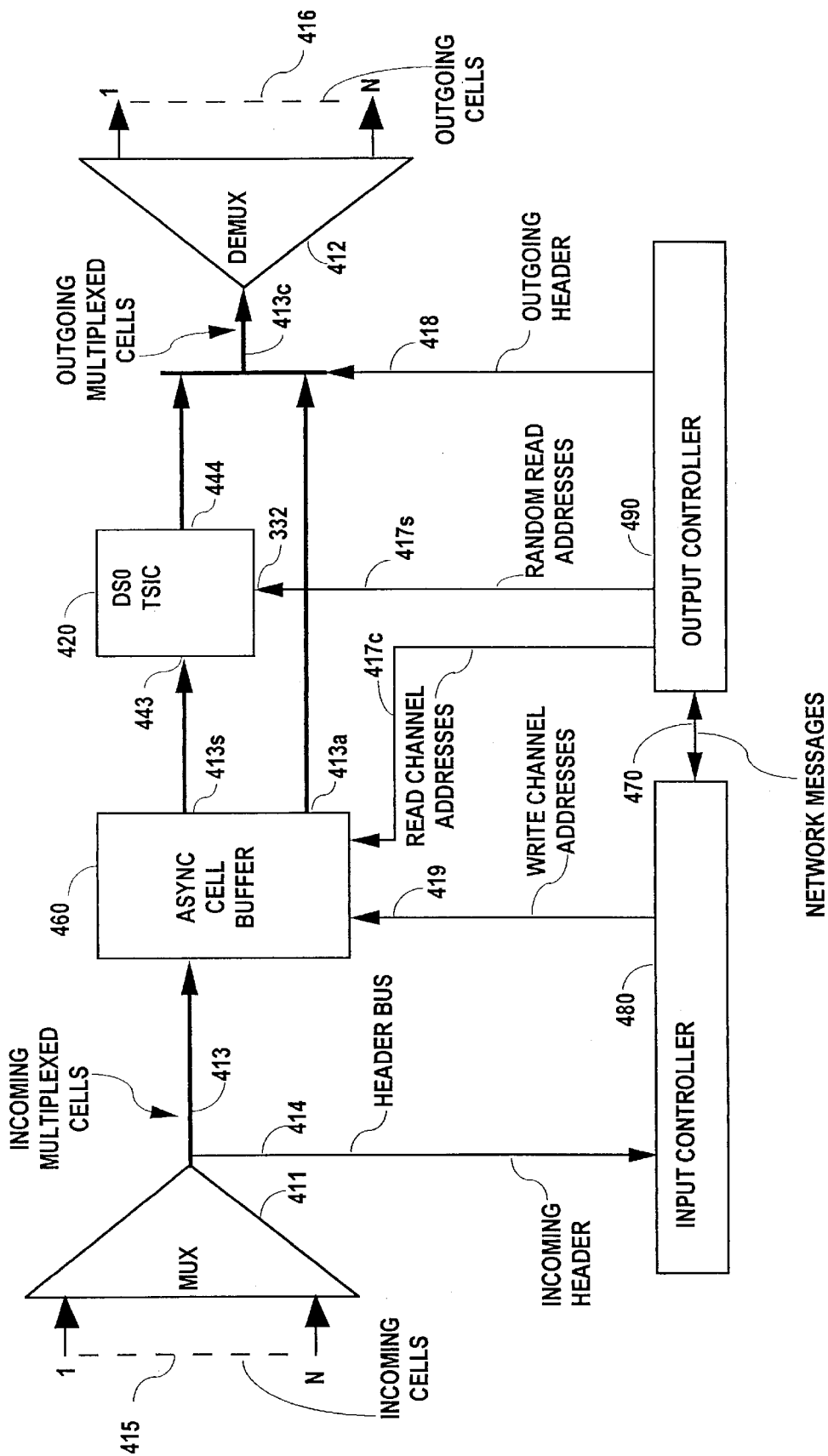
FIG. 5 is a block diagram broadly illustrating the principle architecture of a communications facility, which is in accordance with the invention. The communications facility including both ATM and STM elements being operable in combination for the transport of bursty data between asynchronous sources and destinations as well as periodic data between isochronous sources and destinations.

As introduced, FIG. 5 broadly illustrates the principle architecture which includes a combination of ATM and STM elements integrated within the switching fabric of a communications facility. By providing an integrated ATM and STM elements to switch the contents of cells as n×64 Kb/s units, the switching fabric does not require packetization delays to be incurred in order to make efficient use of the ATM switching fabric. The ATM cell traffic is arranged to include cells containing multiple n×64 Kb/s connections rather than a single connection with multiple samples from the same source.

An input multiplexer 411 and an output demultiplexer 412 are interconnected with an asynchronous cell buffer 460. In one arrangement incoming ATM cells are received at irregular rates by the input multiplexer 411, via input lines 1-n, labelled 415. The input multiplexer 411 orders the incoming cells into a local high speed data stream similar to the SONET frame illustrated in FIG. 1a. This is similar to the operation of the multiplexer 311 in FIG. 4. In another arrangement the input multiplexer 411 receives TDM frames of channels at a regular rate via the input lines 415. In this case the input multiplexer 411 inserts or maps the information received into cells in the local high speed data stream. The local high speed data stream is divided between two data streams at the output of the multiplexer 411, a payload data stream on a bus 413, and a header data stream, on a bus 414. In reference to FIG. 2, the payload data stream consists of octets 06–53 and the header data stream consists of octets 01–05. The payload data stream is received by the asynchronous cell buffer 460 which is controlled to reorder the sequence of the cells and transfer the cells to either of a local high speed bus 413a and a local high speed bus 413s. Those cells having information of a periodic or synchronous nature are directed to the bus 413s, while those cells having information other than information of a periodic or synchronous nature are transmitted via the bus 413a. The suffixes "s" and "a" are intended to represent synchronous and asynchronous, respectively. In order to transport TDM frames having information of a periodic or synchronous nature requires that the TDM frame be segmented into one or more cells depending upon the number of timeslots used within the TDM frame. A distinct identifier in each cell header is used so that the frame structure may be randomly reconstructed to rebuild the temporal image of the arriving TDM frames at a DS0 buffer 420. The bus 413s is connected to a DS0 TSIC 420. The DS0 TSIC 420 functions to exchange information octets between various of the payload octet positions of the cells directed to it by the asynchronous cell buffer 460. A cell structured payload data stream on a bus 444 is provided by the DS0 TSIC 420 and a cell structured payload data stream is provided by the buffer 460 on the local high speed bus 413a. Meanwhile an output controller 490 provides outgoing headers for the cells of payload data via a bus 418. The buses 444, 413a and 418 are combined as high speed stream of outgoing multiplexed cells, via bus 413c, at the input of a demultiplexer 412. The demultiplexer 412 operates in a manner more or less complementary to the function of the multiplexer 411. Complementary to the one arrangement the demultiplexer 412 distributes the outgoing multiplexed cells, as ATM cells across lines 1-n, labelled 416, in accordance with the header information of each cell. Complementary to the other arrangement the demultiplexer 412 distributes data of the outgoing multiplexed cells into outgoing TDM data stream frames of channels which are applied to the lines 416, in accordance with header information of each cell.

The functions of the asynchronous cell buffer 460 and the DS0 TSIC 420 are directed by an input controller 480 and an output controller 490 which are responsive to header contained information and bandwidth dynamics of the switched traffic, in accordance with instruction sets having been stored therein. The input controller 480 receives header information for each incoming cell from the header bus 414 and provides operating instructions for the asynchronous cell buffer 460 as into which cell queue each incoming cell is to be stored, via a write channel addresses bus 419. The input controller 480 also provides functional information for use by the output controller 490, via an network message bus 470. The output controller 490 has several functions which relate to the operations of the asynchronous cell buffer 460, the TSIC 420 and the demultiplexer 412. One function is that of selecting a block of storage locations in the TSIC 420 into which a cell, having been applied to the bus 413s, is synchronously and sequentially stored. A second function is to provide random read addresses for specifying an order of reading the octets of a stored cell onto the bus 444, and by so doing effecting SONET DS0 intraframe switching of the octets. These functions are effected via a random read address bus 417s. A third function is that of providing an outgoing header for each cell delivered from the buses 444 and 413a to the demultiplexer 412. The third function is effected via an outgoing header bus 418. of interest, during operation, the rate of random read address transmissions via the bus 417s is forty-eight times the rate of synchronous cell read channel address transmissions on the bus 417c.

In the foregoing paragraph apparatus is disclosed for performing a sequence of operations wherein any one of the cells may bear information of periodically operating origins and destinations; wherein such cell is queued for a time, in preparation for orderly processing in a time switch (TSIC); wherein the processing includes sequentially storing the cell octets and randomly reading the cell octets to effect a desired altered temporal order of appearance of the octets. It will be recognized by persons of typical skill in the electronic switching and telephony arts that the objective of rearranging the temporal order of the octets can also be effected in the time switch by randomly storing the cell octets and sequentially reading the cell octets.

It should be considered that the ATM switching, as shown in FIG. 4, provides queuing buffers which may be implemented with a common memory that is logically managed and partitioned as queues. The use of queuing buffers for data switching has been a common practice for data applications. If cell (packet) arrival rates suddenly increase the queue simply stores what cannot be immediately transmitted, hence, a cell experiences delay variation whereas a channel in a synchronous TDM system would not experience any variation in arrival time as time on the transmission loop is dedicated to the connection whether or not any information is being passed. By including an octet interchange capability in addition to the ATM cell switching, as shown in FIG. 5, the ATM portion of the switch provides an asynchronous transport capability that allows the TDM information to be transferred by a number of asynchronous cells. The number of cells used to transport the TDM frame may be varied in accordance to the size of the TDM frame which may be adapted to the actual DS0 traffic required during specific time periods within a 24 hour interval. Any remaining bandwidth in the switching facility may be used by other services. Furthermore by introducing a means to interchange octets among the cells arriving on any of the ports, a DS0 channel may be switched from one TDM frame to one or more TDM frames, that is, a channel may be routed to a different port which has a different frame size as compared to the incoming frame. Using a single fabric switch that allows for both octet and cell switching, permits a TDM trunk between end points to be adapted to actual traffic while allowing N×64 Kb/s connections to be made between the TDM frames. The consequences of using ATM cells is that of delay variation. The queuing characteristics of the ATM switch removes any fixed timing relationship between a cell arrival and the synchronous 8 KHz rate used to interconnect isochronous services. To restore the relationship of channels to the 8 KHz frame structure a block of memory, exemplified as the DS0 TSIC 420, may be used to reassemble the TDM frame structure. The block of memory matches the number of channels used in the TDM frame and represents a complete frame interval of 125 $\mu$s duration. As any 48 octet segment of the TDM frame is directly associated with an unique header address, the TDM frame may be reassembled in spite of the loss of the timing relationship. Once all segments have been filled in, at the header defined segments, the block of memory represents a complete frame of TDM information that corresponds to a 125 $\mu$s frame. By varying the size of the memory block, the dimension of the TDM frame may be increased or decreased which results in more or less cells being transmitted on the link. The resulting change in DS0 cell rate occurs only when the TDM segment exceeds the 48 octet payload capacity, or results in an empty payload.

Figure 6:
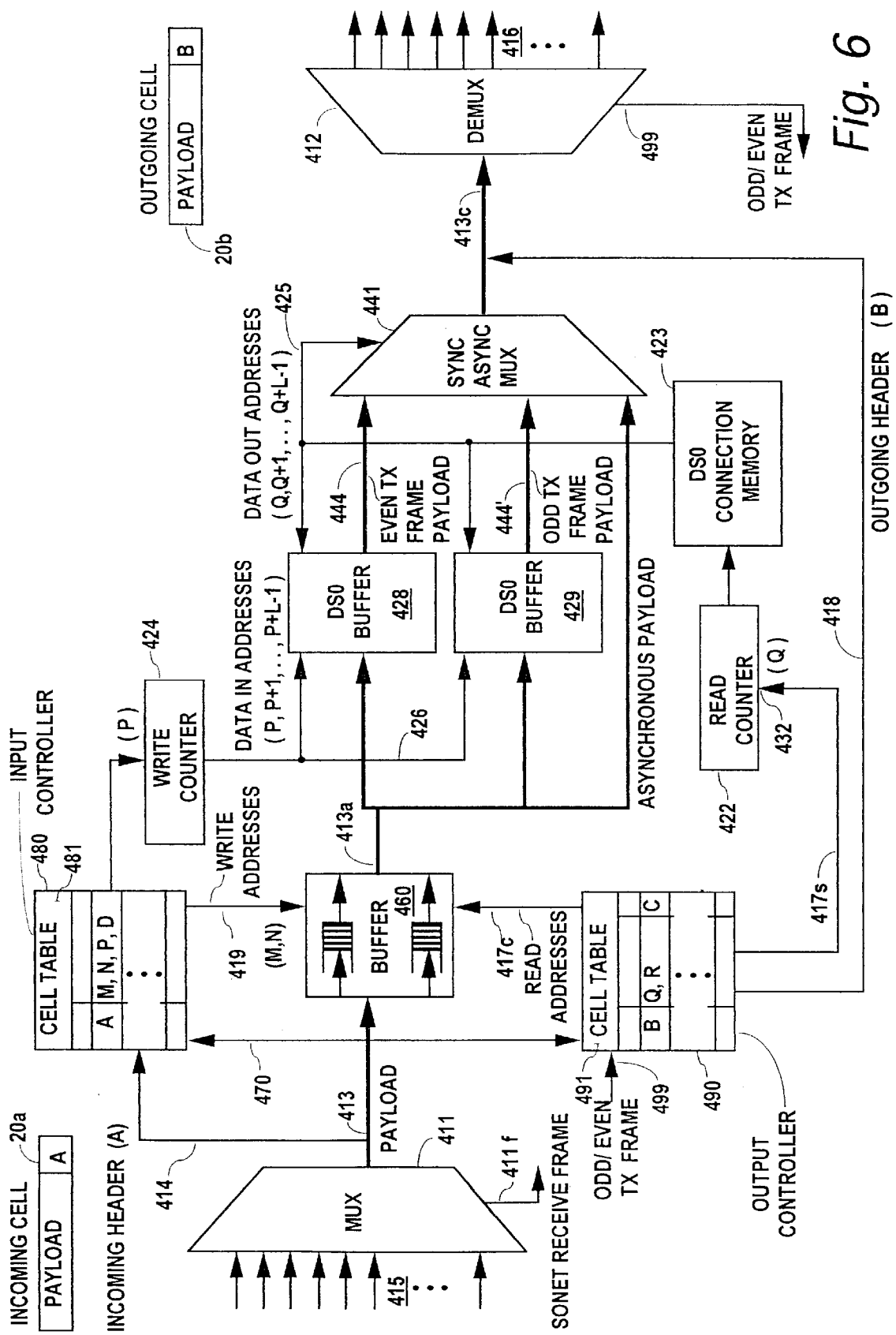
FIG. 6 is a block diagram illustrating the general form of an example of a communications facility, which includes both ATM and STM elements, combined to facilitate the transport of ATM cells as illustrated in FIG. 2, the ATM cells including bursty data from asynchronous sources as well as periodic data from isochronous sources, in accordance with the invention.

In FIG. 6 the illustrated communications facility includes both ATM and STM elements, combined to facilitate the transport of ATM cells of the form illustrated in FIG. 2. The ATM elements operate to regulate and direct a flow of cells from and to communications lines while the STM elements operate to select cells from the flow of cells and inject switched cells into the flow of cells. For convenience of understanding those elements which are similar to elements in any of the previously described figures are similarly named or labelled in FIG. 6, as well as in the subsequent figures. Input and output controllers 480 and 490 in FIG. 6 manage the flow of cells through the communication facility. Incoming cells are depicted at 20a and are shown to have a header section A followed by payload information. Outgoing cells are depicted as 20b and are shown to have a header section B followed by payload information. The input controller 480 is responsive to headers for scheduling queue transfers of payload information and directs cell storage preparatory to timeslot switching. The output controller 490 is responsive to information from the input controller 480, to provide outgoing headers and to operate a DS0 connection memory 423 for controlling SONET intraframe timeslot switching.

AS previously described the input multiplexer 411 may be provided such that it will interface with either of SONET standard ATM cells or with TDM frames. For example the TDM frames can be of either 24, 32, 640 or the 1024 channel base rates. Similarly the demultiplexer 412 may be provided such that it will interface with either of SONET standard ATM cells or with TDM frames. Hence where individual ones of the input lines 415 and the output lines 416 are paired in combination to provide 4 wire trunks or loops the switching facility can service subscriber line groups. On the other hand where the input lines 415 and the output lines 416 are not so paired the switching facility can provide transparent tandem switching service in either STM and ATM or in combinations thereof.

The input multiplexer 411 receives incoming data as it appears on any of 1-n lines 415 and retransmits bearer octet data as a cell payload stream on a bus 413 and transmits associated header octets as a header octet signal stream on a bus 414. Providing that the combined rate of data and supervision signals being received by the input multiplexer 411 does not exceed its output transmission bandwidth, all the received data is retransmitted on the bus 413. As the received data ideally never or seldom ever exceeds this bandwidth, there is usually surplus bandwidth which is transmitted by idle coded octets being inserted in idle time slots by the input multiplexer 411. The input multiplexer 411 also provides a SONET frame signal, on a frame signal lead 411f, which is either referenced to one of the SONET frame signals as received on any of the 1-n lines 415, or is internally generated if an external reference is unavailable. An asynchronous cell buffer 460 is controlled to receive the bearer octets in cell groups of 48 bytes and store each cell group in a group storage location. This control is effected under the direction of an input controller 480, which effects a plurality of functional first-in first-out (FIFO) queues in the cell buffer 460. The bearer octets of each cell group are subsequently transferred in TDM from the cell buffer 460 onto an input data transmission path shown in FIG. 6 as a bus 413a. The bus 413a is coupled to an input of an even DS0 buffer 428, to an input of an odd DS0 buffer 429 and to an input of a sync/async multiplexer 441. The buffers 428 and 429 are addressed by a write counter to store bearer octets of payloads from synchronous data sources. Outputs of the buffers 428 and 429 are connected to inputs of the sync/async multiplexer 441 via an intermediate data transmission path shown in FIG. 6 as payload buses 444 and 444', respectively. When an even numbered cell is being written into the DS0 buffer 428, a previously written odd numbered cell is permitted to be read from the DS0 buffer 429. Reading of the DS0 buffers is controlled indirectly by output controller 490 which provides a read counter with starting points for defining blocks of sequential addresses (Q, Q+1, . . . , Q+47). The sequential addresses are used by a DS0 connection memory 423 to deliver previously stored non-sequential address groups or in another words random addresses, to the DS0 buffers. Hence the DS0 buffers 428 and 429 are addressed to effect SONET intraframe timeslot switching of payload octets. When a cell having an asynchronous payload is read from the buffer 460, a bit in the random addresses causes the sync/async multiplexer 441 to accept and the payload data directly from the buffer 460 via bus 413a. The non-sequential address groups are provided by a call controller which is not shown in FIG. 6. The output of the sync/async multiplexer 441 is transferred in TDM directly to the input of the demultiplexer 412 via an output data transmission path shown in FIG. 6 as a bus 413c.

The input controller 480 uses the header octets of each corresponding cell to generate and maintain an incoming cell management table 481, which includes n rows of columns A, M, N, P and D, wherein:

A is an incoming header address which identifies data in the adjacent row.

M is an asynchronous buffer write pointer which defines the next empty storage location into which the payload is to be written.

N is an asynchronous buffer read pointer which defines the next of the queues in the buffer 460 for reading out a cell payload.

P is a DS0 write buffer offset pointer which selects a block in the DS0 buffers 428 or 429 by defining a start point in the counter a 424; and D is a delay pad parameter which defines a starting difference or space between the write pointer M and the read pointer N.

The table 491 includes n rows of columns B, Q, R and C, wherein:

B is an outgoing header address supplied from the controller, not shown in FIG. 6;

Q is a DS0 connection memory offset read pointer which defines the next block in the DS0 buffer 428 or 429 for randomly reading out a cell;

R is an output port selection address used by the demultiplexer 412 to direct a cell to its destined line; and C is a frame scheduling flag that identifies an outgoing cell as having either an asynchronous cell payload or an isochronous cell payload.

The function of this tabularized information in the input and output controller tables is that of effecting ingress of data in ATM cells and egress of data in ATM cells while effecting SONET intraframe DS0 switching.

Of course the reading of any one of the buffers 428, 429 and 460 onto the bus 413c is contingent upon such reading being exclusive to one of the buffers at any one time. Otherwise data collisions would occur rendering the communications facility nonfunctional. Functionality is orchestrated by the data in the cell tables 481, 491, the write counter 424, the read counter 422 and the DS0 connection memory 423. This is more fully disclosed in relation to the example embodiment as represented in the remaining figures.

Figure 7:
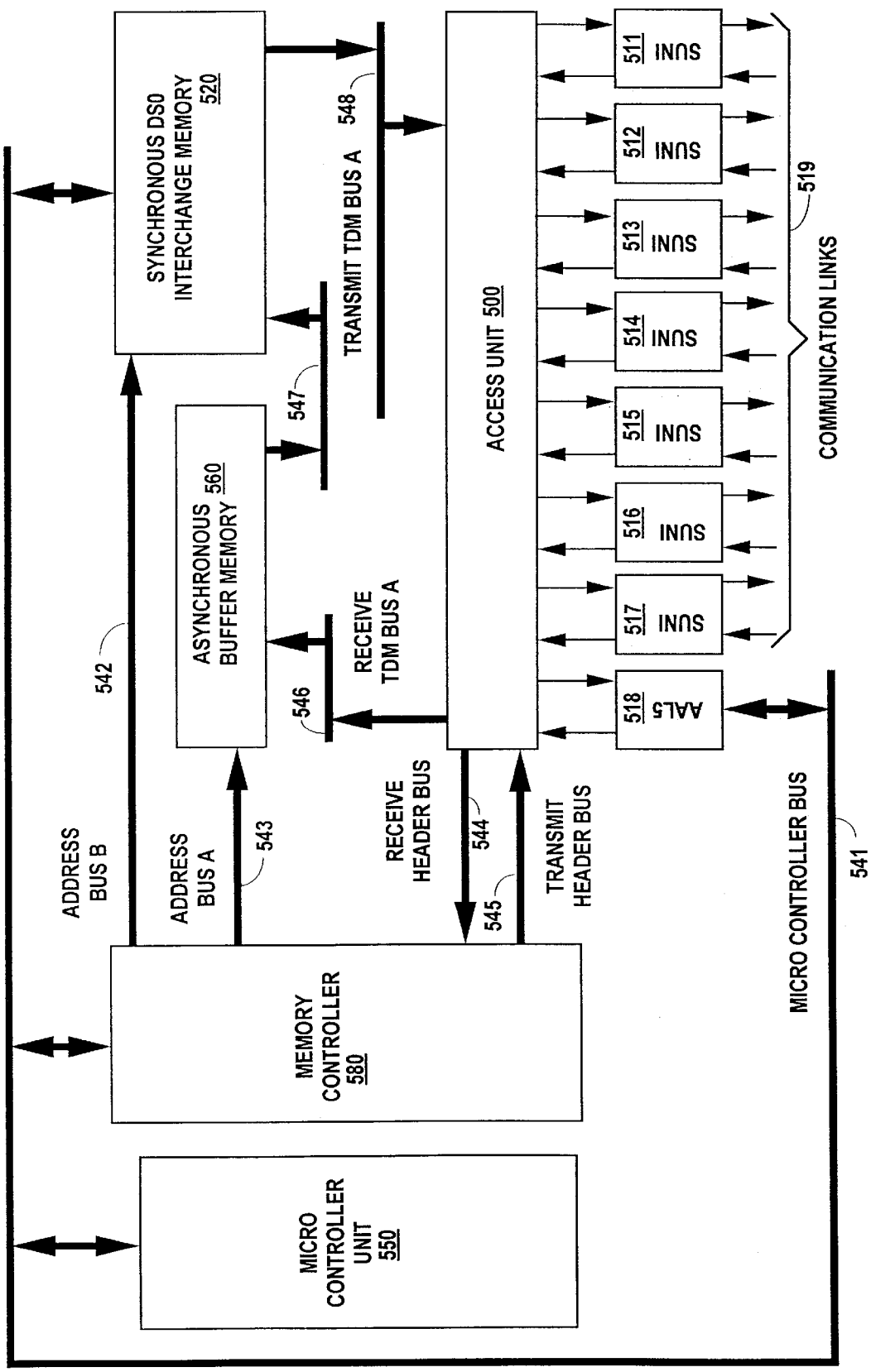
FIG. 7 is a block diagram overview of a switching apparatus, in accordance with the invention, the structure and operation of which is illustrated in more detail in remaining figures.

In the description of FIG. 7 and the following figures terms and phrases, including terms such as, trunk, line, bus, and lead are used. In this description the term trunk means a communication path, link, transmission facility, lead, group of leads or conduit, which connects between switching facilities and can be switched at both ends thereof. The term line means a communication path, link, transmission facility, lead, group of leads or conduit, which connect a switching facility directly or indirectly with terminal apparatus, for example a telephone set or a local area network (LAN). Switching may occur within the "line" however such switching is not apparent to either the switching facility or the terminal apparatus. The term bus means a lead or a plurality or a group of leads which provide a communication path between at least two circuit entities for carrying signals related to a specific function. The term lead means a communications path other than a line, which consists of one or two conductors.

As shown in FIG. 7, the basic functional blocks of an example embodiment of the invention include an access unit 500, which provides interface with communication links 519 via bidirectional SUNI ports 511–517, and a signalling and supervision link via a signalling AAL5 port 518 which is operational in the ATM Adaptation Layer 5 protocol and which is connected with a micro controller bus 541. SUNI is an acronym for Saturn User Network Interface. SUNI ports (PM5348) are operable according to the ATM Forum specifications and are available from PCM-Sierra, Inc. at Commerce Court, Burnaby, British Columbia, Canada V5A 4N3. The micro controller bus 541 provides for control information exchange between a synchronous interchange memory 520, a micro controller unit 550, an asynchronous buffer memory 560, and a memory controller 580. The micro controller unit 550 is responsible for the functions of the input and output controllers discussed with reference to the preceding figures. The memory controller 580 is coupled with the access unit 500 by a receive header bus 544 and a transmit header bus 545 so that it is able to receive incoming header information from the access unit 500 and so that it is able to supply outgoing header information to the access unit 500. The memory controller 580 is also coupled via an address bus A 543, to provide address information for the operation of the asynchronous buffer memory 560, and coupled, via address bus B 542, to provide address information for the operation of the synchronous interchange memory 520. A receive TDM bus A546 provides an input data transmission path and an egress bus 547 provides an output data transmission path. The asynchronous buffer memory 560 accepts ingress signals from the communication links multiplexed by the access unit 500, via the receive TDM bus A 546. The asynchronous buffer memory 560 transfers the ingress signals via the egress bus 547, in an orderly regulated data stream for receipt by the synchronous DS0 interchange memory 520. The cell payloads of the received data stream pass directly through and are applied to a transmit TDM bus A 548. Up to about half of the cell payloads are permitted to consist of isochronous data and are delayed for a time sufficient to perform octet switching before being passed via an intermediate data transmission path internal to the synchronous interchange memory 520, onto the TDM bus A 548.

The access unit 500 provides a connection for each attached SUNI and AAL5 in accordance with the "Utopia Interface Format" which is an industry standard for interconnecting ATM components. The AAL5 port 518 provides for designated cells to be transferred to and from the micro controller unit 550 and the access unit 500. Cells having payloads of control and call management information are routed between any SUNI and the microprocessor controller unit via the asynchronous buffer memory 560.

The asynchronous buffer memory unit 560 transports cell payload octets from the bus 546 to the buss 547. Buffer memory access through the operating TDM structure of the these busses provides synchronous timeslots to and from the asynchronous buffer memory unit 560 such that each port in the system has fixed timeslot access on a periodic basis. In synchronism with the memory access timeslots, the asynchronous buffer memory unit 560 is presented with synchronous read/write addresses by the memory controller 580, through the address bus A 543. These read/write addresses are used as memory pointers, each memory pointer identifying a block of memory and being synchronously associated with the port currently being coupled to the memory.

In operation the SUNI ports 511–517 and the AAL5 port 518 are organized by the access unit 500 such that each port has equal transmit and receive time periods during which one cell may be passed in each direction. Non-blocking access is provided. The access unit 500 divides the time period required to serially transfer a cell into eight time division multiplex (TDM) slots whereby each timeslot is assigned to a given port. Within the access unit 500, the header portion of a cell is either separated from or attached to the payload depending upon whether the cell is respectively an incoming cell or an outgoing cell. The payload section of the cell is transferred to and from the asynchronous buffer memory unit 560, and the header field is transferred to and from the memory controller 560 by using a fixed TDM timing structure that inherently associates specific header timeslots to specific ones of the eight port TDM slots. In an ingress direction, as the header information of the incoming cell precedes the transfer of the cell payload, the incoming header is passed to the memory controller 580 through the receive header bus 544, and is examined by the memory controller 580 in order to fetch a memory pointer that identifies the location for storing the incoming cell payload within the asynchronous buffer memory 560. In an egress direction, the memory control unit 580 provides an outgoing header and the associated memory pointer that identifies the location of the outgoing payload such that both the header and the payload are passed through the respective TDM busses using the fixed TDM slot timing relationship that identifies the outgoing access of a specific port. The payload is concatenated to the egress header within the access unit 500, thereby creating a completely formatted transmit cell that is then transferred to the respective one of the SUNI ports 511–517.

The functions of the switching apparatus shown in FIGS. 7, 9, 10, 12, 13, 15, 16, 17, 17a, 18, 18a, 18b, and 18c are related in time and space as is illustrated with reference to the timing diagrams in FIGS. 8, 11 and 14.

Figure 8:
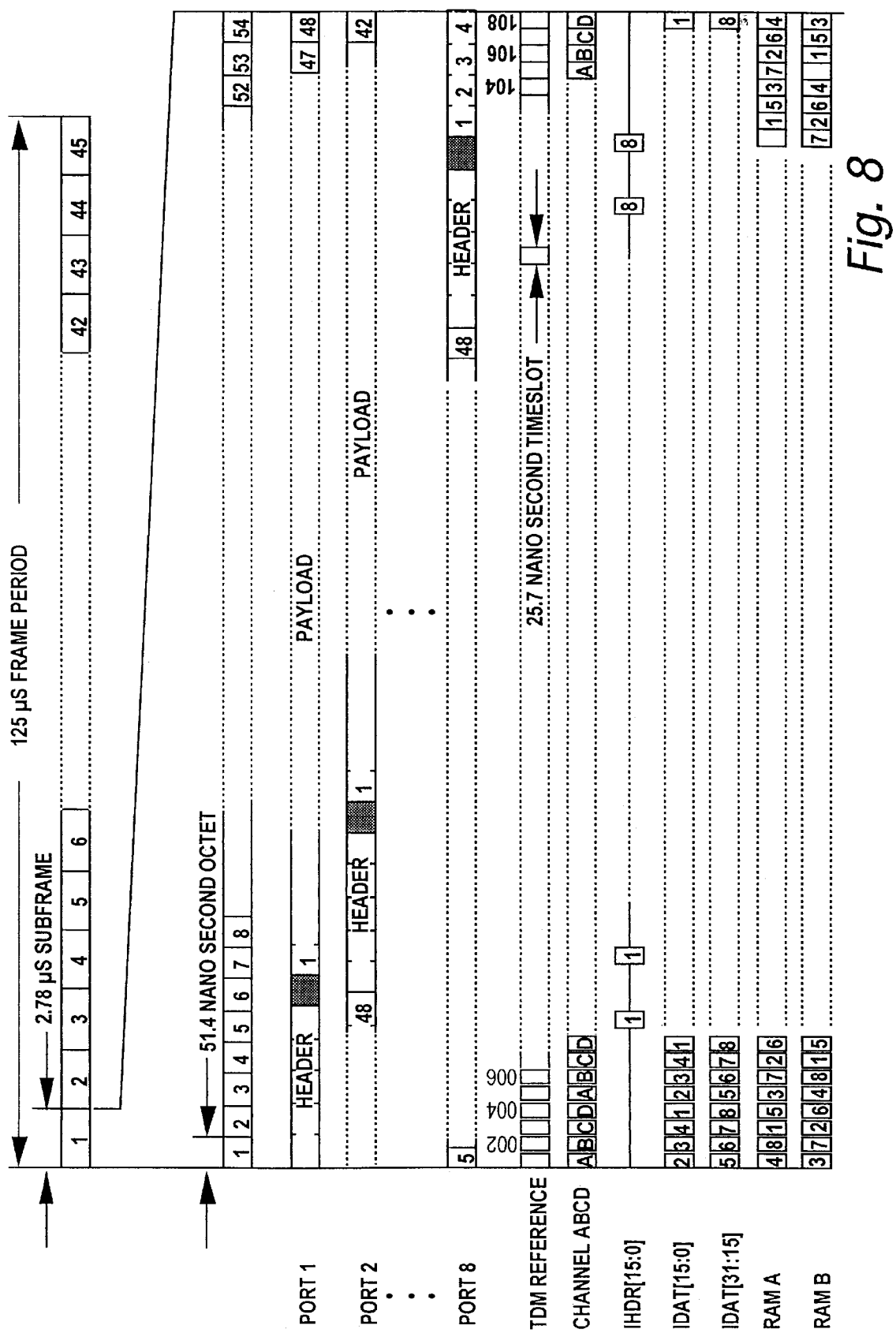
FIG. 8 is a timing diagram illustrating relationships of elements of ATM cells handled by the switching apparatus of FIG. 7 and the telephony standard frame period.

FIG. 8 shows the TDM timing which is based upon the frequency of octets which are passed through the SONET/SDH ATM User Network Interface, in other words the SUNI ports. The standard for SONET based STS-3c serial transmission specifies a 155.52 Mb/s transmission rate which produces 2430 octets every 125 $\mu$s frame period. The SONET overhead uses 90 octets, leaving 2340 octets for transporting ATM cells. This repeats at the 8 Khz frame rate. Consequently, the SONET STS-3c synchronous payload envelope is capable of nominally transporting 44 cells and 8 octets of the next cell every 125 $\mu$s. As the cell rate is not an integer number in 125 $\mu$s, the boundary condition at the 8 KHz frame rate changes from frame to frame and hence is not repeated until 53 frames have elapsed. Consequently all cells available during a frame period are not available for transporting DS0 structured frames. In order to establish an integral timing relationship within the switching fabric, the internal TDM structure evenly distributes the SONET frame octet rate over 45 subframes, each of 2.78 μs duration. Each subframe consisting of 54 octets, each having a time interval of 51.4 ns, for transferring one transmit and one receive cell between each of the ports 511–518 and the switch. Of the 44.15 cells available in either direction at a port, a maximum of 42 cells may be allocated in either direction for transporting channelized DS0 payloads while the remaining 2.15 cells are exclusively available for asynchronous data. The allocation of cells between synchronous and asynchronous connections is adjusted in accordance to the service being supported by the connection, provided that no more than 42 cells are assigned for synchronous operation. Each 51.4 ns octet is subdivided into two 25.7 ns timeslots so that a subframe consists of 108 timeslots. These timeslots, labelled 001–108, provide reference numbering for synchronously transferring data between each element of the switching apparatus.

Figure 9:
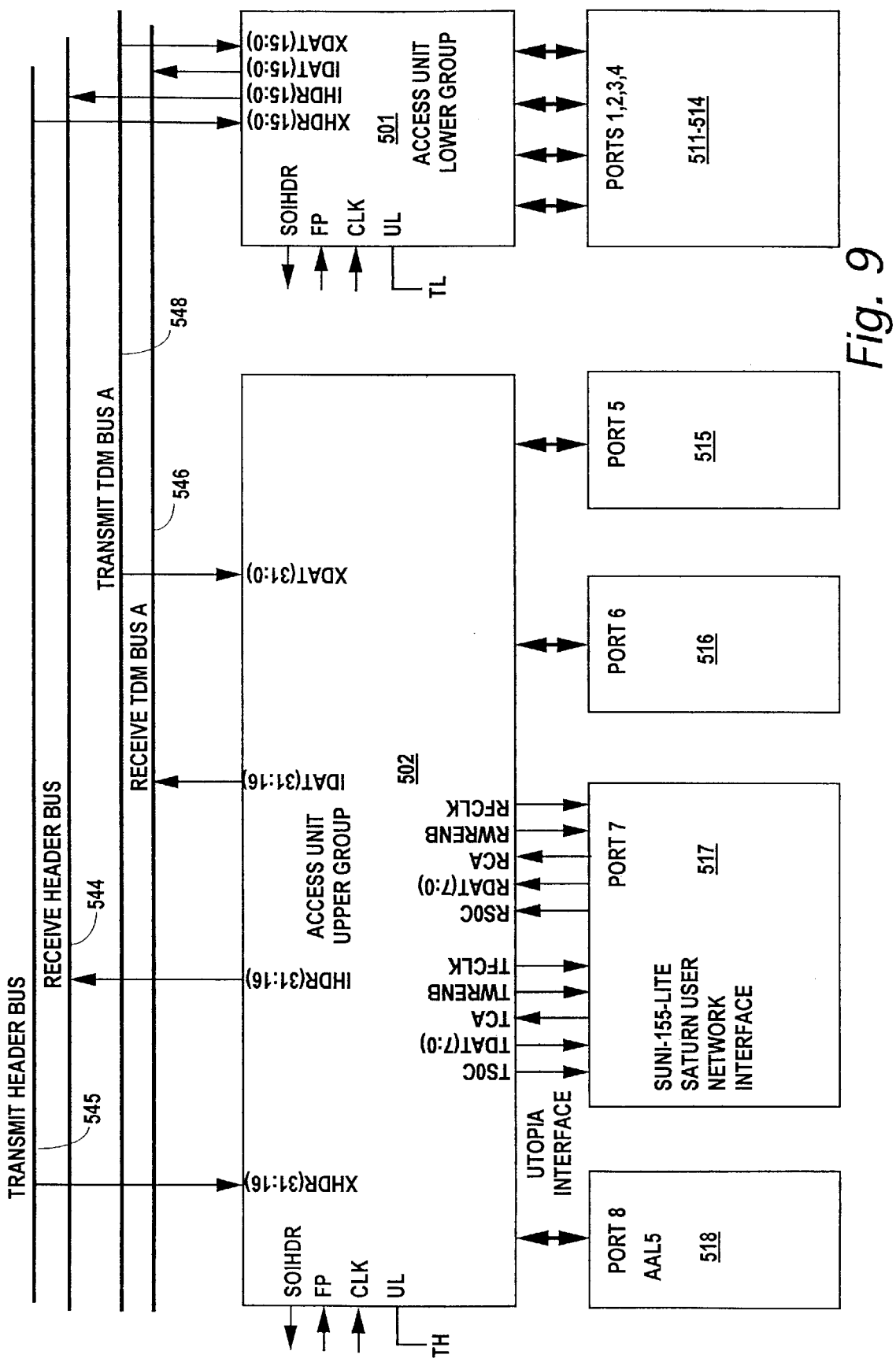
FIG. 9 is a block diagram illustrating one arrangement for interfacing communications lines with the switching apparatus of FIG. 7.

FIG. 9 is a block diagram illustrating the interface of the ports 511–518 with the switching apparatus of FIG. 7. The access unit 500, shown in FIG. 7, is split into two functional access units 501 and 502, in FIG. 9. The access unit 501 serves a lower group of ports 1–4 and the access unit 502 serves an upper group of ports 5–8, wherein port 8 is provided by the AAL5 unit and ports 1–7 are provided by the SUNI units.

The access units 501 and 502 each have connections for four ports. Although the connections are standard but are briefly reviewed here for the convenience of the reader; as follows:

TSOC—transmit start of cell signal, marks the start of cell on the TDAT(7:0) bus, TDAT(7:0) transmit cell data bus of 8 leads delivers ATM cell octets to the SUNI unit, TCA—transmit cell available signal indicates when a cell is available for transmission to the SUNI unit, TWRENB—transmit write enable input is used to initiate writing of an ATM cell from the access unit into the SUNI unit, TFCLK—transmit write clock pulses for clocking the writing of octets of the ATM cell into the SUNI unit.

RSOC—receive start of cell signal marks the start of cell on the RDAT(7:0) bus,

RDAT(7:0)—receive cell data bus of 8 leads delivers ATM cell octets to the access unit, RCA—receive cell available signal indicates when a cell is available in the SUNI unit for transmission to the access unit, RWRENB—receive write enable output is used to initiate writing of a cell from the SUNI unit into the access unit, RFCLK—receive read clock pulses for clocking the reading of octets of the ATM cell from the SUNI unit.

The access unit 501 is connected to transport ingress header information (IHDR) and ingress data information (IDAT), via the receive header bus 544 and the receive TDM bus A 546 respectively. The access unit 501 is connected to receive exit header information (XHDR) and to receive exit data information (XDAT) via the transmit header bus 545 and the transmit TDM bus A 548 respectively. The access unit 502 is connected to transport ingress header information (IHDR) and to transport ingress data information (IDAT) via the receive header bus 544 and the receive TDM bus A 546 respectively. The access unit 502 is connected to receive exit header information (XHDR) and to receive exit data information (XDAT) via the transmit header bus 545 and the transmit TDM bus A 548 respectively. The buses 544, 545, 546 and 548, each consist of a plurality of parallel conduits each bus being 32 leads wide. Each of the buses is operated in synchronism with the TDM reference clock signal frame period shown in FIG. 8 as having a period of 25.7 ns. With respect to the access unit 501, transport of the ingress data and header information and reception of the exit header information is limited to bit leads 0 . 15, two octets at a time in the respective buses. With respect to the access unit 502 transport of the ingress data and header information and reception of the exit header information is limited to bit leads 16–31, two octets at a time in the respective buses. The access units 501 and 502, receive the exit data information (XDAT) from the respective halves of the transmit TDM bus A 548.

FIG. 8 illustrates the order in which ingress headers and data information are transported. As shown, 2 octets from port 2 are transported via IDAT (15:0) to the receive TDM bus A 548 at the same time that 2 octets from port 5 are transported via IDAT (31:16) to the receive TDM bus A 548. The access unit lower group 501, assigned to IDAT(15:0), uses a port scanning sequence 2,3,4,1 that commences with TDM reference 001, and is periodically repeated during the subframe, through to TDM reference 108. Similarly, the access unit upper group 502, assigned to IDAT (31:16), uses a port scanning sequence 5,6,7,8, that commences with TDM reference 001, and is periodically repeated during the subframe, through to TDM reference 108. The two patterns are combined within the asynchronous buffer memory unit 560 to create a composite pattern for data access to a pair of memory units in the asynchronous buffer memory 520, as will be discussed in relation to FIG. 16. This provides sequences multiplexed into 32 bit words which evenly distribute the cell payloads over both memory units. These sequences periodically repeat and result in successive 16 bit words from a port being alternately written into the one and the other of the pair of memory units. During each subframe, as illustrated for ports 1, 2 and 8, the state of the receive cell available flag RCA from each port is sampled or scanned on a sequential basis that is distributed across the subframe time interval. This distribution provides a time period between subsequent receptions of the receive cell headers that permits the memory controller 580 to examine a received cell header, when and if a received cell is available at the port, and determine the memory location in the asynchronous buffer memory 560 for the subsequent transfer and storage of the cell's payload.

The access units 501 and 502 derive the TDM slot assignments from the frame pulse signals and the clock signals applied at inputs labelled FP and CLK along with a logic level, tide high TH or tide low TL, applied at a terminal UL, as shown, to identify when each port is to be scanned for receive activity. This provides for timing and logic control so that the access units 501 and 502 can drive the busses 544 and 546 and receive from the busses 545 and 548 in the TDM operating format. With reference to the TDM slot assignments the following steps are executed in sequence at the ports by the access unit 500:

a) scanning a SUNI unit's RCA lead just prior to its TDM slot assignment;

b) responsive to the RCA flag being inactive, performing step a) with reference to the next TDM slot assignment, and, responsive to the RCA flag being active performing step c);

c) reading a cell from the SUNI during the TDM slot assignment by;
  i) asserting the receive write enable signal RWRENB throughout a period consisting of a sum of the periods of the timeslots for reading the header, and
  ii) after a time of at least one further of the timeslot periods, reasserting the receive write enable signal RWRENB throughout a period consisting of a sum of the periods of the timeslots for reading the payload, and
d) performing step a).

In this example the access unit 500 reads the cell's information content octet after octet from the RDAT (7:0) leads and in so doing step ii) is performed by delaying the reading of the first payload octet for one timeslot period to insert an extra octet the same as the fifth octet in the next octet position so that the cell read by the access unit consists of 6 header octets and 48 payload octets.

The access unit 500 concatenates the received octets to form a cell of 28 words of 2 octets each, directs the first three words to the receive header bus 544 while asserting a start of ingress header (SOIHDR) flag to indicate the presence of the header to the memory controller 580, and thereafter directs each of the 24 payload words, delayed by two timeslot periods, to the receive TDM bus A 546. Thus a total delay of three timeslot periods exists between the end of the ingressing header and the beginning of the ingressing payload. This delay period provides time for the memory controller 580 to process the header words in order to generate an appropriate series of 24 memory addresses which direct the storage of the ingressing payload in the asynchronous buffer memory 560.

Figure 10:
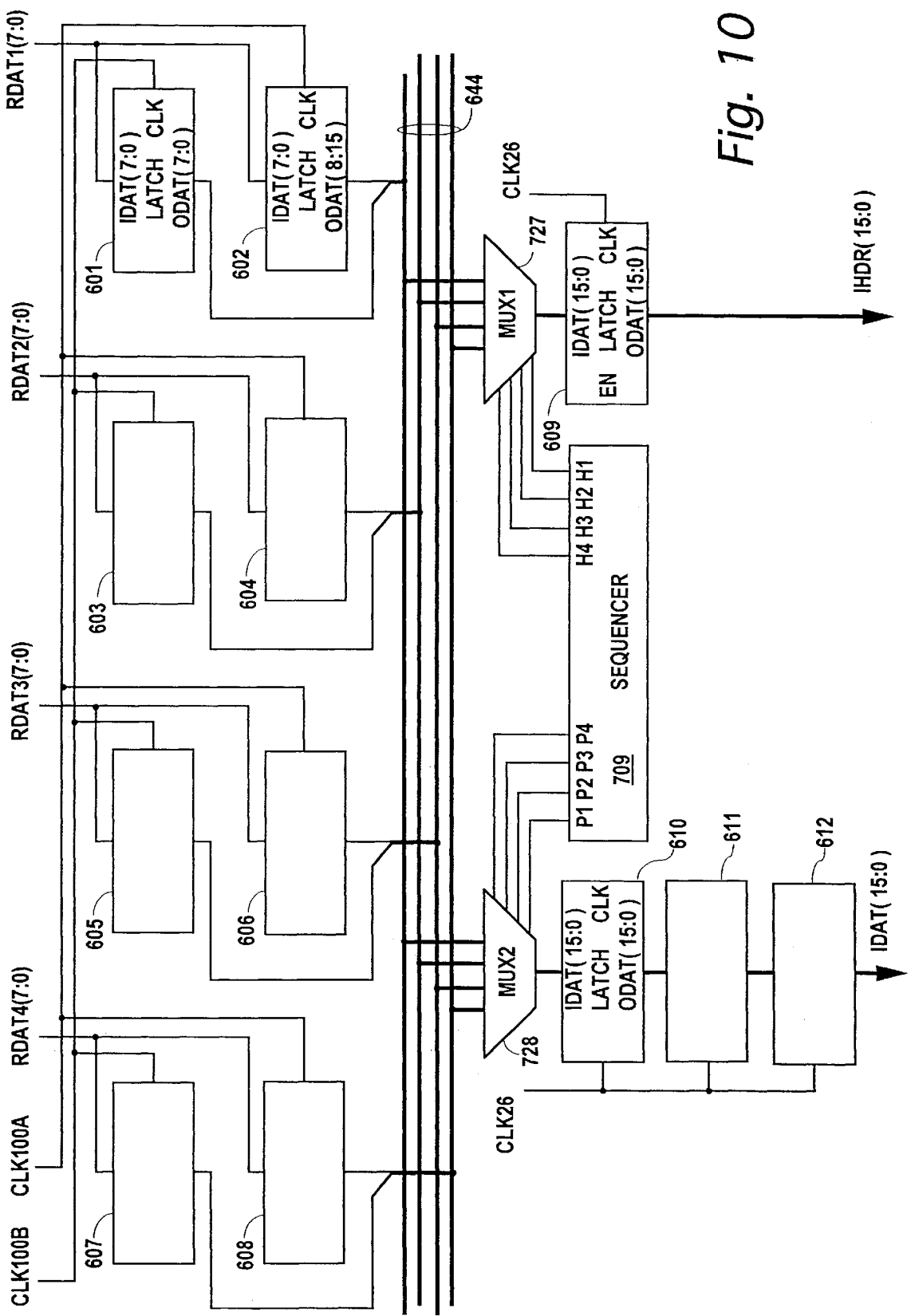
FIG. 10 is a block schematic diagram illustrating an ingress access data path by which the switching apparatus of FIG. 7 distinguishes payload and header information in received cells.

FIG. 10 is a block schematic diagram illustrating one example of circuitry used in the access units to provide for ingress paths from the SUNI ports whereby the payload and header octets of received ATM cells are interleaved onto the receive TDM bus A 546 and onto the receive header bus 544. The access unit 501, serving the lower group of ports 1–4, is illustrated in detail. The access unit 501 includes a group of eight latches 601 608, each being 8 bits wide and four other latches 609 612 each being 16 bits wide. The latches 601 and 602 are paired to receive data octets from port 1 via an 8 lead bus RDAT1. The latches 603, 604 and 605, 606 and 607, 608 are similarly paired to receive data octets from ports 2, 3 and 4 via buses RDAT 2, RDAT 3 and RDAT 4, respectively. Each of the even numbered latches 602, 604, 606 and 608 is responsive to a 102.8 ns clock signal CLK100A to register an octet presently asserted by its respective port at a latch input IDAT (7:0). Similarly each of the latches 601, 603, 605, and 607 is responsive to a 102.8 ns clock signal CLK100B to register an octet presently asserted by its respective port at a latch input IDAT (7:0). As the clock signals are inversely phased one with respect to the other, each of the 8 lead RDAT buses is read at 51.4 ns intervals. The 4 words registered in each of the 4 pairs of latches 601–608 are continuously driven onto respective groups of 16 leads in a local ports bus 644.; wherein leads 7–0 are driven by latch outputs ODAT (7:0) and leads 31–16 are driven by latch outputs ODAT (15:8).

Multiplexers 727 and 728 are separately controlled to select header words and to select payload words respectively from the local ports bus 644. The selected header and payload words are latched onto the receive header bus 544 and the receive TDM bus A 546, shown in FIG. 9. The multiplexer 727 is responsive to each assertion of any one of header select signals H1, H2, H3 and H4, to couple the 16 bit word present on the corresponding group of leads of the local bus 644 to an IDAT(15:0) input of the latch 609. The latch 609 is operated by the timeslot 25.7 ns period clock signal CLK26 to transport ingress header words onto the receive header bus 544. The latches 609 have tristate output drivers. A multiplexer 728 is controlled by each assertion of one of the payload select signals P1, P2, P3 and P4, to transport payload payloads received from the ports 1–4 via the latches to the receive TDM bus A 546, shown in FIG. 9. In this example the header select signals H1, H2, H3 and H4 and the payload select signals P1, P2, P3 and P4, are provided by a pulse sequence generator 709 operated in accordance with the timing illustrated in FIG. 8.

In operation the access unit lower group 501 samples the RCA signal of the SUNI interface that is about to be serviced. The operation of the access unit upper group 502 is similar. If, for example, the RCA signal at port 1 is asserted, then the access unit 501 asserts the RWRDENB signal for port 1 to commence a synchronized RFCLK read of the waiting cell. Each octet is clocked into one of the 8 bit latches 601 and 602 from RDAT1, in alternate succession, to create a series of 24 words of 16 bits each, on the uppermost group of leads of the local ports bus 644. The multiplexer 727 operates in response to an assertion of the header select signal H1 to select the 3 first 16 bit words, that is the ingress header IHDR, of the received cell in succession, for transport of the header words to the receive header bus 544. Prior to being transported each of the header words is retimed by a 16 bit latch 609. Cells from any of the other ports 2, 3 and 4, present for reading are received in a similar manner via the respective latch pairs 603, 604 and 605, 606 and 607, 608. Header octets from the ports 2, 3 and 4 are selected by the multiplexer 727 in response to the header select signals H2, H3 and H4 as they occur from the sequencer 709.

As will be seen, the octet intraframe switching is more conveniently facilitated with an even number of octets per cell rather than the odd number of octets specified in the ATM standard. In this example the odd number of octets is altered to be an even number of octets by stuffing an extra octet at the end of the series of the header octets. The fifth received octet is clocked into the latch 601. In the following cycle, the RFCLK clock signal for port 1 is inhibited so that the fifth received octet is also clocked into the latch 602. By this method, 54 timeslot periods are occupied in reading all the 53 octets of the received cell.

The remaining 48 octets of the cell are payload octets. The payload octets are paired into 24 payload words which are interleaved with the 24 payload words received from each of the four ports by the multiplexer 728 which is responsive to payload select signals P1, P2, P3 and P4 from the sequencer 709. Each payload word selected by the multiplexer 728 is delayed by two clock cycles through 16 bit latches 610 and 611 prior to being driven from the output IDAT(15:0) of the latch 612 onto the receive TDM bus A 546.

Figure 11:
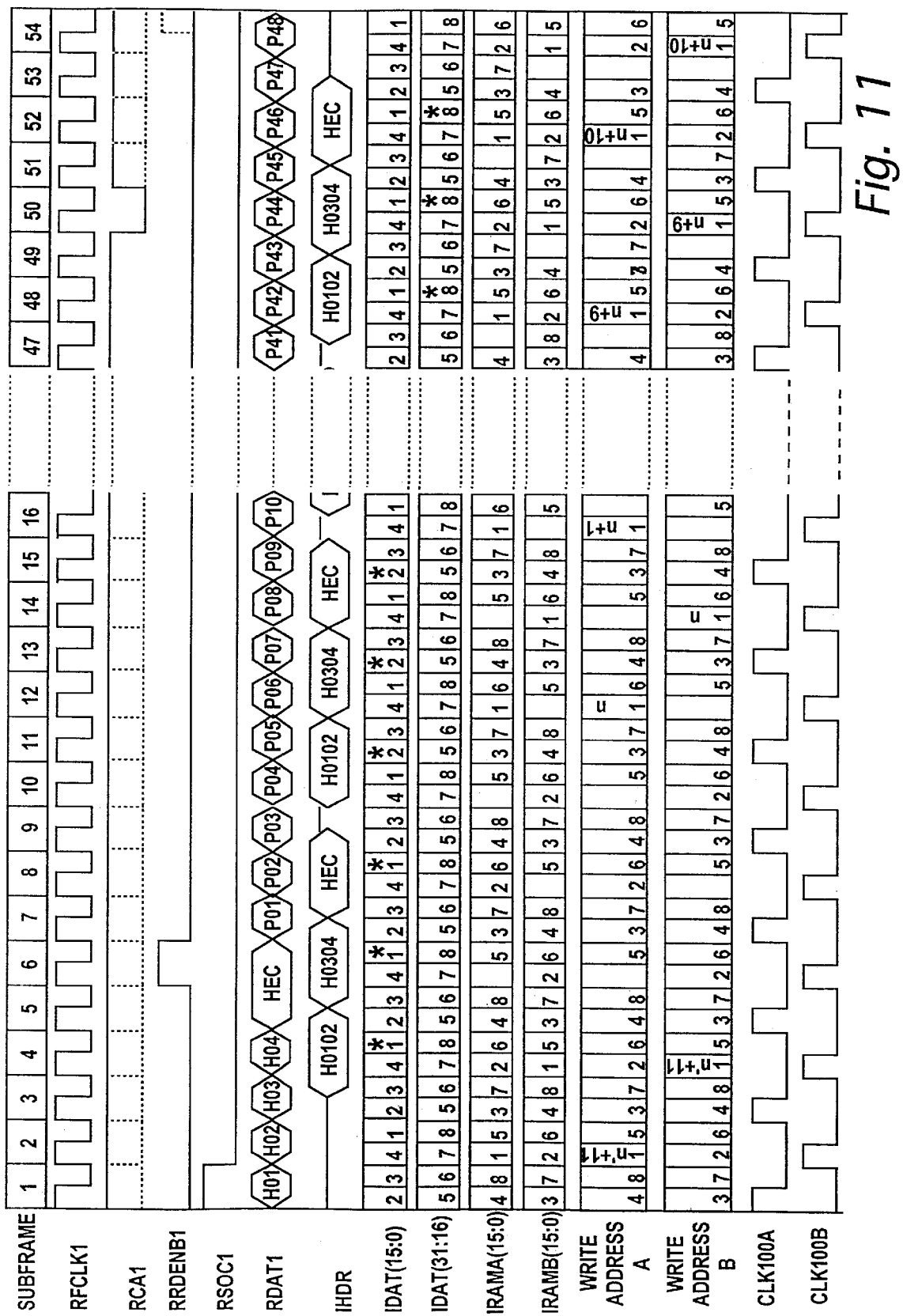
FIG. 11 is a timing diagram illustrating timing of a process in which ingress information is stored by the switching apparatus of FIG. 7, for subsequent transmission therethrough.

Table 1 taken together with FIG. 11 illustrates an example of progressions of cell octets having been gathered from the SUNI ports by the access units 501 and 502, as cell payload octets are presented via the IDAT bus and subsequently octets as they are presented via buses IRAMA and IRAMB to a pair of memory devices within the asynchronous buffer memory 560, and which are illustrated in some detail in FIG. 12.

TABLE 1

| PORT NUMBER | IDAT (15:0) | PORT NUMBER | IDAT (31:15) | PORT NUMBER | IRAMA (15:0) | PORT NUMBER | IRAMB (31:16) |
|---|---|---|---|---|---|---|---|
| 2 | 39, 40 | 5 | 21, 22 | 4 | 25, 26 | 3 | 31, 32 |
| 3 | 33, 34 | 6 | 15, 16 | 8 | 01, 02 | 7 | 07, 08 |
| 4 | 27, 28 | 7 | 09, 10 | 1 | 45, 46 | 2 | 39, 40 |
| 1 | 47, 48 | 8 | 03, 04 | 5 | 21, 22 | 6 | 15, 16 |
| 2 | 41, 42 | 5 | 23, 24 | 3 | 33, 34 | 4 | 27, 28 |
| 3 | 35, 36 | 6 | 17, 18 | 7 | 09, 10 | 8 | 03, 04 |
| 4 | 29, 30 | 7 | 11, 12 | 2 | 41, 42 | 1 | 47, 48 |
| 1 | BLANK | 8 | 05, 06 | 6 | 17, 18 | 5 | 23, 24 |
| 2 | 43, 44 | 5 | 25, 26 | 4 | 29, 30 | 3 | 35, 36 |
| 3 | 37, 38 | 6 | 19, 20 | 8 | 05, 06 | 7 | 11, 12 |
| 4 | 31, 32 | 7 | 13, 14 | NONE | | 2 | 43, 44 |
| 1 | BLANK | 8 | 07, 08 | 5 | 25, 26 | 6 | 19, 20 |
| 2 | 45, 46 | 5 | 27, 28 | 3 | 37, 38 | 4 | 31, 32 |
| 3 | 39, 40 | 6 | 21, 22 | 7 | 13, 14 | 8 | 07, 08 |
| 4 | 33, 34 | 7 | 15, 16 | 2 | 45, 46 | NONE | |
| 1 | BLANK | 8 | 09, 10 | 6 | 21, 22 | 5 | 27, 28 |
| 2 | 47, 48 | 5 | 29, 30 | 4 | 33, 34 | 3 | 39, 40 |
| 3 | 41, 42 | 6 | 23, 24 | 8 | 09, 10 | 7 | 15, 16 |
| 4 | 35, 36 | 7 | 17, 18 | NONE | | 2 | 43, 44 |
| 1 | 01, 02 | 8 | 11, 12 | 5 | 29, 30 | 6 | 23, 24 |
| 2 | BLANK | 5 | 31, 32 | 3 | 41, 42 | 4 | 35, 36 |
| 3 | 43, 44 | 6 | 25, 26 | 7 | 17, 18 | 8 | 11, 12 |
| 4 | 37, 38 | 7 | 19, 20 | 1* | 01, 02 | NONE | |
| 1 | 03, 04 | 8 | 13, 14 | 6 | 25, 26 | 5 | 31, 32 |
| 2 | BLANK | 5 | 33, 34 | 4 | 37, 38 | 3 | 43, 44 |
| 3 | 45, 46 | 6 | 27, 28 | 8 | 13, 14 | 7 | 19, 20 |
| 4 | 39, 40 | 7 | 21, 22 | NONE | | 1* | 03, 04 |
| 1 | 05, 06 | 8 | 15, 16 | 5 | 33, 34 | 6 | 27, 28 |
| 2 | BLANK | 5 | 35, 36 | 3 | 45, 46 | 4 | 39, 40 |
| 3 | 47, 48 | 6 | 29, 30 | 7 | 21, 22 | 8 | 15, 16 |
| 4 | 41, 42 | 7 | 23, 24 | 1 | 05, 06 | NONE | |
| 1 | 07, 08 | 8 | 17, 18 | 6 | 29, 30 | 5 | 35, 36 |
| — | — | — | — | — | — | — | — |
| — | — | — | — | — | — | — | — |
| 2 | 31, 32 | 5 | 13, 14 | 4 | 17, 18 | 3 | 23, 24 |
| 3 | 25, 26 | 6 | 07, 08 | NONE | | 8 | 47, 48 |
| 4 | 19, 20 | 7 | 01, 02 | 1 | 37, 38 | 2 | 31, 32 |
| 1 | 39, 40 | 8 | BLANK | 5 | 13, 14 | 6 | 07, 08 |
| 2 | 33, 34 | 5 | 15, 16 | 3 | 25, 26 | 4 | 19, 20 |
| 3 | 27, 28 | 6 | 09, 10 | 7* | 01, 02 | NONE | |
| 4 | 21, 22 | 7 | 03, 04 | 2 | 33, 34 | 1 | 39, 40 |
| 1 | 41, 42 | 8 | BLANK | 6 | 09, 10 | 5 | 15, 16 |
| 2 | 35, 36 | 5 | 17, 18 | 4 | 21, 22 | 3 | 27, 28 |
| 3 | 29, 30 | 6 | 11, 12 | NONE | | 7* | 03, 04 |
| 4 | 23, 24 | 7 | 05, 06 | 1 | 41, 42 | 2 | 35, 36 |
| 1 | 43, 44 | 8 | BLANK | 5 | 17, 18 | 6 | 11, 12 |
| 2 | 37, 38 | 5 | 19, 20 | 3 | 29, 30 | 4 | 23, 24 |
| 3 | 31, 32 | 6 | 13, 14 | 7 | 05, 06 | NONE | |
| 4 | 25, 26 | 7 | 07, 08 | 2 | 37, 38 | 1 | 43, 44 |
| 1 | 45, 46 | 8 | 01, 02 | 6 | 13, 14 | 5 | 19, 20 |

Each of the time lines in FIG. 11 are labelled at the left side of the sheet and are as follows:

Subframe—a cell of 54 octet periods of 51.4 ns each;
RFCLK1—receive clock for port 1;
RCA1—receive enable flag for port 1 (active when high);
RWDENB1—receive write enable for port 1 (active when low);
RSOC1—receive start of cell signal for port 1;
RDAT1—receive port 1 header octets Hxx and payload octets Pxx;
IHDR—ingress header octets Hxx,xx from 8 ports;
IDAT (15:0)—ingress payload octets Pxx,xx from ports 1–4;
IDAT (31:16)—ingress payload octets Pxx,xx from ports 5–8;
IRAMA—payload octet pairs delivered for storage in one half of the asynchronous buffer memory 560;
IRAMB—payload octet pairs delivered for storage in the other half of the asynchronous buffer memory 560;
WRITE ADDRESS A—memory pointers n, for IRAMA octets;
WRITE ADDRESS B—memory pointers n, for IRAMB octets;
CLK100A—clock signal with a period of 102.8 ns; and
CLK100B—clock signal shifted 180° with respect to CLK100A.

The IDAT (15:0) and IDAT (31:16) time lines in FIG. 11 taken with reference to table 1, illustrate a progression of pairs of octets of payload data originating from the ports 1–4 and from the ports 5–8 respectively, as these are transported onto the receive TDM bus A 546. Those timeslots marked "*" are blank as these correspond to header octet occurrences. Header octets are excluded from the payload octet progressions on the IDAT bus. IRAMA illustrates delivery of pairs of octets of payload data referenced to the ports of origination as indicated in table 1, starting in a series, port 4 p25,26; port 8 p01,02; port 1 p45,46; and so on. IRAMB illustrates delivery of pairs of octets of payload data referenced to the ports of origination as indicated in table 1, starting in a series, port 3 p31,32; port 7 p07,08; port 2 P39,40; and so on. WRITE ADDRESS A and WRITE ADDRESS B illustrate memory pointers n–u provided by the memory controller 580 for addressing storage locations in the asynchronous buffer memory 560, wherein the memory pointers n–u correspond to ports 1–8 respectively and are incremented in a series, for example in the case of port 1, n, n+1, . . . , n+11, during storage of a cell being read from port 1.

Cells are read from port 1 via the bus RDAT1 at time intervals shown, at RDAT1 in FIG. 11, as being sampled by the RFCLK1, having a period of 51.4 ns. Each cell includes 4 header octets labelled H01-H04 and a fifth header error check octet labelled HEC. The reading of the next octet labelled P01 is delayed by one clock period so that it appears that the fifth header octet occupies twice the time interval of any other octet. Consequently the reading of a cell occupies a time of one extra octet, that is 54 octets, a reading interval of 2775.6 ns. The reading of the cell's header octets is followed by the reading of the cell's payload octets P01–P48, as shown at RDAT1. This facilitates the latching of the header octets in pairs, from the lower and upper access units 501 and 502, as sixteen bit words onto the IHDR bus parallel conduit groups (15:0)(31:16), as illustrated at IHDR in FIG. 11. The first 2 header octets are shown to be latched in parallel onto the bus 544, via the latch 609, beginning about 103 ns after the first header octet was received. The receive TDM bus A 546 transports payload octets in groups of four every 25.7 ns which results in a maximum operating bit transfer of about 1.2 Gb/s. Referring to FIG. 12 the asynchronous buffer memory 560 introduced in FIG. 7, is illustrated in greater detail.

Figure 12:
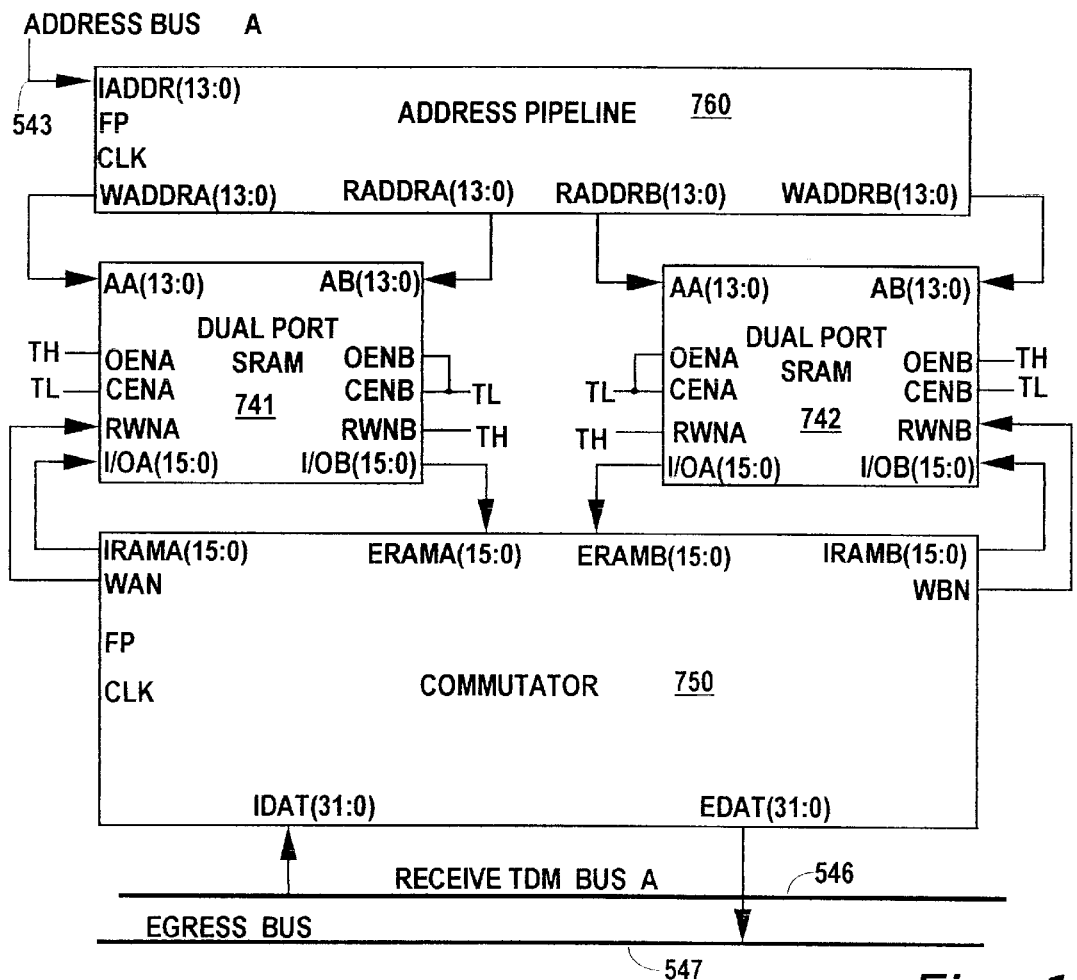
FIG. 12 is a block schematic diagram illustrating an asynchronous buffer memory unit for use in the switching apparatus of FIG. 7.

In FIG. 12, first and second dual input/output port static random access memories (SRAMs) 741 and 742 each have identical A and B ports illustrated at left and right sides thereof respectively. As illustrated the SRAMs include 14 bit A and B address ports labelled AA and AB, and 16 bit write/read ports labelled I/OA and I/OB. The SRAMs also have control inputs OENA, OENB to independently enable reading at the respective I/OA and I/OB ports; a control input CENA which must be held low to enable the A port related portions of the SRAM; control input CENB which must be held low to enable the B port related portions of the SRAM; and control inputs RWNA and RWNB. TL indicates tide low, that is permanently connected to a low logic level, and TH indicates tide high, that is permanently connected to a high logic level. The SRAMs used in this example are commonly available with the commercial identification number IDT7026S/L from Integrated Device Technology, Inc. at 2975 Stender Way, Santa Clara, Calif. USA 95054. A commutator 750 is arranged to transport octets from the receive TDM bus A 546 to the SRAMs 741 and 742 and to transport octets from the SRAMs 741 and 742 to the egress bus 547. An address pipeline 760 is arranged to apply addresses received from the memory controller 580 via the address bus A 543, in order to select read and write storage locations in the SRAMs 741 and 742. In this example the address pipeline 760 was provided by a gate array having a commercial part number EPF8282 available from Altera Corporation, at 2610 Orchard Parkway, San Jose, Calif. USA 95134-2020. The SRAM 741 is connected as shown, such that its B port is restricted to reading data out only and its A port can be enabled by the commutator 750 for writing data in only. The SRAM 742 is connected such that its A port is restricted to reading data out only and its B port can be enabled by the commutator 750 for writing data in only. A fixed timing relationship between a particular I/O timeslot occurrence on the IDAT and EDAT busses and the timeslot is established to facilitate the transfer of a read/write address on the address bus A 543, simultaneously with an appearance of payload data during a memory access cycle. FIG. 11 and table 1 illustrate the arrival of a payload word 01,02, from the port 1, at the data input port IRAMA of the SRAM 741, during timeslot 23 (subframe 12). Simultaneously the write address WADDRA "n" is presented to the SRAM 741 address port AA, by the address pipeline 760. A memory pointer is generated by the memory controller 580 when it associates the header words h01,02 and h03,04 of the port 1 with a storage area in the SRAMs 741 and 742, which is available for storing the payload words, following from port 1. The payload words of the cell are subsequently distributed over the two SRAMs 741 and 742 which are addressed to alternately write the incoming payload words between the SRAMs 741 and 742. For example, the first payload word P01,02 appears during timeslot 26 and is routed to the SRAM 741 such that the payload word is written to the address location "n". The second payload word 03,04 appears during timeslot 27 and is routed to the SRAM 742 where it is written to a similar address location "n". Once the first two words are stored, the pipelined address for port 1 is incremented by the memory controller 580 to "n+1", in preparation for receiving and storing the next two payload words. This process continues until all 24 payload word pairs (48 octets) have been deposited at the 12 assigned storage locations in the two SRAMs 741 and 742. In this example each storage location assignment consists of a group of 12 contiguous addresses. An identical process occurs during each of the timeslots allocated to the remaining ports, provided that a given port has a complete cell of data ready for transport. The commutating structure, has the effect of dynamically coupling the memory I/O to a port in a periodic manner which causes the transfer rate of the two SRAMs 741 and 742 to match the rate at which the octets are transmitted via the receive TDM bus A 546. The arrival of another cell at port 1, having an identical header, may be conveniently stored in the SRAMs 741 and 742, at a storage location contiguous with the storage location of a previously received cell, or it can be stored at a some other storage location.

Assignments of storage locations in the SRAMs 741 and 742 are effected by the memory controller 580. The memory controller 580 generates pointers and increments of the memory pointers for addressing the SRAMs 741 and 742, to effect a FIFO memory function for each virtual path VP associated with a logical trunk. Within a virtual path VP, a variable number of virtual connections VCs are provided in accordance with the size of the current TDM frame that is being transported. Any one of the virtual connections VCs is associated with a particular segment of the TDM frame. By mapping each payload into the respective segment of memory, a composite image of channelized frame data is reassembled. Each virtual path VP is effectively provided with an elastic store of received TDM frames by the asynchronous memory buffer 560. The reconstructed frames are then available, at the discretion of the memory controller 580, for transfer to the synchronous DS0 interchange memory 520 by sequentially reading the group of received cells that represents a complete TDM frame. The memory controller 580 directs the operation of the asynchronous buffer memory 560 in payload word storage and retrieval to effect a FIFO function for each virtual connection VC of a bursty nature, to average out the bursty characteristics of data services. As before mentioned, FIG. 13 shows an example of an ingress portion of the commutator 750 for transferring payload data from the receive TDM bus 546 to the dual port SRAMs 741 and 742.

Figure 13:
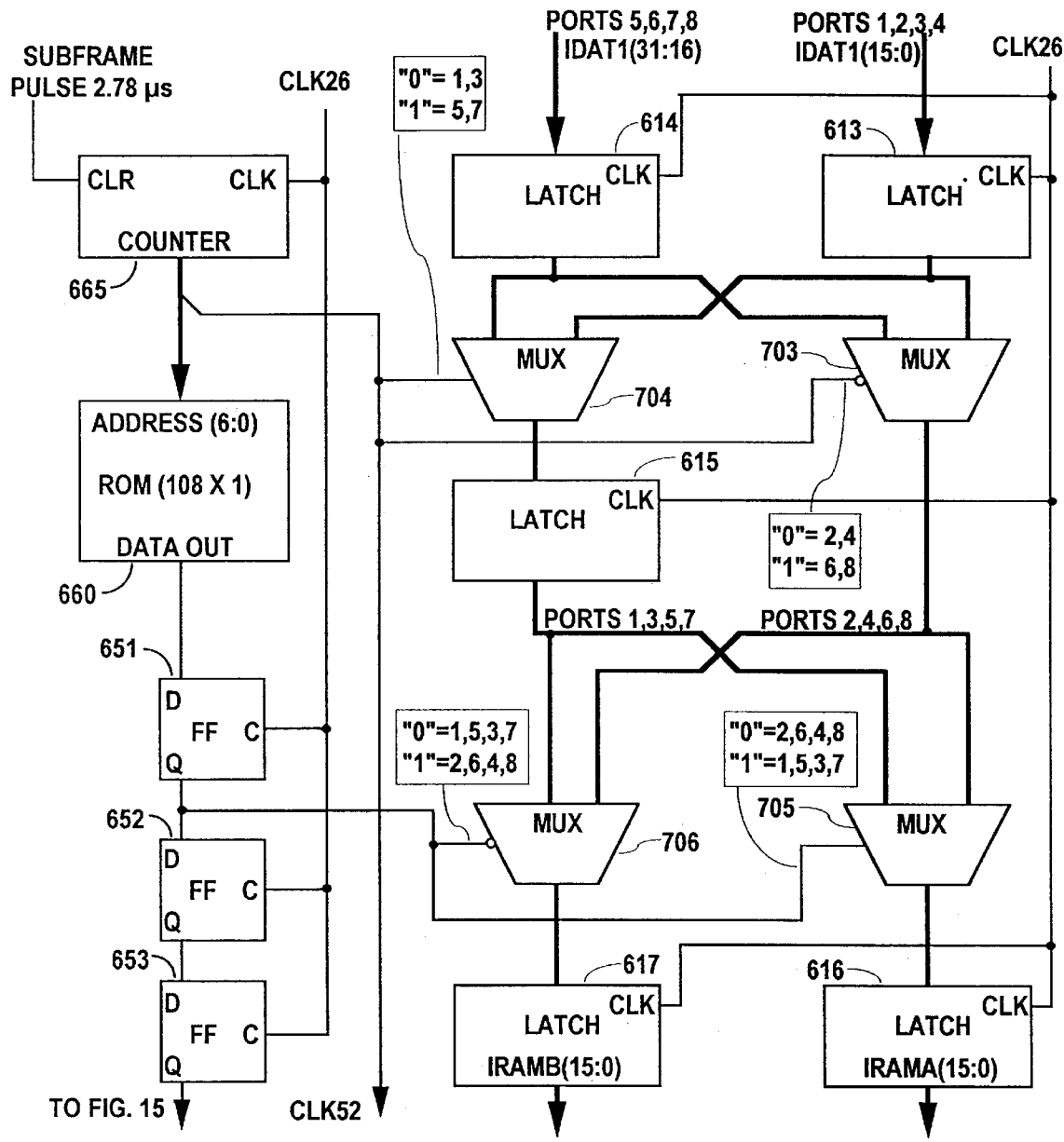
FIG. 13 is a block schematic diagram illustrating an ingress commutator used in the asynchronous buffer memory unit of FIG. 12.

Referring to FIG. 13, a counter 665 is initialized with each occurrence of the 2,780 ns subframe pulse and is driven by the CKL26 25.7 ns clock to provide 108 addresses corresponding to the 108 timeslots. The 108 addresses are used to address a read only memory 660 which provides a one bit output sequence as indicated in table 2.

TABLE 2

| TS | O | TS | O | TS | O | TS | O | TS | O | TS | O | TS | O | TS | O | TS | O |
|---|---|---|---|---|---|---|---|---|---|---|---|---|---|---|---|---|---|
| 001 | 0 | 013 | 1 | 025 | 0 | 037 | 1 | 049 | 0 | 061 | 1 | 073 | 0 | 085 | 1 | 097 | 1 |
| 002 | 1 | 014 | 0 | 026 | 0 | 038 | 1 | 050 | 0 | 062 | 1 | 074 | 0 | 086 | 1 | 098 | 0 |
| 003 | 1 | 015 | 0 | 027 | 1 | 039 | 0 | 051 | 0 | 063 | 0 | 075 | 0 | 087 | 1 | 099 | 0 |
| 004 | 1 | 016 | 0 | 028 | 1 | 040 | 0 | 052 | 0 | 064 | 1 | 076 | 0 | 088 | 1 | 100 | 0 |
| 005 | 1 | 017 | 0 | 029 | 1 | 041 | 0 | 053 | 1 | 065 | 0 | 077 | 1 | 089 | 0 | 101 | 0 |
| 006 | 0 | 018 | 1 | 030 | 1 | 042 | 0 | 054 | 1 | 066 | 0 | 078 | 1 | 090 | 0 | 102 | 1 |
| 007 | 0 | 019 | 1 | 031 | 0 | 043 | 1 | 055 | 0 | 067 | 1 | 079 | 1 | 091 | 0 | 103 | 1 |
| 008 | 0 | 020 | 1 | 032 | 0 | 044 | 1 | 056 | 1 | 068 | 0 | 080 | 1 | 092 | 0 | 104 | 1 |
| 009 | 0 | 021 | 1 | 033 | 0 | 045 | 1 | 057 | 0 | 069 | 1 | 081 | 0 | 093 | 1 | 105 | 1 |
| 010 | 1 | 022 | 1 | 034 | 0 | 047 | 1 | 058 | 0 | 070 | 1 | 082 | 0 | 094 | 1 | 106 | 0 |
| 011 | 1 | 023 | 0 | 035 | 1 | 047 | 0 | 059 | 1 | 071 | 1 | 083 | 0 | 095 | 1 | 107 | 0 |
| 012 | 1 | 024 | 0 | 036 | 1 | 048 | 1 | 060 | 0 | 072 | 1 | 084 | 0 | 096 | 1 | 108 | 0 |

Figure 15:
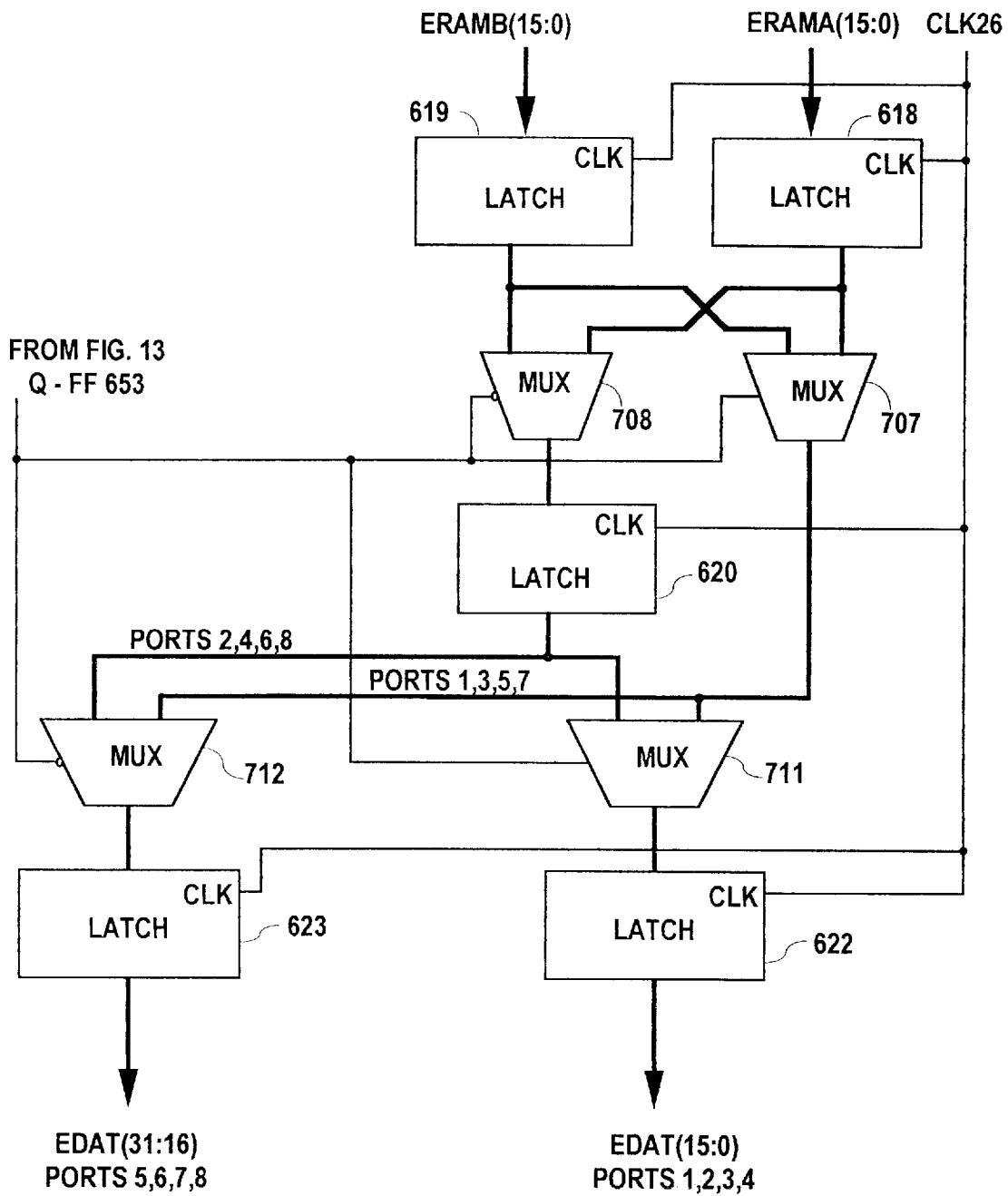
FIG. 15 is a block schematic diagram illustrating an egress commutator of the asynchronous buffer memory unit of FIG. 12.

D type flip flops 651, 652 and 653 add three clock delays to the one bit output sequence, with the output of the D type flip flop 653 being provided for operation of circuitry in FIG. 15. Ingress payload words from the ports 1, 2, 3, and 4, and ingress payload words from the ports 5, 6, 7 and 8 are timed by latches 613 and 614 and applied at respective inputs of multiplexers 703 and 704. The least significant bit from the counter 665 toggles at half the CKL26 rate and is used to operate the multiplexers 703 and 704 such that payload words as they appear from the even numbered ports are passed by the multiplexer 703 and payload words as they appear from the odd numbered ports are passed by the multiplexer 704. Hence the even port payload words are coupled directly to inputs of multiplexers 705 and 706, and the odd port payload words are coupled indirectly to inputs of the multiplexers 705 and 706 via a latch 615 which adds a delay of one clock period. The multiplexers 705 and 706 are operated by the one bit output sequence (table 2)delayed by one clock period as it appears at the Q output of the D type flip flop 651. With each "0" logic level occurrence of the Q output, payload words from any of ports 2, 4, 6 and 8 are passed by the multiplexer 705, while with each "1" logic level occurrence of the Q output, payload words from any of ports 1, 3, 5 and 7 are passed by the multiplexer 705 to the SRAM 741. With each "0" logic level occurrence of the Q output, payload words from any of ports 1, 3, 5 and 7 are passed by the multiplexer 706, while with each "1" logic level occurrence of the Q output, payload words from any of ports 2, 4, 6 and 8 are passed by the multiplexer 706 to the SRAM 742.

Figure 14:
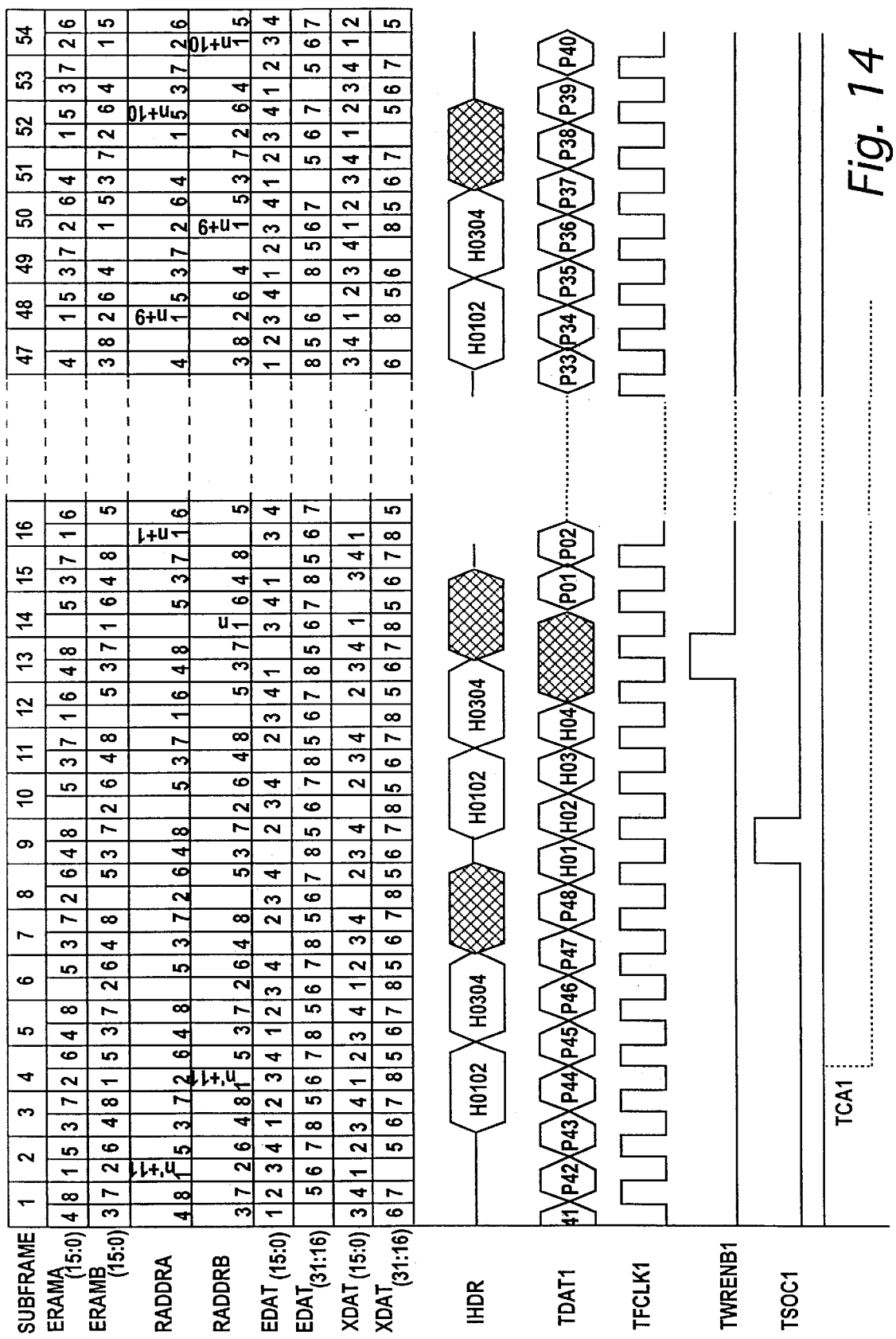
FIG. 14 is a timing diagram illustrating timing of a process in which ingressed information is processed for egress from the switching apparatus of FIG. 7.
Figure 16:
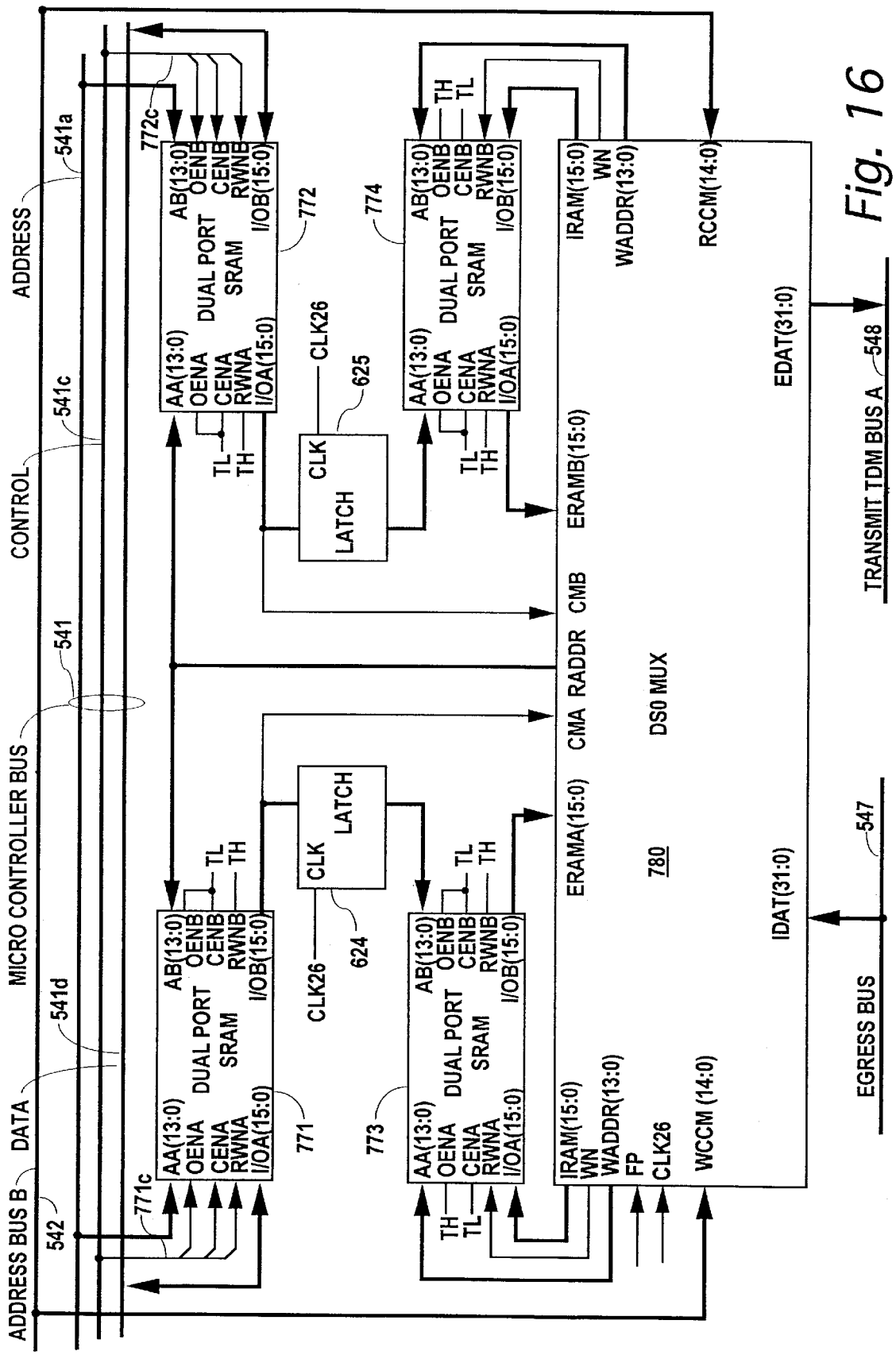
FIG. 16 is a block schematic diagram illustrating a synchronous DS0 interchange memory used in the switching apparatus of FIG. 7.

The timing diagram of FIG. 14 taken together with table 3 illustrates a process by which ingressed information is buffered for transport onto the egress bus 547 by the asynchronous buffer memory 560 preparatory to the octet intraframe timeslot switching of those cells having payloads of isochronous data by the synchronous DS0 interchange memory shown in some detail in FIGS. 15 and 16.

Table 3 taken together with FIG. 14 shows an example of progressions of cell octets, related to the SUNI port numbers, PN, shown in six columns in the table, as the cell octets are read out from the SRAMs 741 and 742 into the ERAMA and ERAMB inputs of the commutator 750. The SRAMs 741 and 742 are read in response to read addresses RADDRA and RADDRB being applied to the address ports of the SRAMs 741 and 742 from the address pipeline 760. Each four octets, ERAMA and ERAMB, are combined to produce the four octet payload words of EDAT on the egress bus 547. Instead of routing the EDAT octets directly to the access units 501 and 502, these egress payload data octets are routed to a DS0 multiplexer in the synchronous DS0 interchange memory 520, where a routing decision is made which results in one of the following:

a) passing the EDAT payload octets through as exit payload octets XDAT onto the TDM bus A 548;

b) storing EDAT payload data octets in the synchronous DS0 interchange memory 520, and simultaneously reading intraframe switched XDAT payload data octets from the synchronous DS0 interchange memory 520 onto the TDM bus A 48;

c) storing the EDAT payload data octets in the synchronous DS0 interchange memory 520, without passing any XDAT payload data octets through onto the TDM bus A 548; and d) in an event of no egress data being available from the asynchronous buffer memory 560, reading XDAT payload data octets from the synchronous DS0 interchange memory 520 onto the TDM bus A 548.

TABLE 3

| PN | ERAMA 15:0 | PN | ERAMB 31:15 | PN | EDAT 15:0 | PN | EDAT 31:16 | PN | XDAT 15:0 | PN | XDAT 31:16 |
|---|---|---|---|---|---|---|---|---|---|---|---|
| 4 | 25,26 | 3 | 31,32 | 1 | 43,44 | — | NONE | 4 | 23,24 | 7 | 05,06 |
| 8 | 01,02 | 7 | 07,08 | 2 | 37,38 | 5 | 19,20 | 1 | 43,44 | — | NONE |
| 1 | 45,46 | 2 | 39,40 | 3 | 31,32 | 6 | 13,14 | 2 | 37,38 | 5 | 19,20 |
| 5 | 21,22 | 6 | 15,16 | 4 | 25,26 | 7 | 07,08 | 3 | 31,32 | 6 | 13,14 |
| 3 | 33,34 | 4 | 27,28 | 1 | 45,46 | 8 | 01,02 | 4 | 25,26 | 7 | 07,08 |
| 7 | 09,10 | 8 | 03,04 | 2 | 39,40 | 5 | 21,22 | 1 | 45,46 | 8 | 01,02 |
| 2 | 41,42 | 1 | 47,48 | 3 | 33,34 | 6 | 15,16 | 2 | 29,40 | 5 | 21,22 |
| 6 | 17,18 | 5 | 23,24 | 4 | 27,28 | 7 | 09,10 | 3 | 33,34 | 6 | 15,16 |
| 4 | 29,30 | 3 | 35,36 | 1 | 47,48 | 8 | 03,04 | 4 | 27,28 | 7 | 09,10 |
| 8 | 05,06 | 7 | 11,12 | 2 | 41,42 | 5 | 23,24 | 1 | 47,48 | 8 | 03,04 |
| — | NONE | 2 | 43,44 | 3 | 35,36 | 6 | 17,18 | 2 | 41,42 | 5 | 23,24 |
| 5 | 25,26 | 6 | 19,20 | 4 | 29,30 | 7 | 11,12 | 3 | 35,36 | 6 | 17,18 |
| 3 | 37,38 | 4 | 31,32 | — | NONE | 8 | 05,06 | 4 | 29,30 | 7 | 11,12 |
| 7 | 13,14 | 8 | 07,08 | 2 | 43,44 | 5 | 25,26 | — | NONE | 8 | 05,06 |
| 2 | 45,46 | — | NONE | 3 | 37,38 | 6 | 19,20 | 2 | 43,44 | 5 | 25,26 |
| 6 | 21,22 | 5 | 27,28 | 4 | 31,32 | 7 | 13,14 | 3 | 37,38 | 6 | 19,20 |
| 4 | 33,34 | 3 | 39,49 | — | NONE | 8 | 07,08 | 4 | 31,32 | 7 | 13,14 |
| 8 | 09,10 | 7 | 15,16 | 2 | 45,46 | 5 | 27,28 | — | NONE | 8 | 07,08 |
| — | NONE | 2 | 47,48 | 3 | 39,40 | 6 | 21,22 | 2 | 45,46 | 5 | 27,28 |
| 5 | 29,30 | 6 | 23,24 | 4 | 33,34 | 7 | 15,16 | 3 | 39,40 | 6 | 21,22 |
| 3 | 41,42 | 4 | 35,36 | — | NONE | 8 | 09,10 | 4 | 33,34 | 7 | 15,16 |
| 7 | 17,18 | 8 | 11,12 | 2 | 47,48 | 5 | 29,30 | — | NONE | 8 | 09,10 |
| 1 | 01,02 | — | NONE | 3 | 41,42 | 6 | 23,24 | 2 | 47,48 | 5 | 29,30 |
| 6 | 25,26 | 5 | 31,32 | 4 | 35,36 | 7 | 17,18 | 3 | 41,42 | 6 | 23,24 |
| 4 | 37,38 | 3 | 43,44 | 1 | 01,02 | 8 | 11,12 | 4 | 35,36 | 7 | 17,18 |
| 8 | 13,14 | 7 | 19,20 | — | NONE | 5 | 31,32 | 1 | 01,02 | 8 | 11,12 |
| — | NONE | 1 | 03,04 | 3 | 43,44 | 6 | 25,26 | — | NONE | 5 | 31,32 |
| 5 | 33,34 | 6 | 27,28 | 4 | 37,38 | 7 | 19,20 | 3 | 43,44 | 6 | 25,26 |
| 3 | 45,46 | 4 | 39,40 | 1 | 03,04 | 8 | 13,14 | 4 | 37,38 | 7 | 19,20 |
| 7 | 21,22 | 8 | 15,16 | — | NONE | 5 | 33,34 | 1 | 03,04 | 8 | 13,14 |
| 1 | 05,06 | — | NONE | 3 | 45,46 | 6 | 27,28 | — | NONE | 5 | 33,34 |
| 6 | 29,30 | 5 | 35,36 | 4 | 39,40 | 7 | 21,22 | — | — | — | — |
| — | — | — | — | — | — | — | — | 3 | 21,22 | 6 | 03,04 |
| 4 | 17,18 | 3 | 23,24 | 1 | 35,36 | 8 | 45,46 | 4 | 15,16 | — | NONE |
| — | NONE | 8 | 47,48 | 2 | 29,30 | 5 | 11,12 | 1 | 35,36 | 8 | 45,46 |
| 1 | 37,38 | 2 | 31,32 | 3 | 23,24 | 6 | 05,06 | 2 | 29,30 | 5 | 11,12 |
| 5 | 13,14 | 6 | 07,08 | 4 | 17,18 | — | NONE | 3 | 23,24 | 6 | 05,06 |
| 3 | 25,26 | 4 | 19,20 | 1 | 37,38 | 8 | 47,48 | 4 | 17,18 | — | NONE |
| 7 | 01,02 | — | NONE | 2 | 31,32 | 5 | 13,14 | 1 | 37,38 | 8 | 47,48 |
| 2 | 33,34 | 1 | 39,40 | 3 | 25,26 | 6 | 07,08 | 2 | 31,32 | 5 | 13,14 |
| 6 | 09,10 | 5 | 15,16 | 4 | 19,20 | 7 | 01,02 | 3 | 25,26 | 6 | 07,08 |
| 4 | 21,22 | 3 | 27,28 | 1 | 39,40 | — | NONE | 4 | 19,20 | 7 | 01,02 |
| — | NONE | 7 | 03,04 | 2 | 33,34 | 5 | 15,16 | 1 | 39,40 | — | NONE |
| 1 | 41,42 | 2 | 35,36 | 3 | 27,28 | 6 | 09,10 | 2 | 33,34 | 5 | 15,16 |
| 5 | 17,18 | 6 | 11,12 | 4 | 21,22 | 7 | 03,04 | 3 | 27,28 | 6 | 09,10 |
| 3 | 29,30 | 4 | 23,24 | 1 | 41,42 | — | NONE | 4 | 21,22 | 7 | 02,03 |
| 7 | 05,06 | — | — | 2 | 35,36 | 5 | 17,18 | 1 | 41,42 | — | NONE |
| 2 | 37,38 | 1 | 43,44 | 3 | 29,30 | 6 | 11,12 | 2 | 35,36 | 5 | 17,18 |
| 6 | 13,14 | 5 | 19,20 | 4 | 23,24 | 7 | 05,06 | 3 | 29,30 | 6 | 11,12 |

The operations of the asynchronous buffer memory 560 are synchronized with the subframe timing as shown at the top of FIG. 14. The stream of I/O (15:0) output data words from the dual port SRAM 741 is exemplified at ERAMA (15:0) as being destined for the ports 1–8 in an order of port 4, port 8, port 1, and so on, while the I/OA (15:0) output data words from the dual port SRAM 742 is exemplified at ERAMB(15:0) as being destined for the ports 1–8 in an order of port 3, port 7, port 2, and so on. Cell payload transmittal destined for any port is shared between the SRAMs 741 and 742. This is illustrated with reference to the ERAMA and ERAMB illustrations, wherein port 1 destined payload octets 45 and 46 first appear in ERAMA to be followed 102.8 ns later by port 1 destined octets 47 and 48 appearing in ERAMB, which in turn are followed about 437 ns later by port 1 destined payload octets 01 and 02 of the next cell. The gap of (437–102) an apparent extra 335 ns or so, between payload octets destined for port 1, is that which corresponds to the next cell's header octets. Header octets are not buffered by the asynchronous buffer memory 560. A row labelled RADDRA represents an address stream that is directed to the B readout address port of the SRAM 741, and a row labelled RADDRB represents an address stream that is directed to the A readout address port of the SRAM 742.

FIG. 15 is a block schematic diagram illustrating an egress portion of the commutator 750. The egress portion includes word latches 618–622 and multiplexers 707,708 and 711,712 connected as shown to transport 16 bit words read out from the SRAMs 741 and 742 onto the 32 bit lead wide egress bus 547, such that data destined for the ports 1–4 occupies leads 0–15, and data destined for the ports 5–8 occupies leads 16–31. The latches 618–622 each operate in response to the clock signal CKL26 and the multiplexers 707,708 and 711,712 operate in response to the delayed select signal from the Q output of the D type flip flop 653 in FIG. 13. Data from the I/OB port of the SRAM 741 is registered in the latch 618 each 25.7 ns and similarly data from the I/OA port of the SRAM 742 is registered in the latch 619. The multiplexers 707 and 709 are inversely responsive to the select signal, to alternately select data words momentarily registered in the latches 618 and 619 and destined for the ports 1, 3, 5 and 7, and the ports 2, 4, 6 and 8 respectively. The odd numbered port destined data words are passed directly to the multiplexers 711 and 712, while the even numbered port destined data words are passed to the latch 620 where they are retimed by the clock signal CKL26 before being passed on to the multiplexers 711 and 712. The latches 621 and 622 drive streams of data words which pass through the multiplexers 711 and 712 onto the leads 15–0 and 31–16 respectively of the egress bus 547, as is exemplified in FIG. 14 at rows labelled EDAT(15:0) and EDAT(31:16), and in the corresponding columns in table 3. These correspond to the bus 547 in FIG. 7.

The synchronous DS0 interchange memory 520, introduced in FIG. 7, is described in more detail with reference to FIG. 16. In FIG. 16, the synchronous DS0 interchange memory includes 4 dual port SRAMs 771, 772, 773 and 774, two 14 bit word latches 624 and 625 and a DS0 multiplexer 780. It would be sufficient to use only one pair of the dual port SRAMs, say for example 771 and 773, to provide the function of a DS0 buffer timeslot switch as is exemplified in FIG. 6, however improved system throughput of synchronous switched traffic is achieved in this example, by using the 4 dual port SRAMs as shown in FIG. 16. As reviewed in relation to FIG. 12, each of the SRAMs have A and B ports. The micro controller unit 550 of FIG. 7 provides connection memory data and for this purpose is coupled directly via the microcontroller bus 541 to the SRAMs 771 and 772. The micro controller bus 541 is shown in FIG. 16 to include address leads 541a, control leads 541c and data leads 541d. The SRAMs 771 and 772 store translation connection tables for effecting time switching of octets in the SRAMs 773 and 774 respectively. The A port of the SRAM 771 is accessed via the address leads 541a and three control leads 771c for writing and reading data via the data leads. The B ports of the SRAMs 771 and 773 are each wired to have the read functions continuously activated so that each I/OB port is effectively a continuous output port. The SRAM 771 responds to each address asserted at its AB address port to deliver 14 bits from its corresponding storage location, through its I/OB port via the word latch 624. The SRAM 773 responds to each address registered in the word latch 624 to deliver 16 bits from its corresponding storage location via its I/OB port to an ERAMA input of the DS0 multiplexer 780. Similarly, the B port of the SRAM 772 is accessed via the address leads 541a and three control leads 772c for writing and reading data via the data leads. The A ports of the SRAMs 772 and 774 are each wired to have their read function continuously active so that the I/OA ports are continuous output ports. The SRAM 772 responds to each address asserted at its address port AA to deliver 14 bits from its corresponding storage location through its I/OA port via the word latch 625. The SRAM 774 responds to each address registered in the word latch 625 to deliver 16 bits from its corresponding storage location via its I/OA port to an ERAMB input of the DS0 multiplexer 780.

Operation of the embodiment as thus far described is as follows. With SUNI port access being synchronized simultaneously at the XDAT bus for both memory units, the outgoing SUNI port receives an outgoing payload octet via one of two routes. One route is that of the asynchronous payloads of cells from the commutator 750 which are retimed through the DS0 multiplexer 780 without any modification of the payload data. The second rout is that of the isochronous payloads of cells which are diverted by the DS0 multiplexer 780 through the DS0 octet switching process before emerging from the DS0 multiplexer 780. Cells, entering the second route represent a TDM frame that is being transported from a virtual path VP FIFO in the asynchronous buffer memory 560 to what is in effect a common frame buffer, where the payload octets are stored for subsequent DS0 switching during the next 125 μs frame interval. While the next frame of payload octets is being stored, the previously stored octets are assembled in a new order to create an outgoing substitute payload of octets.

In control of the egress direction, the memory controller 580 passes a memory pointer onto the address bus A 543 and a memory pointer onto the address bus B 542, to allow the egress payload for a given port to be simultaneously accessed at the two memories 560 and 520. The outgoing header that is associated with the payload is passed to the access units for delivery to a given port via the transmit header bus 545. The payload octets are concatenated to the header octets to form 54 cell octets which are synchronously written into the SUNI unit of destination, however with one omission. The 54 octet cell is reduced to 53 octets by omitting the sixth octet of the cell. This octet is a duplicate of the fifth octet, that is the header error code HEC in the egress header and was previously added to expedite cell transport. The octet is removed at this point such that an exiting cell is consistent with the ATM recommended standard and compatible with the operation of the SUNI unit. The octet is removed by negating, or in other words inhibiting, the transmit write enable, TWRENB, for a selected one clock period of the transmit clock, TFCLK, which corresponds in time with the assertion of the sixth octet on the TDAT leads (7:0).

In the synchronous DS0 interchange memory 520, shown in detail in FIG. 16, the SRAMs 771 and 772 function as a DS0 connection memory. In other words the SRAMs 771 and 772 hold the read addresses which define the DS0 switching functions. The SRAMs 773 and 774 store incoming octet pairs in a predetermined fixed order of storage locations such that the random reads of the SRAMs 773 and 774 provide two sequences of octet pairs. The sequences are received at inputs ERAMA and ERAMB by the DS0 multiplexer 780 where one of two octets per timeslot are selected from each of the readouts to assemble the desired combination of octets for transmission. The SRAMs 773 and 774 are each loaded identically with the same octet pair from the egress bus 547 leaving the other octet pairs. Hence in this example only a maximum of half the ports can be accommodated at any one moment for DS0 switching. This is somewhat equivalent to concentration as it is in many STM facilities. As there are 44 isochronous payload usable cell occurrences of 48 payload octets each in the SONET frame from a maximum of 4 of the ports the SRAMs 773 and 774 in FIG. 16 act as a pair of variable delay lines of (44×48× 4)=8448 timeslot variance. The number of the 2.78 μs subframes used during an 125 μs period is conveniently variable to accommodate the isochronous bandwidth currently required of the switching system. This concentration function is in substantial contrast to STM switching systems where concentration is determined by a wired interconnect structure at the periphery of system, where in this example concentration is determined by the capacity of the SRAMs at the centre of the switching system. For example if only the SRAMs 771 and 773 were used and the SRAMs 772 and 774 were omitted, telephone traffic would suffer twice the concentration.

Operational memory access times of any conveniently available SRAM was found to be a limiting system performance factor, in the example embodiment. This limiting performance was ameliorated by using two of the SRAMs in combination with appropriate ingress and egress portions in the DS0 multiplexer 780. Pairs of octets of egress words can be selectively written from the asynchronous buffer memory 560 simultaneously into each SRAM 773 and 774 to create a pair of identical DS0 images. The readout is alternated through, the DS0 multiplexer 780, between the two SRAMs and hence the octet readout rate of the DS0 memory 520 is effectively doubled. Any two DS0 octets randomly selected from the SRAMs 773 and 774 respectively are combined as an outgoing octet pair for transport in any given time slot.

The DS0 multiplexer 780 is timed by the 125 $\mu$s frame pulses and the 25.7 ns clock CLK26 being coupled thereto via inputs marked FP and CLK26 respectively. The DS0 multiplexer 780 includes an IDAT input for accepting 32 bit words from the egress bus 547 and an XDAT output for transmitting 32 bit words onto the transmit TDM bus A 548. IRAM outputs provide identical octet pairs for storage in the SRAMs 773 and 774 at identical address locations as defined by write addresses coupled via outputs labelled WADDR. The write addresses are 24 address sequences, each sequence being developed from a root or connection memory pointer supplied from the memory controller 580 via the address bus B 542 and a write connection memory input labelled WCCM. ERAMA and ERAMB inputs receive selected readout octets being read from the SRAMs 773 and 774 respectively. Each read event is preceded by the presentation of related A and B least significant address bits at inputs labelled CMA and CMB.

Figure 17:
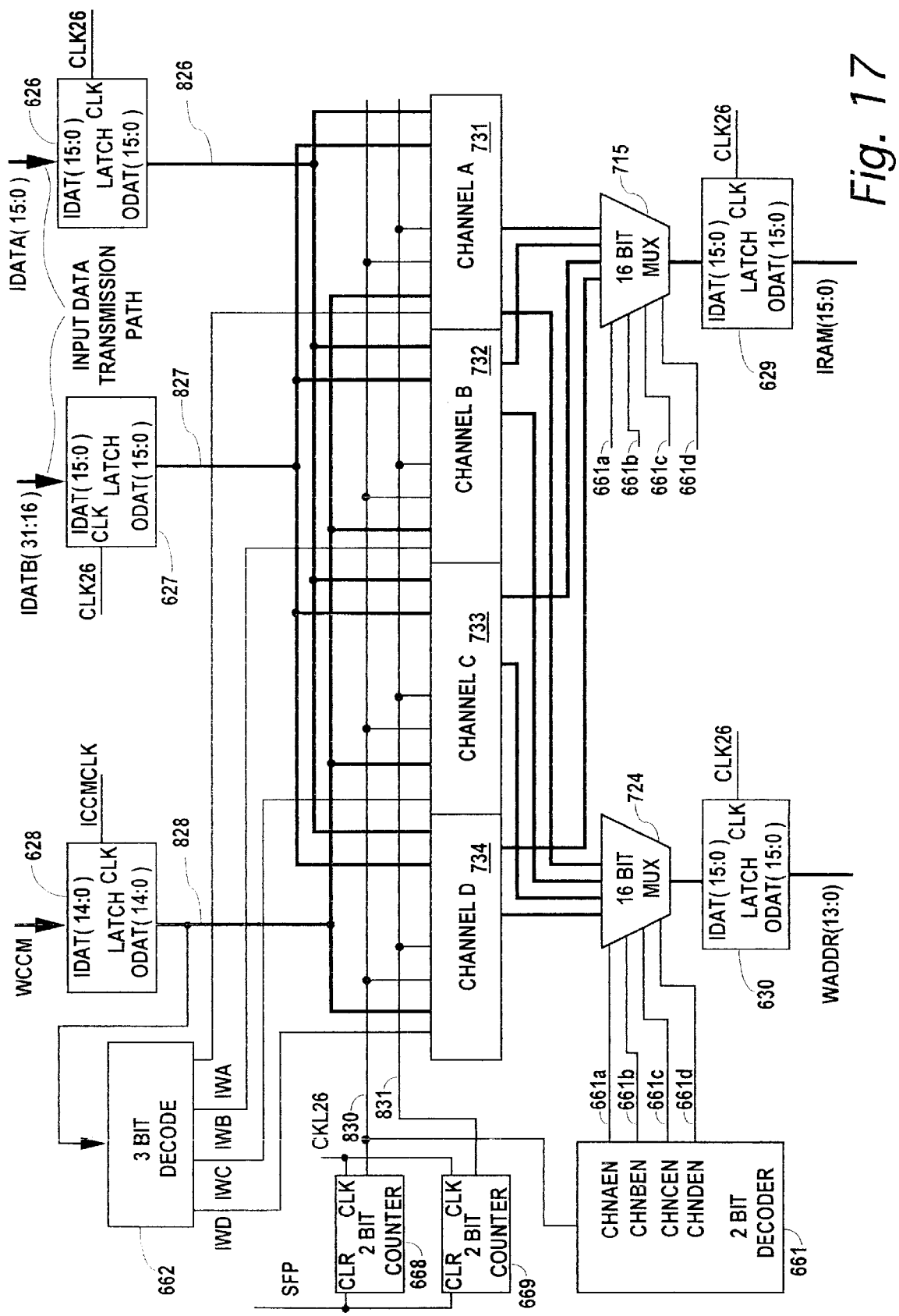
FIG. 17 is a block schematic diagram illustrating an ingress portion of an interface DS0 multiplexer used in the synchronous DS0 interchange memory of FIG. 16.

Referring to FIGS. 16 and 17 the ingress portion includes, latches 626 and 627 connected to clock words from the leads (15:0) and (31:16), of the egress bus 547, to local data buses 826 and 827, respectively. Write channel connection memory addresses WCCMs, of 15 bits, from a write address portion (not shown) in the address bus B 542 are clocked onto a local WCCM bus 828 through a latch 628 operated by an incoming channel connection memory clock ICCNM-CLK. The ICCNMCLK is provided from the memory controller 580 and has a pulse strobe width of about 26 ns. The ICCNMCLK clock is synchronized with the staggered header occurrences illustrated in FIG. 8 and occurs consistently throughout any one frame at a rate of eight times per subframe occurrence. A 3 bit decoder 662 asserts a sequence of four signals, IWA, IWB, IWC and IWD, by decoding the least three significant bits of the WCCMs from the latch 628. Lower and upper group port counters 668 and 669 are each set to a respective predetermined state with each assertion of the subframe pulse SFP and count the edges of the clock pulses CLK26 to generate port addresses on lower and upper port counter buses, 830 and 831, respectively, as illustrated in table 4.

TABLE 4

| SFP | Counter 668<br>state - port# | Counter 669<br>state - port# | CLK26 |
|---|---|---|---|
| 1 | 00 - 1 | 11 - 8 | 0 |
| 0 | 01 - 2 | 00 - 5 | 1 |
| 0 | 10 - 3 | 01 - 6 | 0 |
| 0 | 11 - 4 | 10 - 7 | 1 |
| 0 | 00 - 1 | 11 - 8 | 0 |
| 0 | 01 - 2 | 00 - 5 | 1 |
| — | — | — | — |
| 1 | 00 - - | 11 - - | |

A 2 bit decoder 661 is connected to decode the lower port addresses and thereby generate a sequence of four channel enable signals on output leads 661a, 661b, 661c and 661d, for operating multiplexers 715 and 724. Four identical interface channel circuits A–D, 731–734 are connected identically as shown; however with the exception that the leads from the 2 bit decoder 662, which are asserted with the sequence of the four signals, IWA, IWB, IWC and IWD, are individually connected to the corresponding interface channel circuits A, B, C, and D, 731–734.

Figure 17A:
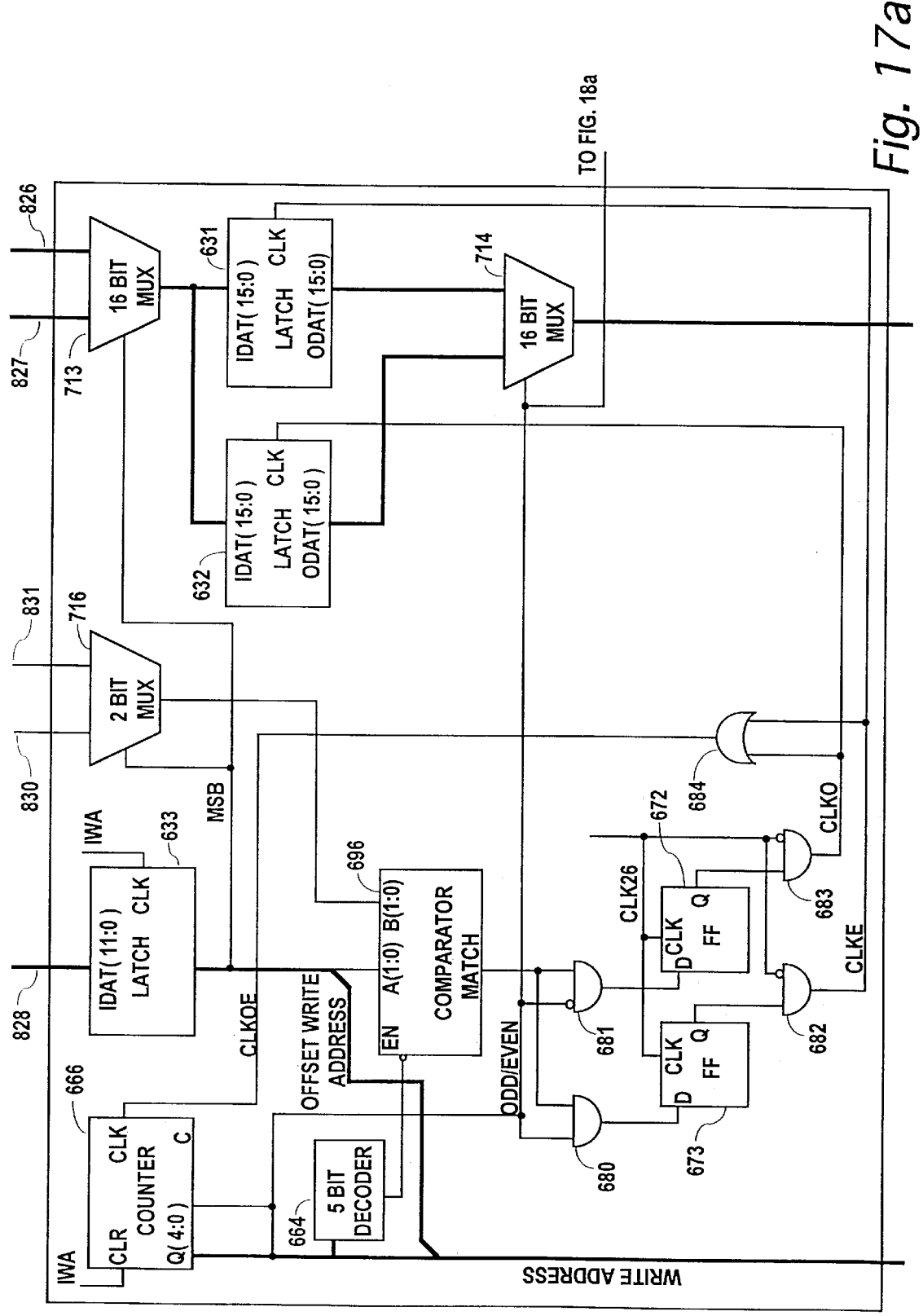
FIG. 17a is a schematic diagram which illustrates part of the ingress portion of the interface DS0 multiplexer in more detail.

The interface channel circuit A, 731, is illustrated in detail in FIG. 17a. The write connection memory addresses WCCM are received on the local WCCM bus 828 through a latch 628. Those of the write connection memory addresses WCCM which are related to the operation of the interface channel circuit A 731, are selected in synchronism with each occurrence of the IWA signal. The selected write connection memory address WCCM in the latch 633 consists of a 3 bit ports address and a 9 bit write offset address. A 2 bit multiplexer 716 and a 16 bit multiplexer 713 are each operated in response to the most significant bit of the 3 bit ports address. Accordingly the 2 bit multiplexer 716 passes the 2 bit content of either the lower port bus 830 or the upper port bus 831 to a B input of a comparator circuit 696. At the same time the 16 bit multiplexer 713 passes either of the lower octet pair from the local bus 826 or the upper octet pair from the local bus 827 to the latches 631 and 632. The comparator circuit 696 receives the 2 lesser significant bits of the 3 bit ports address at its A input. A counter 666 is synchronized with each assertion of the signal IWA, and operates in response to pulses in a composite clock signal CLKOE to generate addresses 0–24 (binary 00000–11000). The output address 24 of the counter 666 is decoded by a decoder 664 which asserts a signal to disable the comparator 696. The comparator 696 is operative, as long as the signal from decoder 664 remains unasserted, to provide an indication of each incident of a match between the selected ports address from the address bus B 542 and the ports addresses generated by the counters 830 and 831. Alternating lower (CLKE) and upper (CLKO) clocks are provided by logic circuitry including AND gates 680–683 and D type flip flops 672 and 673 connected as shown. The least significant bit taken from the output of the counter 666 toggles at 102.8 ns intervals and is used as an ODD/EVEN signal. The logic circuitry operates in response to the ODD/EVEN signal and the clock CLK 26, in the presence of a match indication from the comparator 696 for generating lower (CLKE) and upper (CLKO) clocks each having assertion periods of about 25 ns and repeating at 205.6 ns intervals. Leads from the outputs of the AND gates 682 and 683, couple the even and odd clocks CLKE and CLKO to the clock signal inputs of the latches 631 and 632 and to the inputs of an OR gate 684. The OR gate 684 generates the composite signal CLKOE to which the counter 666 is responsive to generate the sequential addresses. During each match, the 14 bit write SRAM addresses WADDR consists of the series of 24 increments combined with an offset write address being the most recently latched significant 9 bits of the write memory pointer. When the binary count of 11000 is reached the signal from the decoder becomes asserted and inhibits further generation of the clocks CKLE, CKLO and CKLOE. This condition persists until the counter 666 is again cleared to binary 00000 by the next occurrence of the signal IWA, whereupon the next match starts the counter 666 again. The contents of the latches 631 and 632 which are alternately loaded in response to the clocks CKLE and CKLO, are alternately selected and passed via a 16 bit multiplexer 714 to an IRAM bus, under the control of the ODD/EVEN signal. During each match the write negate signal WN (FIG. 16) is inactive and the SRAMs 773 and 774 store the selected octet pairs at the address locations defined by the WADDR. All the various gates and latching procedures described with respect to the apparatus of FIGS. 17 and 17*a* delay the process by several clock cycles. Such delay is accounted for by supplying the write channel connection memory addresses WCCMs from the memory controller 580 in advance.

Figures 18, 18A:
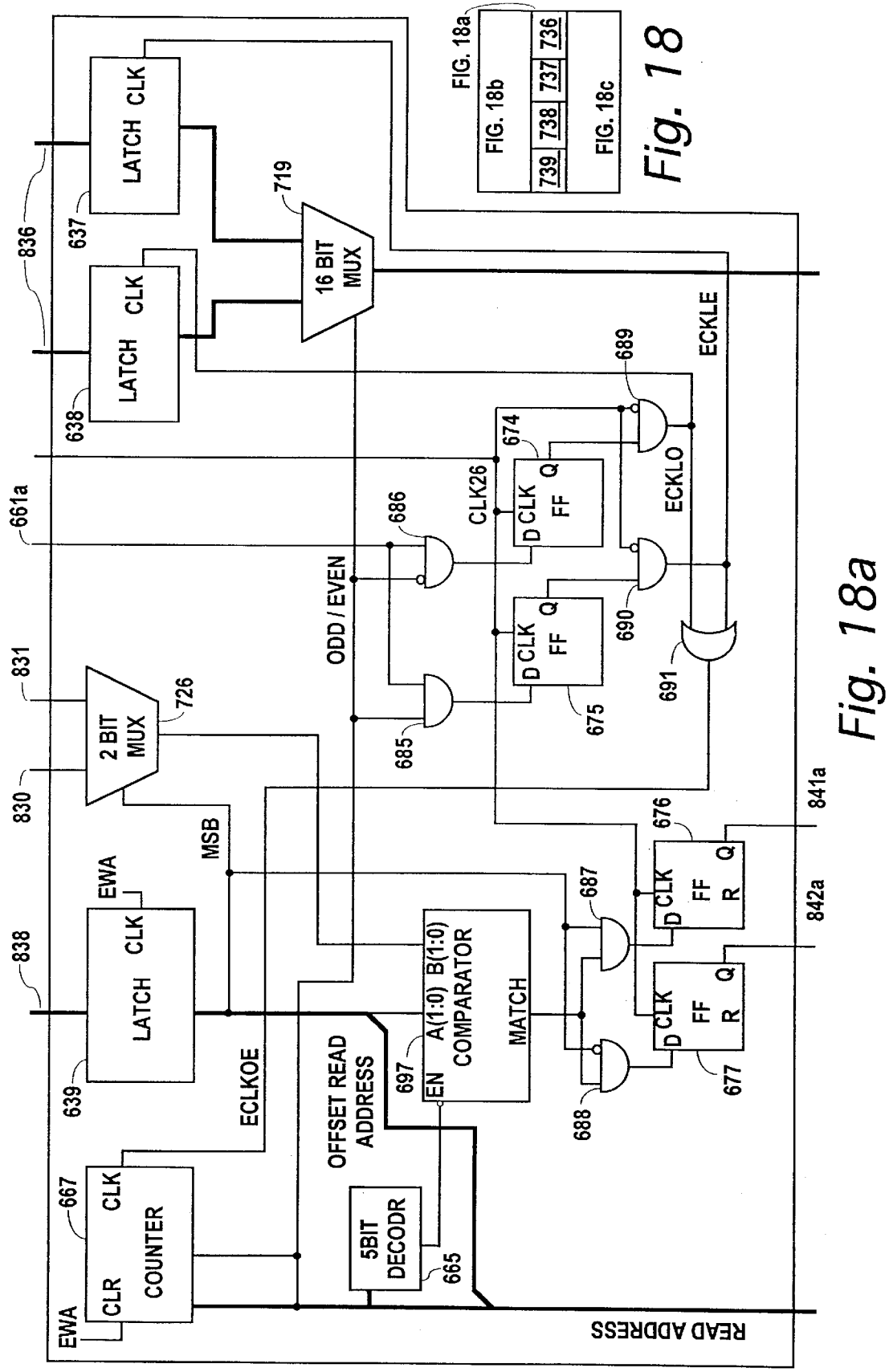
Figure 18B:
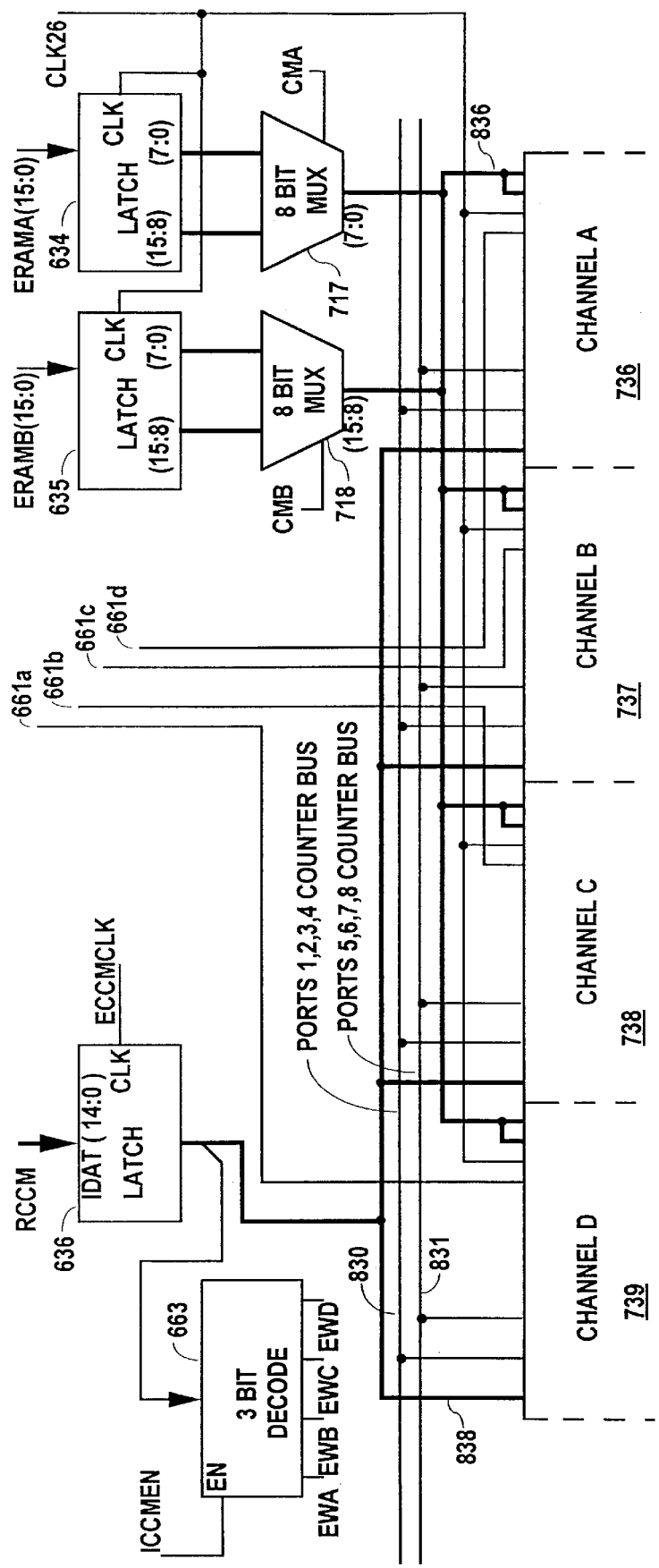
FIGS. 18b and 18c are block schematic diagrams illustrating an egress portion of the interface DS0 multiplexer used in the synchronous DS0 interchange memory of FIG. 16.

Referring to FIGS. 16 and 18 the egress portion includes, latches 634 and 635, in FIG. 18*b,* connected to clock words from the leads (15:0) of the ERAMA and ERAMB buses to first and second inputs of eight bit multiplexers 717 and 718 respectively. A single bit from the I/OB output of the SRAM 771, labelled CMA, is used to select an octet of a latched octet pair from the bus ERAMA via the multiplexer 717. Likewise, a single bit from the I/OA output of the SRAM 772, labelled CMB, is used to select an octet of a latched octet pair from the bus ERAMB via the multiplexer 718. The selected octets are passed to a local data bus 836. Read channel connection memory addresses RCCMs, of 15 bits, from a read address portion (not shown) in the address bus B 542 are clocked onto a local RCCM bus 838 through a latch 636 operated by an incoming channel connection memory clock ECCNMCLK. The ECCNMCLK is provided from the memory controller 580 and has a pulse strobe width of about 26 ns. A 3 bit decoder 663 asserts a sequence of four signals, EWA, EWB, EWC and EWD, by decoding the least three significant bits of the RCCMs from the latch 636. Leads conducting the signals EWA, EWB, EWC and EWD, are individually connected to corresponding interface channel circuits A, B, C, and D, 736–739. The lower and upper port counter buses, 830 and 831, are extended from FIG. 17 and are connected as shown.

The interface channel circuit A, 736, is illustrated in detail in FIG. 18*a.* The read connection memory addresses RCCM are received on the local RCCM bus 838 through a latch 639. Those of the read connection memory addresses RCCM which are related to the operation of the interface channel circuit A 736, are selected in synchronism with each occurrence of the EWA signal from the decoder 663 by the latch 639. The selected read connection memory address RCCM in the latch 639 consists of a 3 bit ports address, a 9 bit read offset address. A 2 bit multiplexer 726 and a 16 bit multiplexer 719 are each operated in response to the most significant bit of the 3 bit ports address. Accordingly the 2 bit multiplexer 726 passes the 2 bit content of either the lower port bus 830 or the upper port bus 831 to a B input of a comparator circuit 697. At the same time the 8 bit multiplexers 717 and 718 have each passed either of a lower or an upper octet from the latches 634 and 635 via the local bus 836, for clocking into either of latches 637 and 638 under the control of clock signals ECKLE and ECKLO, respectively. The content of either of the latches 637 and 638 is selected by a 16 bit multiplexer 719 in response to an ODD/EVEN signal originated as the least significant output bit from a counter 667.

The comparator circuit 696 receives the 2 lesser significant bits of the 3 bit ports address at its A input. The counter 667 is synchronized with each occurrence of the strobe pulse EWA, and operates in response to pulses in a composite clock signal ECLKOE to generate addresses 0–24 (binary 00000–11000). The output address binary 11000 from the counter 667 is decoded by a decoder 665 which asserts a signal to disable the comparator 697. The comparator 697 is operative, as long as the signal from decoder 665 remains unasserted, to provide an indication of each incident of a match between the selected ports address from the address bus B 542 and the ports addresses by the buses 830 and 831. Alternating lower (ECLKE) and upper (ECLKO) clocks are provided by logic circuitry including AND gates 685–690, and D type flip flops 674 and 675 connected as shown. The ODD/EVEN signal from the counter 667, toggles at 205.6 ns intervals. The logic circuitry operates in the presence of each EWA signal assertion on the lead 661*a,* and in response to the ODD/EVEN signal and the clock CLK26, for generating the even (ECLKE) and odd (ECLKO) egress clocks each have assertion periods of about 26 ns and repeating at 205.6 ns intervals. Leads from the outputs of the AND gates 690 and 689, couple the even and odd clocks ECLKE and ECLKO to the clock signal inputs of the latches 631 and 632 and to the inputs of an OR gate 691. The OR gate 691 generates the composite signal ECLKOE to which the counter 667 is responsive to generate the sequential addresses. Sequences of 14 bit read connection memory addresses RADDR consist of the 0–24 series combined with an offset read address being the most recently latched significant 9 bits of the read connection memory pointer. Each of the A–D channel circuits 736 739 provides addresses for reading the timeslot switching addresses from the SRAMs 771 and 772. A stream of addresses is provided via a 14 bit multiplexer 725 which is responsive to the channel selection signals from the outputs 661*a*–661*d* from the decoder 661 in FIG. 17. The output of the multiplexer 725 is continuously clocked through a latch 642 operated by the 25.7 ns clock CKL26 to provide the addresses RADDR to the B and A ports of the SRAMs 771 and 772. As before discussed the SRAMs 771 and 772 continuously read out the previously stored the timeslot switching address listings and thus cause the SRAMs 773 and 774 to continuously read out octet pairs stored therein. As the two listings are usually different, octets of four different synchronous signal origins are captured in each 25.7 ns time interval by the latches 634 and 635. In each 25.7 ns time period, one octet from each of the latches 634 and 635 is selected by the multiplexers 717 and 718 and distributed across the A–D channel circuits 736–739, preparatory to assembly into an exiting cell payload. Hence in this example during each TDM frame period of 125 μs, a capacity for 8,448 timeslot switched connections is provided for, or in other words a maximum of 4,224 full duplex telephone conversations. This corresponds to almost half the capacity of the switching system.

Figure 18C:
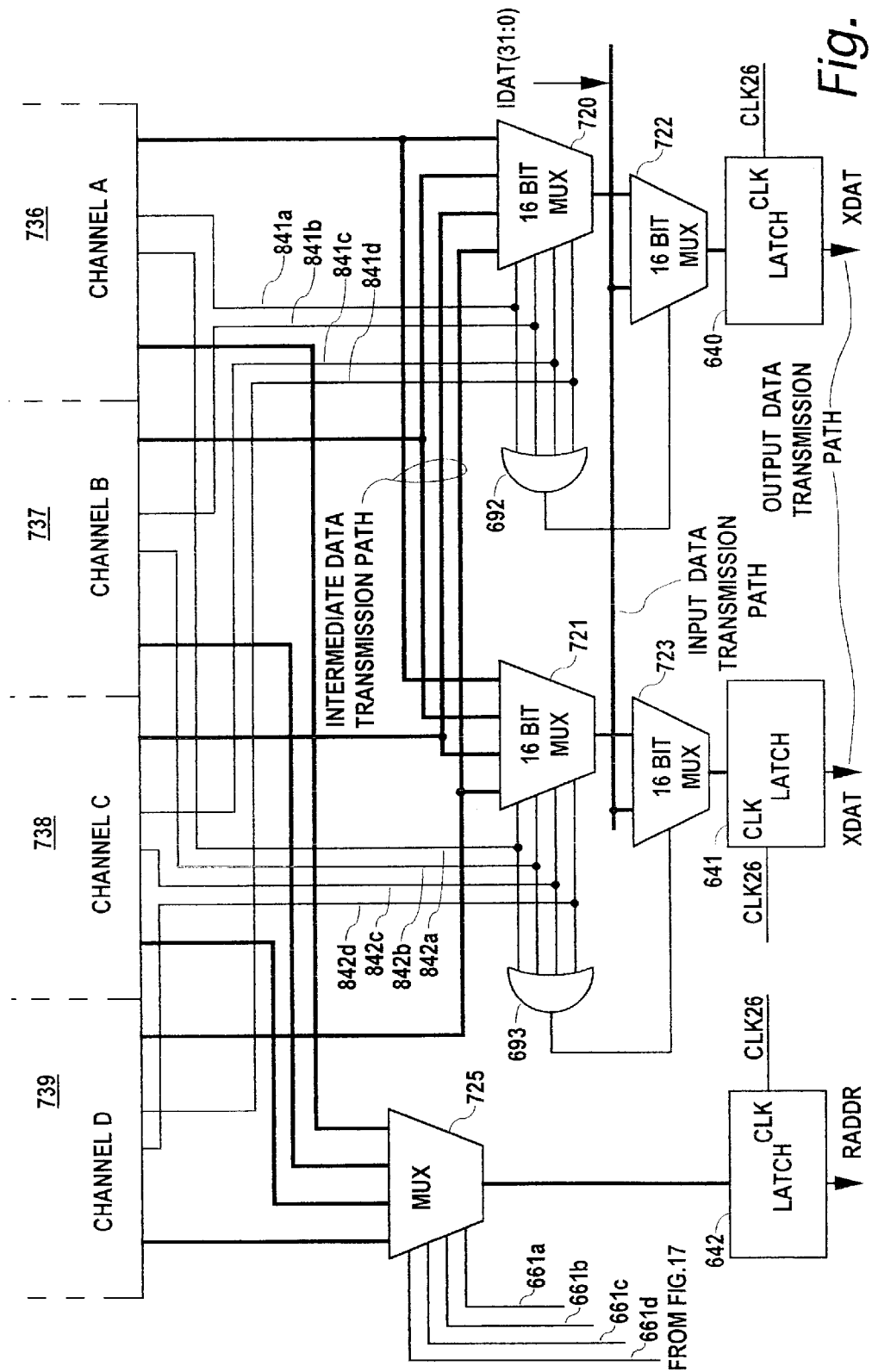

Apparatus for assembling exit data words either by selecting data directly from the IDAT port of the DS0 multiplexer 780 or selecting data from the channel circuits A–D is shown in FIG. 18*c.* Assemblage of egress data words, of 16 bits each, is from a succession of two octet pair selections performed by the multiplexers 717–719 and the latches 637 and 638, as before described with reference to FIGS. 18*a* and 18*b.* A final assemblage of 32 bit exit words is accomplished by controlling a pair of 16 bit multiplexers 720 and 721 to each pass the octet pair from one of the A, B, C and D channel circuits 736–739 to the inputs of each of a pair of 16 bit multiplexers 722 and 723, respectively. One out of four selection control for the multiplexers 720 and 721 is provided by upper and lower group selection signals from leads 841*a–d* and leads 842*a–d,* respectively.

A final selection of either an egress word or the data word IDAT to provide a 32 bit exit data word XDAT is accomplished by the multiplexers 722 and 723, each of which is responsive to a logical ORing of the upper and lower group selection signals from leads 841*a–d* and leads 842*a–d* in OR gates 692 and 693 respectively. An assertion of the selection signal on any one of the leads permits the corresponding multiplexers to selectively pass the octet pair from the SRAMs 773 and 774. Otherwise the current output from the SRAMs 741 and 742 is passed directly as the exit data to the transmit TDM bus A 548. selection signal from one of the four channel circuits A–D, 736–739.

The upper and lower group selection signals are generated in logic circuitry shown in FIG. 18*a* wherein the circuitry of channel unit A 736 is illustrated. Each of the channel units A, B, C and D includes AND gates 687 and 688 and D type flip flops 676 and 677, connected as shown. An asserted match signal from the comparator 697 permits the state of the MSB of the ports address portion in the RCCM to be latched into the flip flop 687 and its complementary state to be latched into the flip flop 677 with each clock pulse of the CLK26. Using the channel unit A 736 as an example leads 841*a* and 842*a* respectively couple the outputs of the flip flops 676 and 677 to the multiplexers 720 and 721 respectively and the other B–D channel circuits are connected via leads 841*b,* 841*c,* 841*d* and 842*b,* 842*c,* 842*d,* as shown in FIG. 18*c*. An active select signal at the Q outputs of the flip flops 676 and 677 is low. Only one of the outputs is asserted at any instant. As only one of the four channel enable leads 661*a*–661*d* is asserted for any one time, only one of the four A–D channel circuits actively generates the series of connection memory addresses during said any one time.

As before indicated the synchronous DS0 interchange memory 520 and the asynchronous buffer memory 560 are each directed in operation by the memory controller 580. The structure of the memory controller 580 is illustrated and described in terms of functional units, with reference to FIGS. 19, and in more detail with reference to the FIGS. 20, 21, 22, 23 and 24.

Figure 19:
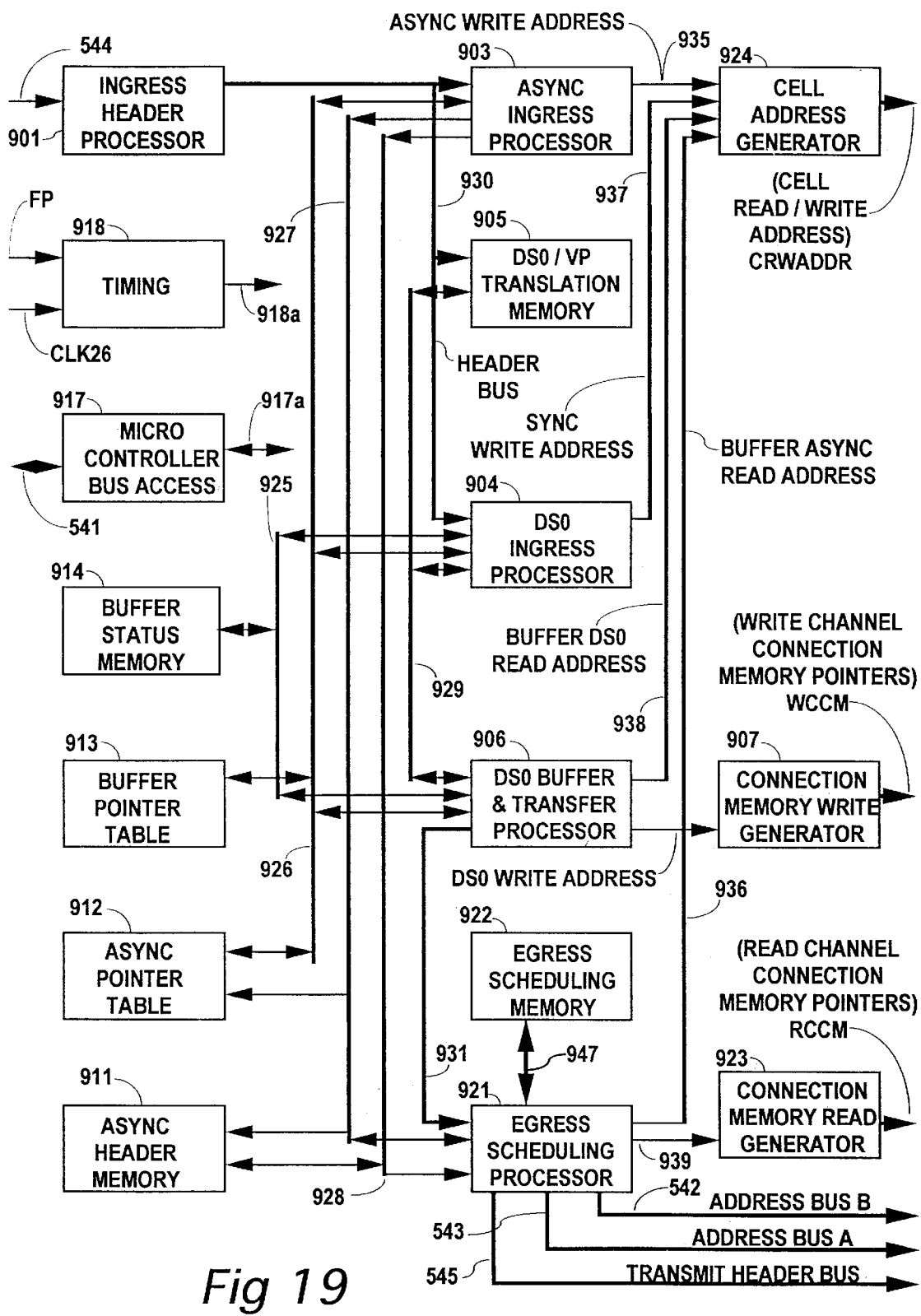
FIG. 19 is a block diagram which illustrates the architecture of a memory controller used in the switching apparatus of FIG. 7, for directing the functions of the synchronous DS0 interchange memory illustrated in the FIGS. 16, 17, 17a, 18, 18a, 18b and 18c.

The structure illustrated in FIG. 19 includes an ingress header processor 901 connected to receive incoming cell headers from the receive header bus 544. The ingress header processor 901 distinguishes headers of asynchronous payload cells and synchronous payload cells for routing to either of an asynchronous ingress processor 903 or a DS0 ingress processor 904 and a DS0/VP translation memory 905, via a header bus 930. The asynchronous ingress processor 903 is responsible for generating address information for writing the SRAMS 741 and 742 with asynchronous payloads. An ingress/egress processor bidirectional bus 927 provides a communications link between the asynchronous ingress processor 903 and an egress scheduling processor 921. The egress scheduling processor 921 is linked via a DS0 transfer bus 931 to receive information from a DS0 buffer and transfer processor 906. The egress scheduling processor 921 stores and refers to egress scheduling information in an egress scheduling memory 922 via an egress scheduling memory bus 947. An asynchronous header memory 911 is connected to exchange data with the asynchronous ingress processor 903 and the egress scheduling processor 921 via an asynchronous header memory bus 928. The DS0 ingress processor 904 and the DS0 buffer and transfer processor 906 are both linked to communicate with the DS0/VP translation memory 905 by a DS0/virtual path translation memory (VPTM) bus 929; linked to communicate with an asynchronous pointer table 912 and a buffer pointer table 913 by a pointers bus 926; and linked to a buffer status memory 914 by a buffer status bus 925. Both the asynchronous pointer table 912 and the asynchronous header memory 911 are connected to receive address information from the asynchronous ingress processor 903 via the ingress/egress processor bidirectional bus 927. The DS0 buffer and transfer processor 906 provides DS0 connection memory write addressing information to a connection memory write generator 907. The connection memory write generator 907 generates the DS0 write channel connection memory pointers WCCMs, of 15 bits, onto the write address portion in the address bus B 542, for operation of the SRAMs 771 and 772 in FIG. 16. The DS0 buffer and transfer processor 906 also provides elastic store read address information on a buffer DS0 read address bus 938. The DS0 ingress processor 904 provides buffer write addressing information on a synchronous write address bus 937. The egress scheduling processor 921 provides egress headers (EHDR) on the transmit header bus 545, as well as providing address information on an asynchronous read address bus 936. A connection memory read generator 923 is responsive to the egress scheduling processor 921 for providing the read channel connection memory addresses RCCMs, of 15 bits, onto the read address portion in the address bus B 542, for storage in the SRAMs 741 and 742 in FIG. 16. A cell address generator 924 is connected to receive addressing information from each of the buses 935, 936, 937, and 938, and provide therefrom cell payload write memory pointers and cell payload read memory pointers, (CRWADDR) on the address bus A 543. Bidirectional information exchange with the micro controller unit 550 and the port circuit 518 at port 8 is provided by a micro controller bus access circuit 917. Timing signals for the operation of the memory controller 580 are generated by a timing circuit 918 in response to the 25.7 ns clock signals CKL26 and the SONET frame pulse signal FP. Connection of the elements of FIG. 19 with the control bus access circuit 917 and the timing circuit 918 are provided via a microcontroller access bus 917*a* and a timing bus 918*a;* however as these connections will be apparent to persons of typical skill in the electronic switching or the electronic computer fields of technology, these connections are only further disclosed in those instances where such may be beneficial to an understanding of the control of the switching system.

In the description of the FIGS. 19–23 the elements therein are sometimes described for convenience as being connected to various of the buses and leads by using phrases such as, to communicate, to drive, and, to receive. In this description the phrases, to communicate or in communication, mean that the connection is bidirectional, that is to say that the element in communication is both an originator or writer, and a receiver or reader of signals via the referenced bus or lead. The phrase, to drive, means that the connection is outgoing, that is to say that the element is an originator or writer of signals via the referenced bus or lead. The phrase, to receive, means that the connection is incoming, that is to say that the element is a receiver or reader of signals via the referenced bus or lead.

Figure 20:
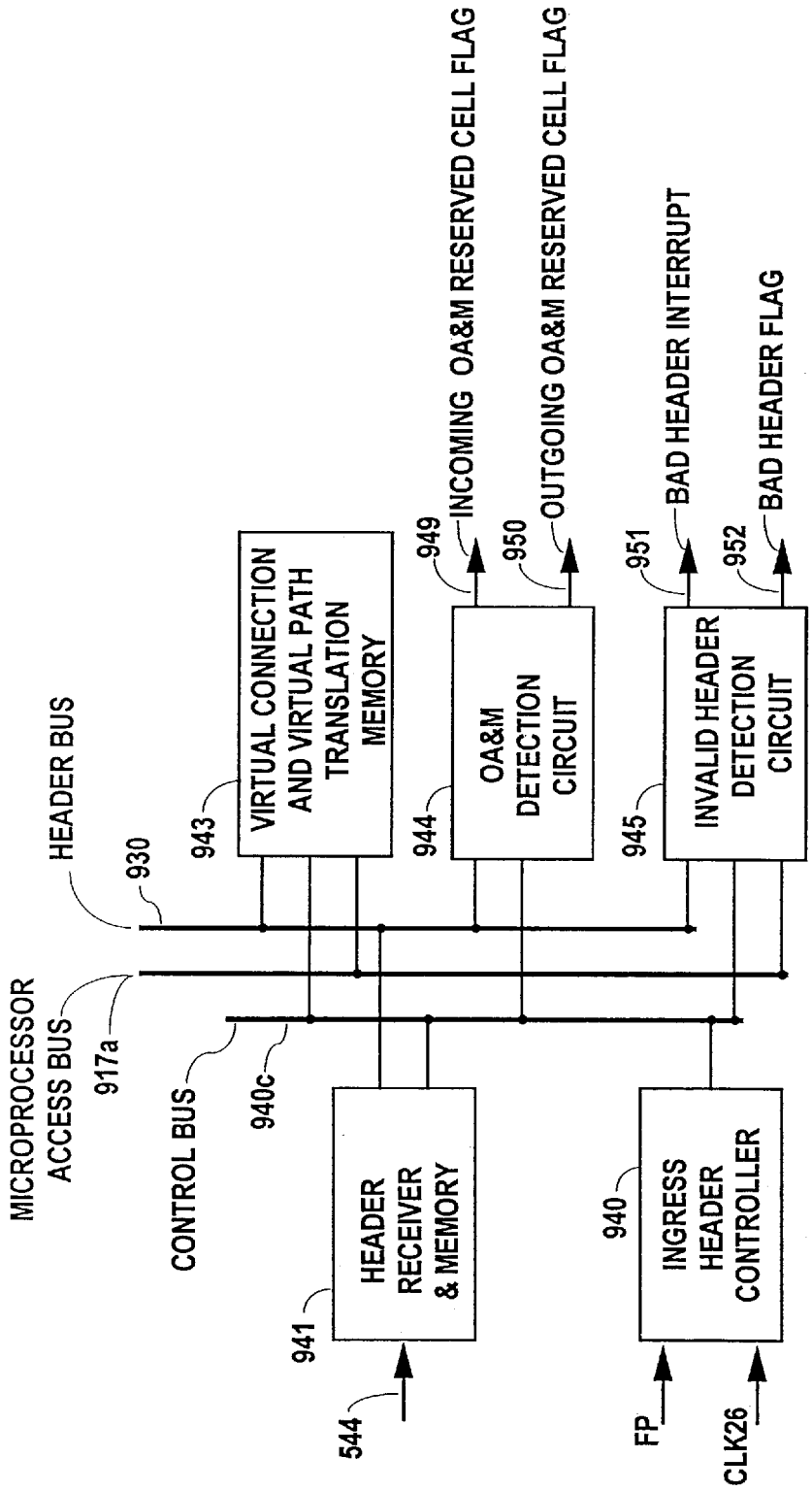
FIG. 20 is a block diagram which illustrates the architecture of an ingress header processor used in the memory controller of FIG. 19.
Figure 21:
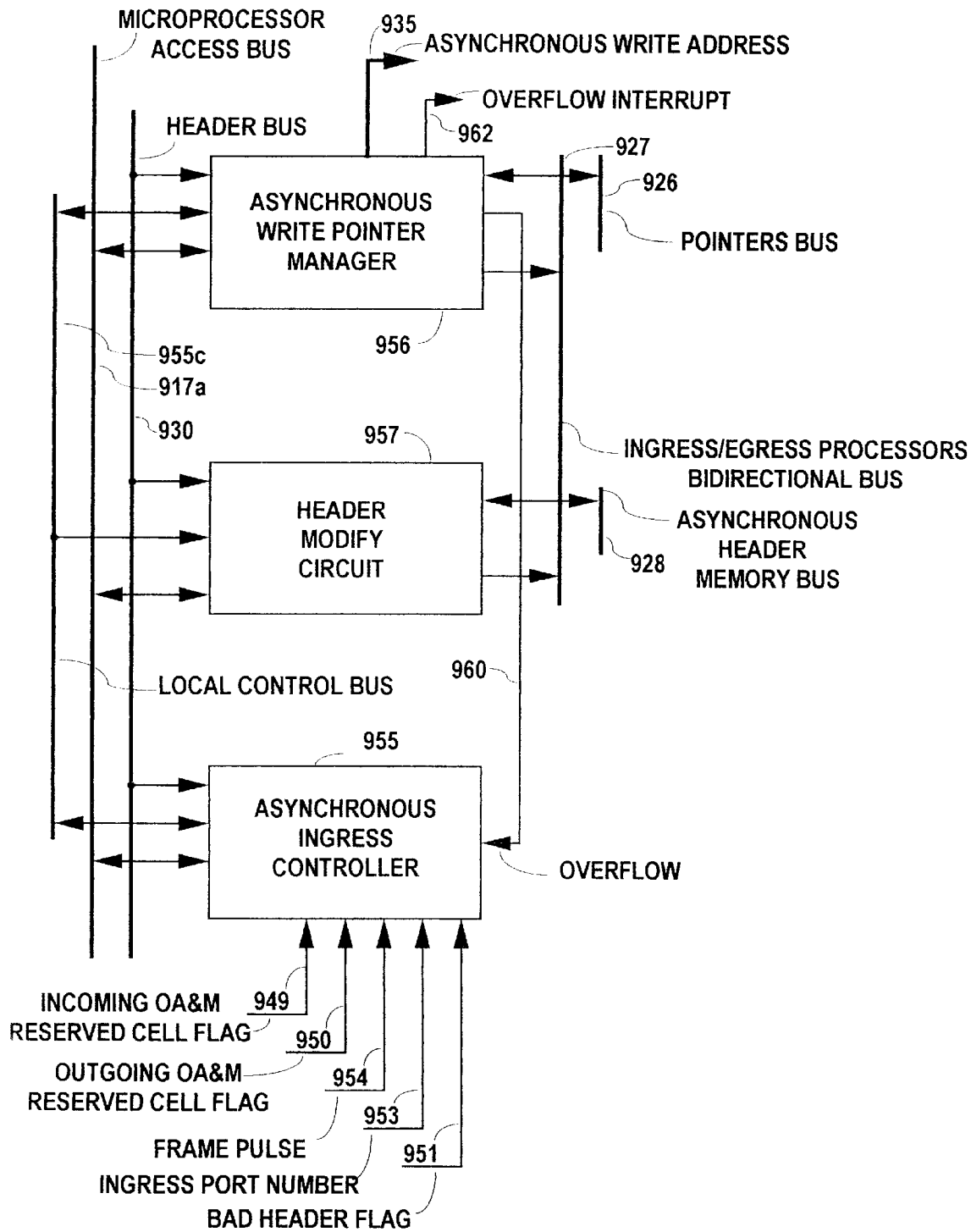
FIG. 21 is a block diagram which illustrates the architecture of an asynchronous ingress processor used in the memory controller of FIG. 19.

The ingress header processor 901 is shown in more detail in FIG. 20. An ingress header controller 940 is responsive to the frame pulse signal FP and the clock CLK26 for generating timing signals and control signals onto a local control bus 940*c* to enable scanning of the eight ports 511–518 for cells waiting for transport. Incoming ATM cell headers on the receive header bus 544 are examined by a header receiver and memory 941. Each of the header receiver and memory 941, a virtual connection and virtual path translation (VP&VPT) memory 943, an operation administration and maintenance (OA&M) detection circuit 944, and an invalid header detection circuit 945 are connected in common with the local control bus 940*c*. Each of the elements 943 and 945 is connected in common to the micro controller access bus 917*a*. The elements 941–945 are also connected in common to the header bus 930. The OA&M detection circuit 944 provides incoming and outgoing OA&M reserved cell flags on leads 949 and 950 respectively. The invalid header detection circuit 945 provides a bad header interrupt and a bad header flag on leads 951 and 952, respectively.

The asynchronous ingress processor 903, in FIG. 19, is responsible for disposing of asynchronous cells that are designated as being one of, incoming reserved, outgoing reserved and valid asynchronous. The asynchronous ingress processor 903, as exemplified in FIG. 21, includes an asynchronous ingress controller 955 which is coupled to receive signals from; the incoming OA&M reserved cell flag lead 949, the outgoing OA&M reserved cell flag lead 950, the bad header interrupt lead 951, the clock lead CLK26 and a frame pulse lead 954. The asynchronous ingress controller 955 is also connected, to communicate via a local control bus 955c, to communicate with the microprocessor access bus 917a, and to receive from the header bus 930. An asynchronous write pointer manager 956 is connected to receive from the header bus 930 and is connected to communicate with the microprocessor access bus 917a and the local control bus 955c. A header modify circuit 957 is connected to communicate with the microprocessor access bus 917a, and to receive from the header bus 930 and the local control bus 955c. The asynchronous write pointer manager 956 is connected to communicate with the asynchronous pointer table 912, shown in FIG. 19, via the pointers bus 926 and to send overflow signals to the asynchronous ingress controller 955 via an overflow lead 960. The asynchronous write pointer manager 956 is the source of asynchronous payload write addresses for the asynchronous write address bus 935 and the source of overflow interrupt signals on an overflow interrupt lead 962. Both the asynchronous write pointer manager 956 and the header modifier circuit 957 are connected to address the asynchronous pointer table 912 and the asynchronous header memory 911, shown in FIG. 19, via the read/write pointer access bus 927. The asynchronous write pointer manager 956 exchanges data with the asynchronous pointer table 912 via the pointers bus 926. The header modifier circuit 957 exchanges data with the asynchronous header memory 911 via the asynchronous header memory bus 928.

Figure 22:
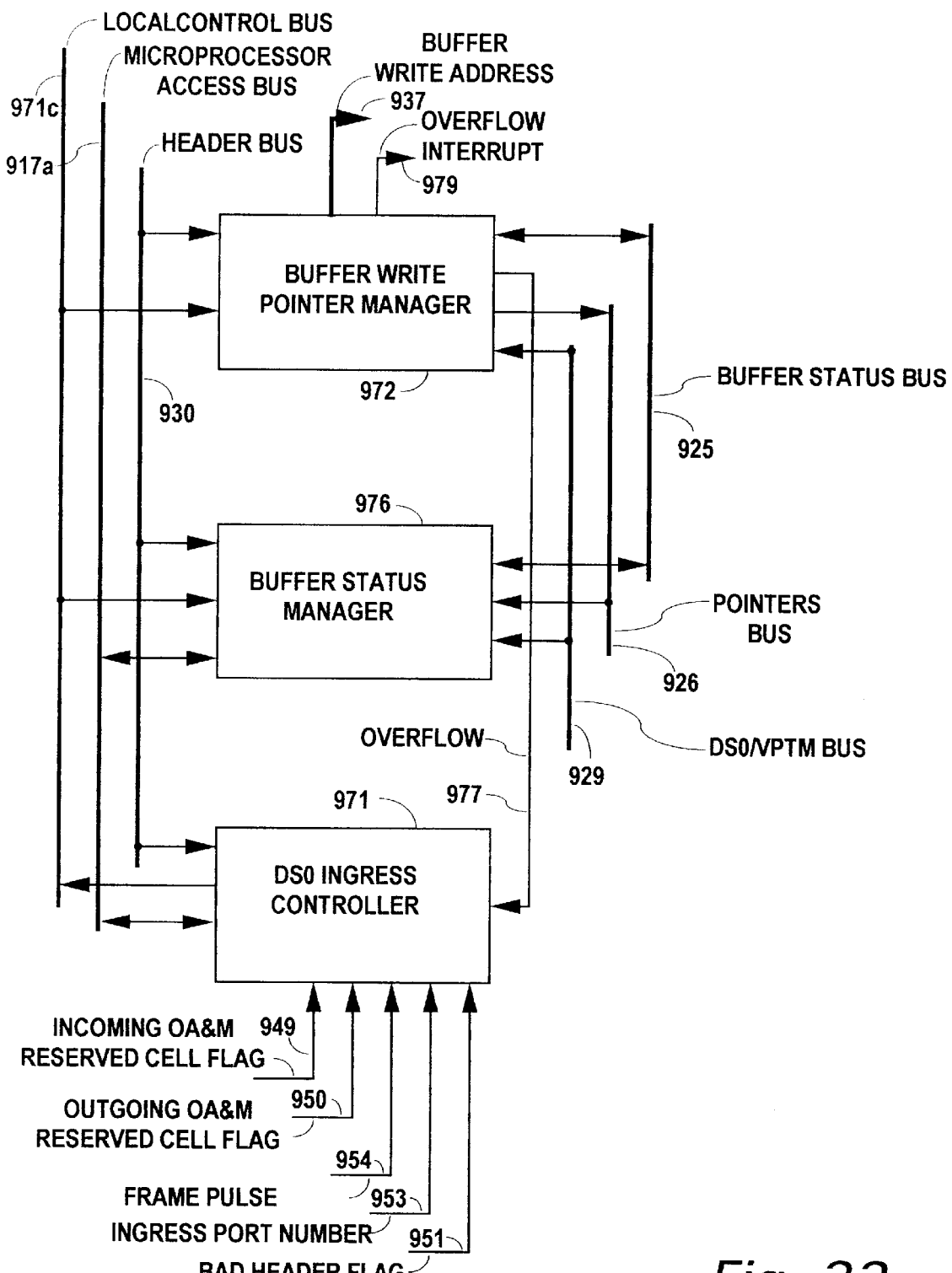
FIG. 22 is a block diagram which illustrates the architecture of a DS0 ingress processor used in the memory controller of FIG. 19.

The DS0 ingress processor 904, in FIG. 19, generates write addressing information to be used in the capture of incoming synchronous payload data, and is shown in more detail in FIG. 22. A DS0 ingress controller 971 is coupled to receive signals; via the incoming OA&M reserved cell flag lead 949, the outgoing OA&M reserved cell flag lead 950, the bad header flag lead 951, the clock lead CLK26, the frame pulse lead 954, and an overflow lead 997. The DS0 ingress controller 971 is connected to receive signals from the header bus 930, to communicate with the microprocessor access bus 917a, and to provide timing and control signals via a local control bus 971c. A buffer status manager circuit 976 is connected to receive signals from the pointers bus 926 and the DS0/VPTM bus 929, and to communicate with the buffer status bus 925. A buffer write pointer manager circuit 972 is connected to receive signals from the header bus 930, to receive control signals from the local control bus 971c and to receive signals from the DS0/VPTM bus 929. The buffer write pointer manager circuit 972 is connected to communicate with the buffer status bus 925 and is also a driver of each of an overflow interrupt lead 979, the overflow lead 977 as well as the pointers bus 926. The buffer write pointer manager circuit 972 is the source of the synchronous payload write addressing information for the synchronous write address bus 937.

Figure 23:
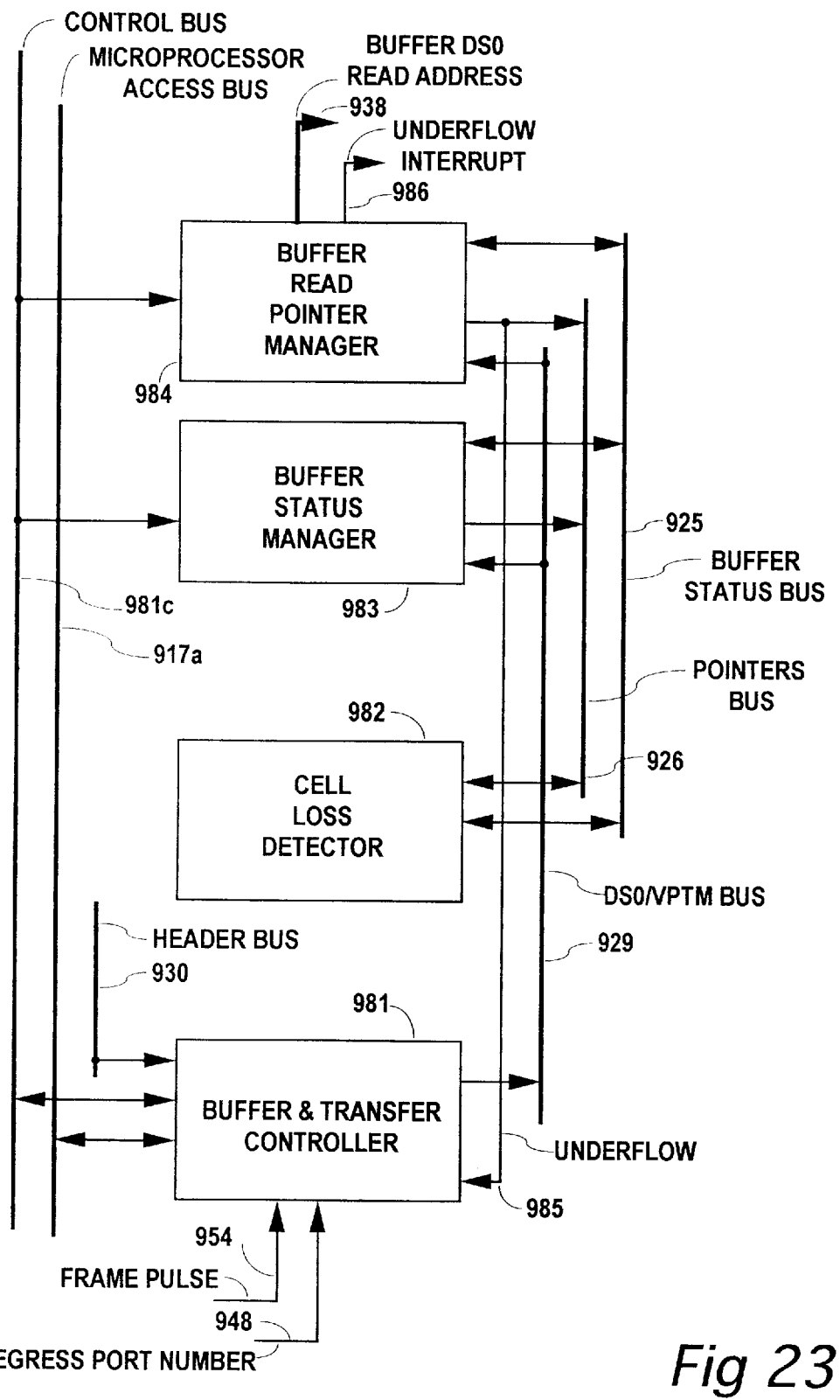
FIG. 23 is a block diagram which illustrates the architecture of a buffer and transfer processor used in the memory controller of FIG. 19.

The DS0 buffer and transfer processor 906, in FIG. 19, generates read addressing information for extracting cell payloads from the asynchronous buffer memory 560, and is shown in more detail in FIG. 23. A buffer and transfer controller 981 is connected to drive the DS0/VPTM bus 929, to communicate control and timing signals via a local control bus 981c. The buffer and transfer controller 981 receives signals from the header bus 930, the microprocessor access bus 917a, the frame pulse lead 954, an underflow lead 985, and the clock lead CLK26. A cell loss detector circuit 982 is connected to communicate with the buffer status bus 925 and the pointers bus 926. A buffer status manager circuit 983 is connected to drive the pointers access bus 926, to communicate with the buffer status bus 925, and to receive signals from DS0/VPTM bus 929 and the local control bus 981c. A buffer read pointer manager circuit 984 is the source of the read addressing information which it asserts on the buffer DS0 read address bus 938 as well as being the source of an underflow interrupt signal on a lead 986. The buffer read pointer manager circuit 984 is connected to drive the underflow lead 985, to communicate via the buffer status bus 925 and to receive signals from DS0/VPTM bus 929 and the local control bus 981c.

Figure 24:
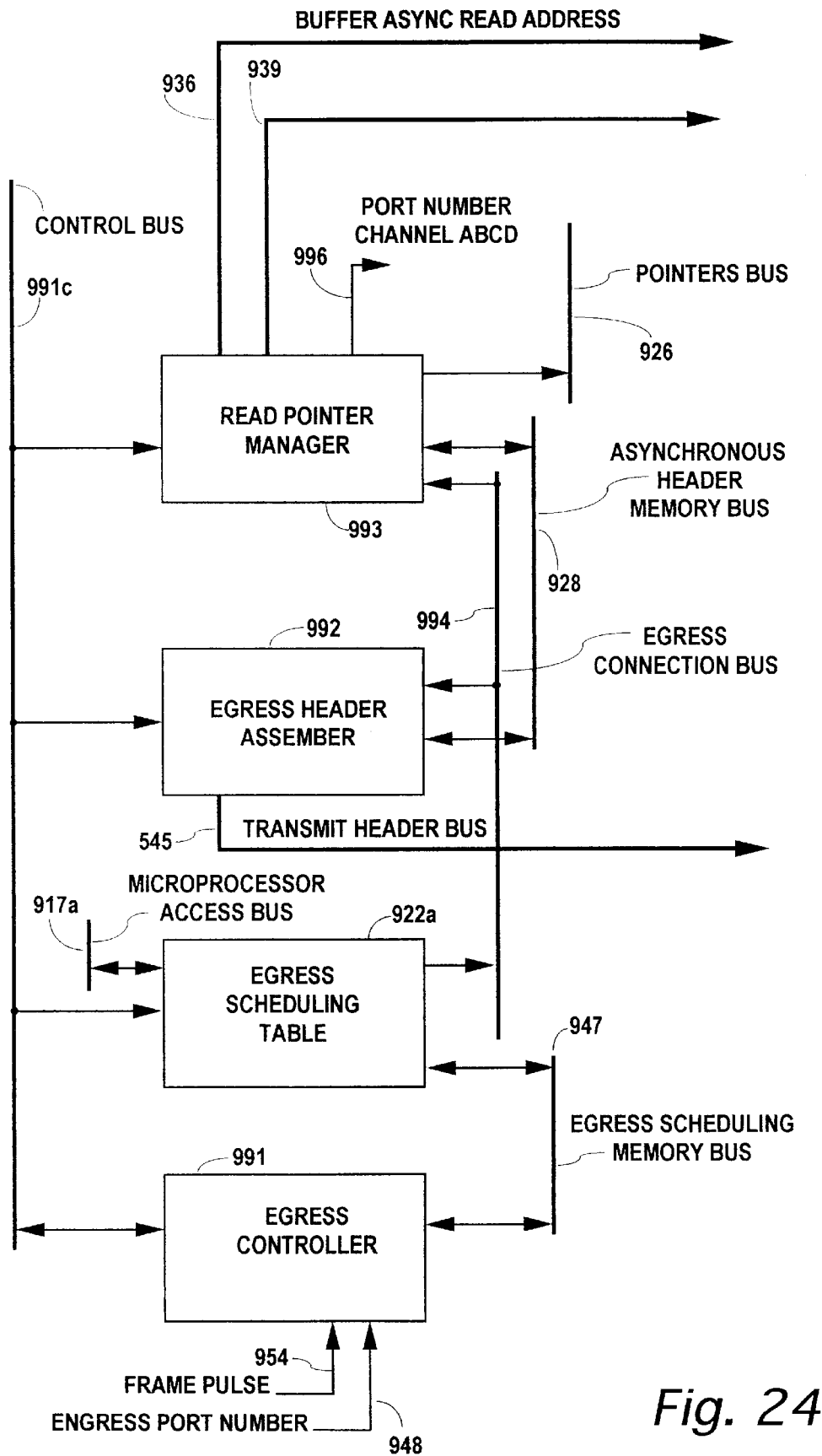
FIG. 24 is a block diagram which illustrates the architecture of an egress scheduler used in the memory controller of FIG. 19.

The egress scheduling processor 921 in FIG. 19, is shown in more detail in FIG. 24. An egress controller 991 is connected to receive signals from the frame pulse lead 954 and the clock lead CLK26. The egress controller 991 is connected to communicate via a local control bus 991c. The egress scheduling memory 922, in FIG. 19, communicates with the egress controller 991 to provide access to an egress scheduling table 922a in the memory 922, via the egress scheduling memory bus 947. An egress header assembler circuit 992 is connected to communicate via the asynchronous header memory bus 928 and is connected to receive signals from the local control bus 991c and the egress connection bus 994. The egress header assembler circuit 992 is the point of origin for egress headers (EHDR) on the transmit header bus 545. A read pointer manager circuit 993 is connected to communicate via the asynchronous header memory bus 928 and is connected to receive signals from the local control bus 991c and the egress connection bus 994. The read pointer manager circuit 993 drives the read/write pointer access bus 926. The read pointer manager circuit 993 is the source of asynchronous memory pointers via the buffer async read address bus 936 and the cell address generator 924, for transmittal on the address bus A 543. The read pointer manager circuit 993 is also the source of DS0 connection memory pointers which it provides via a bus 939 and the connection memory read generator 923 for the address bus B 542, and for reference destination port and commutator channel numbers on a bus 996.

In combination with the synchronous DS0 interchange memory 520 and the asynchronous buffer memory 560, the operation of the memory controller 580 may be viewed as an orthogonal control process that needs only to have indication as to when cells appear at incoming ports and have cleared outgoing ports, in order to issue the memory pointers for directing the flow of cell payloads. The memory controller 580 stores DS0 timeslot switching information from a call controller, not shown, and relates that information to incoming cell headers to generate write and read pointers at the required moments.

The memory controller 580 also distinguishes signalling and supervision cells and the like, referred to as OA&M cells. OA&M cells have asynchronous payloads which are used to carry signalling, supervision, management and special messages throughout a network of switching facilities. An OA&M cell with information destined for the memory controller 580 is routed from one of the ports through the asynchronous buffer memory 560 to the ALL5 unit at port 518. It is applied to the microcontroller bus 541 via the AAL5 unit 518 made available to the memory controller 580 through the memory controller bus access circuit 917. Also either of the micro controller 550 and the memory controller 580 may generate OA&M cells for transmittal to remote entities including the call controller.

The memory controller 580 interprets the headers of incoming cells to determine what its address pointers are to be so that a cell's payload is handled by the asynchronous buffer memory 560 and, if need be, by the DS0 switching function of the synchronous interchange memory 520.

SUNI ports 511–518 are scanned, as shown in the timing diagram in FIG. 8, in regular periodic sequence in order that a waiting cell is received for transport through the switching system. When the ingress header processor 901 receives a cell header the first octet of the cell's header is accompanied by the SOIHDR flag asserted by either of the access units, 501 or 502, from whence the header is being transmitted. The ingress header processor 901 determines the incoming port number by associating the occurrence of SOIHDR flag with the timeslot assigned to the port. In the incoming header, both the VP and VC fields and the port number are used by the ingress header processor 901 to determine the cell's disposition by accessing information in the DS0/VP translation memory. Accordingly, the header modifier circuit 957 may amend the information in any of the header fields and transmit the header to the asynchronous header memory 911 where it is held for eventual use by the egress scheduling processor 921.

Among ATM cell headers, those headers indicating asynchronous payload having several classifications can affect the disposal of the cell. The header is examined to determine cell type by using the various header fields and a VP lookup table entry in the virtual connection and virtual path translation VC&VPT memory 943. The VP lookup table contains information which specifies a given virtual path identifier (VPI) address range that is available for incoming cells from each of the ports. The cell header's VPI address is compared with the port's VPI address range to designate the cell's type as being one of the following: unassigned, bad header, outbound reserved (ORC), inbound reserved (IRC), DS0, and asynchronous.

Unassigned cells are identified by the GFC field being asserted. The payload is discarded and the cell requires no further processing.

Bad header cells are identified in the invalid header detection circuit 945 by not being unassigned and by not being within the given VPI address range. When a bad header occurs the invalid header detection circuit 945 asserts the bad header flag, on the lead 952, and generates an interrupt signal on the lead 951, provided a corresponding mask bit is negated. If a previous bad header interrupt is not pending the cell header and the port number are registered and may subsequently be referred to in order to determine the cause of the interrupt. Aside from this registration, both the header and its associated payload data are discarded. The VPI and PT fields are presented to the OA&M detection circuit 944 to detect each occurrence of an incoming reserved cell and each occurrence of an outgoing reserved cell.

ORCs are OA&M cells which are destined for another switching system. OA&M cells are assembled from the micro controller bus at the AAL5 unit 518. ORCs are identified by being neither unassigned nor bad header, with the header having a VPI within the given VPI address range. ORCs have asynchronous payloads.

IRCs are OA&M cells arriving from another switching system and are destined for the AAL5 unit 518. IRCs are identified by being neither unassigned, bad header, nor ORC, and having either of a VCI address or a PT field within ranges specified within the VC&VPT memory 943. IRCs have asynchronous payloads.

Asynchronous cells and DS0 cells are identified by being neither unassigned, bad header, ORC, nor IRC. DS0 cells are distinguished by having the asynchronous flag negated as specified in a translation table in the VC&VPT memory 943.

The ingress header controller 901 begins a scan of the ports in sequence as illustrated in FIG. 8, synchronized with the first timeslot at the beginning of each 2.78 µs subframe time interval. While the incoming cell payload, from an incoming port, is being stored in the destination output FIFO queue, an associated egress header is assembled and stored in the asynchronous header memory 911, preparatory to transport toward an outgoing port. The storage location of the associated egress header is directly referenced to the output payload. The addressing of the asynchronous header memory 911 is indexed by the destination port number and by the position in the queue at which the cell payload resides in the output buffer of the destination port. The information stored in the asynchronous header memory 911 includes an egress VPI which was derived from the VP field of the incoming cell header, with reference to the DS0/VP translation memory 905. The assembled egress header includes the egress VPI and the PT, CLP, VCI fields, usually corresponding to those fields of the ingress header.

Before transmission from the access unit 501 has proceeded to the first payload octet, the insertion of the extra header octet (HEC) as well as the clock cycle time delays inserted into the payload propagation by the latches 611 and 612, provides some time for the memory controller 580 to process the header. The header of an incoming cell once identified by the ingress header processor 901 as having an asynchronous payload is routed via the header bus 930 to the asynchronous ingress processor 903 and subsequently enqueued in the egress header assembler 992 in the egress scheduling processor 921, in preparation for delivery to the designated destination port. The asynchronous write pointer manager 956 in the asynchronous ingress processor 903 generates a write address pointer onto the asynchronous write address bus 935 for directing the entry of the incoming cell's asynchronous payload into an output buffer, the FIFO queue associated with the port of destination. The cell address generator 924 uses the address pointer to generate a series of addresses onto the address bus A 543 synchronized such that at the same time the first octet of the payload has propagated through the commutator 750 (FIG. 12), the first address will have traversed the address pipeline 760. If the FIFO queue associated with the port of destination becomes filled during storage of an incoming cell payload, a flag CA is negated, indicating an overflow condition. This condition is detected by the asynchronous write pointer manager 956 which generates an overflow interrupt on the lead 962. Provided that the output buffer overflow condition does not already exist as it may from a previous occurrence of an overflow condition, the ingress port number, destination port number, the VPI, the IRC flag, and the ORC flag, are registered for potential use in a overflow diagnostic procedure. When the overflow condition is detected, the payload of the cell is simply abandoned and receipt of the next incoming cell commences.

Normally after some time, depending on the fullness of the FIFO queue, read address pointers on the buffer async read address bus 936 from the read point manager 993, will have progressed to the address sequence at which the payload was written into the FIFO queue. Six port timeslots prior to this event, the egress header assembler circuit will have commenced to read the cell's header onto the transmit header bus 545 for TDM delivery to the port circuit of destination. Commencing with the assertion of the queue address pointer for reading the cell, the cell address generator 543 commences to generate the series of addresses which define the storage locations from whence the cell's payload is read out, octet pair by octet pair, in TDM via the egress portion of the commutator 750, onto the bus 547. After the octets traverse either of the multiplexers 722 and 723, they appear as exit data on the transmit TDM bus A, thereby completing the switching function required for transporting the asynchronous cell to its port of destination.

The header of an incoming cell having payload of isochronous origins is received and identified as a DS0 type header by the ingress header processor 901, in much the same manner as described, except that the DS0 type header is routed via the header bus 930 to the DS0 ingress processor 904. The DS0 type header is also enqueued in the egress header assembler 992 in the egress scheduling processor 921 for subsequent delivery, at least one frame period later, to the designated destination port. The buffer write pointer manager 972 in the DS0 ingress processor 904 generates a write address pointer onto the synchronous write address bus 937 for directing the entry of the incoming cell's synchronous payload into a DS0 output buffer, the FIFO queue, associated with the port of destination. The cell address generator 924 uses the address pointer to generate a series of addresses onto the address bus A 543 synchronized such that at the same time the first octet of the payload has propagated through the commutator 750, the first address will have traversed the address pipeline 760.

Readout management of the DS0 output buffer is performed by the DS0 buffer and transfer processor 906 to provide an elastic store function in the asynchronous buffer memory 560, somewhat like the elastic store function employed to receive TDM bit streams in typical STM telecommunications facilities. The elastic store function provides a DS0 frame queue function for each VP used for a TDM trunk. The elastic store function accommodates VP variable delay experienced by cells while being transported through an ATM network. With each occurrence of a 125 $\mu$s frame period, the DS0 buffer and transfer processor 906 causes the asynchronous buffer memory 520 to deliver a composite frame of cell isochronous payloads, via the egress bus 547. Each composite frame is limited to the DS0 channels currently allocated to the TDM trunk application and consists of payloads containing all the potential DS0 data which may be transmitted during the following 125 $\mu$s frame period. However, only those DS0 channels which are actually in use will be time switched in the synchronous DS0 interchange memory 520. Any idle DS0 channel is not accessed and is eventually overwritten.

The egress scheduling processor 921 is responsible for directing deliveries of outgoing cell payloads and corresponding headers to the port units 511–518. The egress scheduling processor 921 effects reading of asynchronous cell payloads from the asynchronous buffer memory 560, and effects assemblage of DS0 cell payloads from the frame of octets stored in the synchronous DS0 interchange memory 520. The DS0 cell payloads are assembled by addressing channel connection mapping stored in the DS0 connection memory, the SRAMs 771 and 772. A channel connection mapping consists of a list of addresses for reading storage locations in the SRAMs 773 and 774, storage locations which contain the octets which are being used to assemble a frame of XDAT DS0 cell payloads. Each cell's payload is sequentially inserted into predetermined timeslots that are reserved for a given port.

For convenience of telephone call management from the remotely located call controller, two connection maps are utilized for storing the channel connection mapping. At any one time, one of the connection maps is designated as being inactive while the other of the connection maps is designated as being active. The active connection map is a record of the present state of DS0 time connections. The inactive connection map evolves for a time into a record of a future state of DS0 time connections. The inactive connection map is available, to a remote call controller, for setting up new DS0 connections and tearing down old DS0 connections. Alterations to the connection mapping are directed by the call controller. Firstly the newly inactive connection map is brought up to date with the new active connection map and thereafter the alterations from the call controller are entered, as they are received, into the inactive map. This process continues and for a time, which may extend through a second or more, whereafter the designations of the connection maps are exchanged in synchronism with a frame boundary. The process is repeated from time to time so that the DS0 switching is up dated to effect the required telephone connections of the instant.

The DS0 ingress processor 904 makes reference to data in the DS0/VP translation memory 905 to determine if the DS0 type header passed from the ingress header processor is acceptable and if so, it directs the enqueuing of the cell's DS0 payload.

If an incoming DS0 cell is accepted, the DS0 cell's port of origin must have been enabled for DS0 service and the DS0 cell's VC must have been registered as active in the DS0/VP translation memory 905. If both requirements are not met, the incoming DS0 cell is discarded in its entirety. In the accepted DS0 cell, the VCI header field is used to access a DS0/VP/VC translation table, in the DS0/VP translation memory 905, to obtain a VC buffer address. The VC buffer address provides access to a buffer status table in the buffer status memory 914 in order to identify a FIFO queue buffer which is assigned to the VC. FIFO queue buffer identifiers are used to access a complete frame set of read and write connection memory pointers which are stored in the buffer pointer table 913. The buffer status memory 914 is a depository for a running record of the instantaneous usage of each of the FIFO queue buffers. In this example there are separate DS0 FIFO queue buffers for odd frames and for even frames. In relation to each FIFO queue buffer this record includes an elastic store threshold flag, the least significant bit of the PT field and a status bit map. The status bit map identifies which storage blocks contain payloads and the VC of each payload. The least significant bit of the PT field identifies the FIFO queue buffer as being assigned to storing either odd or even frames of the DS0 payloads. The elastic store threshold flag indicates that there are enough cell payloads in the FIFO to provide at least a full frame, that is a 125 microsecond frame readout.

DS0 framing management uses the logic level of the least significant bit of the PT field of the cell header to indicate whether a received DS0 cell belongs to an odd or even frame. A change in the least significant bit of the PT field indicates a requirement for the present designation of the connection maps to be interchanged. As a bit of the DS0 header is used this is referred to as inband signalling. This flag should be consistent with the least significant bit of the buffer write pointer for all cells belonging to the same 2.78 $\mu$s subframe. In an instant where the flag is different, the incoming cell is assigned to being the first cell of the next subframe.

In an event wherein a DS0 FIFO queue buffer in the asynchronous buffer memory 560 is unable to be emptied as quickly as incoming cells arrive for enqueuing, the DS0 FIFO queue buffer will become filled and unable to store another incoming payload. An overflow or slip condition in the FIFO queue buffer is realized when the new value of the write pointer overtakes the value of the read pointer. An occurrence of the slip condition is registered in the buffer status memory 914. Conditional upon a previous slip condition not currently being registered, an interrupt is asserted and the FIFO queue buffer address is stored and made available through the microprocessor access bus access unit 917. The slip condition is remedied by decrementing the memory write pointer to point to the corresponding cell received in the previous frame, thereby commencing enqueuing of cell payloads by overwriting the previous cell's payload with the corresponding incoming cell's payload. This results in the last received frame of DS0 payloads being lost and results in one octet from each of the active telephone connections being lost.

Each VP used for a DS0 TDM application is assigned to an elastic store frame buffer function provided by a pair of FIFO queue buffers created in the asynchronous buffer memory 560. The elastic store frame buffer function is sometimes referred to as being a dejitter transfer function. The elastic store frame buffer function is capable of storing multiple frames which consist of a variable number of cell payloads that are identified by the VC addresses associated with a given VP. Consequently, a frame represents the composite number of DS0 channels transported by the VCs for a given VP and represents the number of timeslots available within a 125 μs frame interval defined for the synchronous TDM service. During each frame period, the DS0 buffer and transfer processor 906 services each active elastic store by directing the transfers of cell payloads identified as being in the current read frame buffer of the given elastic store. The transfers of cells to the synchronous DS0 interchange memory are accomplished by scanning all VCs designated for DS0 service, which are stored in a DS0/VC translation table in the virtual connection and virtual path memory 943. The DS0/VC translation table is directly scanned by the DS0 buffer and transfer processor 921. As both DS0 and asynchronous type cell payloads are stored in the asynchronous buffer memory 560, the dejitter transfer function is restricted to reading a DS0 cell payload from the asynchronous buffer memory 560 when the egress scheduling processor 921 is not directing the readout of an asynchronous cell payload. The two readout functions are mutually exclusive with the egress scheduling processor 921 serving as the common point through which the respective cell payload readout are scheduled.

Since the TDM trunk capacity may be varied in accordance to the number of VCs made available to the trunk (VP), the assignment of VCs to a trunk is made from a pool of VC FIFO queue buffers designated as being available for DS0 service. The pool of buffers may be freely allocated to the elastic store functions by entering the appropriate VC buffer address and egress header fields into the DS0/VCI translation table in the virtual connection and virtual path translation memory at the location identified by the incoming header's VCI. As the DS0/VCI translation table is scanned, each buffer address is used to access the buffer status memory to identify the assigned FIFO and its threshold status. The FIFO threshold status is asserted when the FIFO queue buffer has accumulated a mean address length between the read and write pointers.

Prior to transferring the first cell of a new frame for each FIFO queue, the DS0 buffer and transfer function increments the frame read pointer to access a new frame within the queue. All VCs comprising the VP use the same read pointer to identify the current read frame.

In the buffer status memory 914, the VC buffer status map indicates frames in the FIFO queue buffers which are full. The read and write FIFO queue pointer values appearing on the read/write pointer access bus 926, are compared by the buffer status manager 983 to detect any FIFO queue buffer which has less then a complete frame of DS0 payloads store therein. This is considered to be an error condition. If underflow is detected and provided that a respective error flag mask is not asserted, the underflow flag is set on the underflow lead 985 and the underflow interrupt is generated onto the underflow interrupt lead 986. The identity of the DS/VP connection that is at fault is stored for microprocessor access provided that no interrupt remains asserted for a previous underflow condition. Detection of the underflow condition inhibits any transfer of the FIFO queue buffer contents.

During each 125 microsecond frame period, the egress scheduling processor 921 directs transmittal of 360 cells that is, 45 cells to each of the 8 ports. As an STS-3c frame period is not an integer number of cells per frame, a super frame consisting of 53 frames is required before an integer number is realized. The egress scheduling processor 921 schedules 44 assigned cells per frame per port during 45 frame periods of the super frame, and 45 cells per port in 8 frame periods of the super frame. The cell to be sent out is specified by the subframe number, and by the outgoing port number. These two indexes specify one of the 360 entries in an egress scheduling table 922a in the egress scheduling memory 922. As the data paths into and out of the Synchronous DS0 interchange memory are each implemented as 4 timeslot interchange Channels A,B,C,D, the egress scheduling table 922a is structured to prevent more than 4 out of any 8 consecutive table entries as being designated for DS0 operation. Consequently, the maximum number of DS0 egress cells per frame is 176. For a DS0 cell to be sent out, the outgoing port number and an activity status in the egress scheduling table 922a must both be asserted. Otherwise an asynchronous cell is sent out.

The DS0 connection memory pointers are generated on the address bus A 543 by the cell address generator and forwarded to the SRAMs 771 and 772, in response to connection memory pointer from the buffer read pointer manager 984. Each connection memory pointer results in a total of 48 addresses, 24 addresses from each of the SRAMs 771 and 772 being applied to the SRAMs 773 and 774 respectively. As before discussed this results in a two of four octet selection every 25.7 ns, which can yield a maximum of four selected DS0 octets for four corresponding output ports as timeslot on the transmit TDM bus 548.

If the DS0 designation in the egress scheduling table 922a has not been asserted, an asynchronous cell may be sent out. In this case the asynchronous pointer table 912 is accessed based on the egress port number. If the asynchronous queue is empty, an unassigned asynchronous cell is sent out. Otherwise, the payload of the cell is extracted from the external asynchronous buffer memory 560 and the read pointer is incremented.

Figure 25:
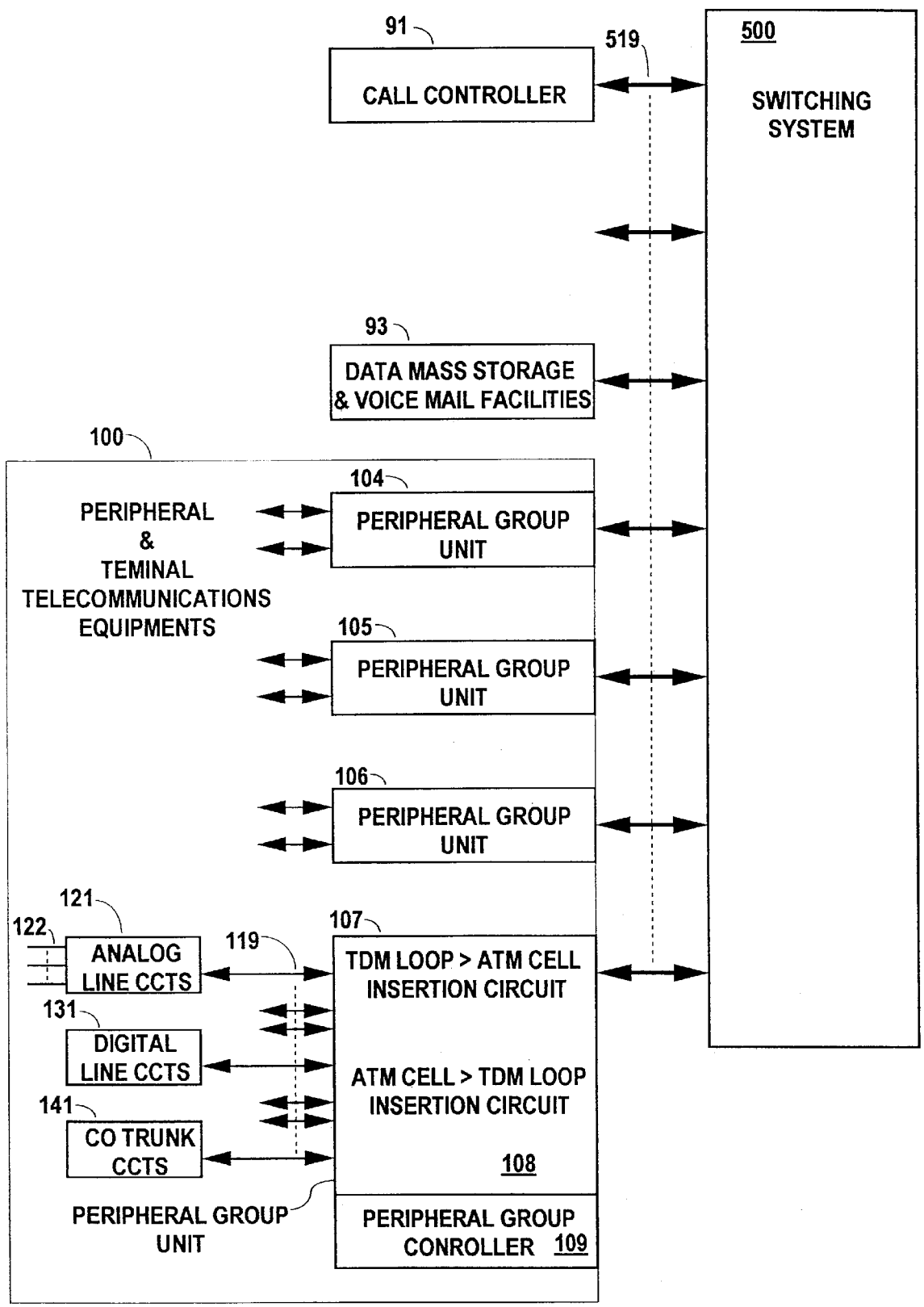
FIG. 25 is a block diagram of a basic switching system incorporating the switching apparatus of FIG. 7.

A use of the switching system introduced in the discussion with reference to the FIGS. 7 is exemplified in FIG. 25. The switching system is identified with reference numeral 500, in FIG. 25, where it is shown in combination with elements to provide a small telecommunications exchange. Such an exchange is thought to be suitable as a small central office (CO) for providing public telephone service for a town, or suitable as a moderately sized private branch exchange (PBX) for providing multi-media communications for a business enterprise or an institutional establishment. The telecommunications exchange includes the switching system 500 coupled via the ATM communications links 519 to a DS0 call controller 91, ATM data mass storage and voice mail facilities 93 and peripheral and terminal telecommunications equipments 100.

Figure 26:
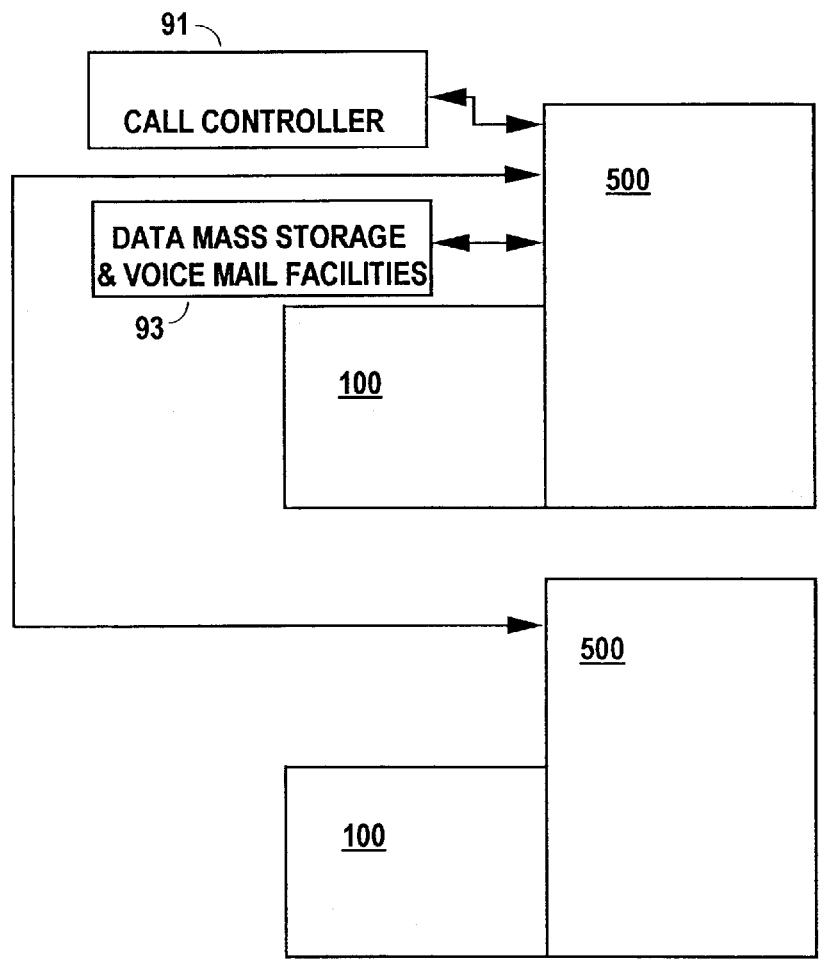
FIG. 26 is a block diagram of a combination of two of the basic switching systems illustrated in FIG. 25, having a common call controller, in accordance with the invention.

In FIG. 26 the switching facility of FIG. 25 is depicted in simplified form with the previously unused communication link 519 being connected to a second switching facility consisting of a switching system 500 and peripheral and terminal communications equipments 100. Conspicuously absent in the second switching system is that of any call controller entity, whatsoever. In this example the call controller 91 in the first switching facility is equally functional to provide the call control functions for both the illustrated switching systems 500.

Figure 27:
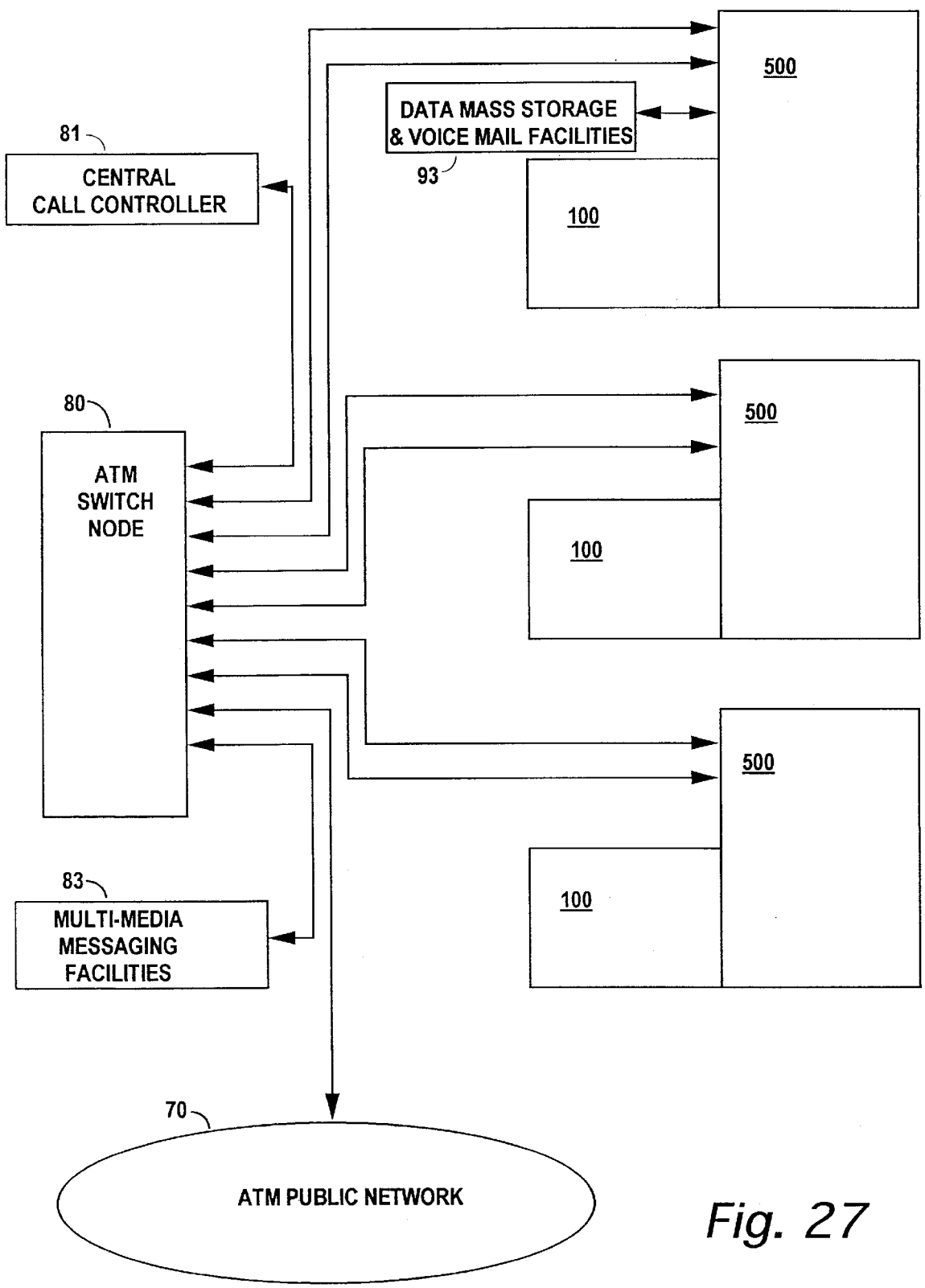
FIG. 27 is a block diagram wherein three of the basic switching systems illustrated in FIG. 25, coupled in accordance with the invention via an ATM cell switching node with one another and with a common call controller, a publicly accessible telecommunications network and multimedia messaging facilities.

In FIG. 27 three switching facilities 500, 100 are depicted, wherein neither of them is directly connected with a call controller. In this example each of the switching facilities is connected via a pair of the communication links 519 to an ATM switch node 80. The ATM switch node 80 functions to couple each of the three switching facilities with an ATM publicly accessible telecommunications network 70, multi-media messaging facilities 83, and a central call controller 81. In this example the central call controller 81 is commonly in control of the DS0 switching features in each of the three switching facilities 500, 100.

In each of the examples in the FIGS. 25, 26, and 27, the call controlling function for setting up and tearing down DS0 connections is performed through the ATM cell transport standard. In addition to advantageous already mentioned it is expected that the central or common call controller of FIG. 27 can be provided with improved reliability and capability at a lesser cost than could an aggregate plurality of the call controllers 91, on a one per switching system basis. The common call controller is not tied to any particular switch and can be assigned to function on behalf of any portion of the network switching systems 500,100.

Referring again to FIG. 25, the peripheral and terminal telecommunications equipments 100 include peripheral group units 104–107 each of which provide interfaces between various communications signals formats and the ATM signals format. For example the peripheral group unit 107 provides terminations for TDM loops 119 operating in either of the 24 channel or 32 channel formats. It is intended that analog line interface circuits 121 will be able to support the full spectrum of analog services available to telephone subscribers; however without resorting to the customary concentration. Each of up to a limit of 32 telephone lines is to be time multiplex coupled with the standard 32 channel signal format referred to as DS30. It is intended that digital line interface circuits 131 will be able to support the full spectrum of digital telephone services available to telephone subscribers and PBX users. These digital telephone services include ISDN services and the like, whether provided in accordance with the recommended ISDN standard or via any of various proprietary digital line operating formats, including those exemplified in the U.S. Pat. Nos.:

4,450,556 by Alberto Boleda et al, 4,873,682 by George F. Irwin et al, and 4,893,310 by David J. Robertson et al.

Each of 16 digital telephone lines provide 2 B channels and 1 or 2 D channels which is to be time multiplex coupled with the DS30 standard. It is intended that trunk connections with one or more other analog or TDM central offices will be provided via CO trunk interface circuits 141.

The peripheral group unit 107 includes a peripheral group controller 109, a TDM loop to ATM cell data insertion circuit and an ATM cell to TDM loop data insertion circuit 108, whereby the DS0 channels associated with each of the lines and trunks are bidirectionally coupled between a multiple of the DS30 signal formats as represented in FIG. 1 and the ATM cell format as represented in FIGS. 1a and 2. Regardless of whether or not a line is in use, octets from that line and destined for that line occur at the TDM frame rate and have a reserved timeslot position in a given SONET frame. ATM cell headers indicating this predetermined fixed relationship between each of the cells and the lines or trunks are provided by the TDM loop to ATM cell data insertion circuit. In the opposite direction, data in corresponding octet positions are distributed accordingly. The peripheral group controller 109 in the peripheral group unit 107 intercepts any telephony signalling and supervision bits from the DS30 loops 119 and inserts signalling information into asynchronous cells and destined for the call controller 91. In the opposite direction telephony signalling and supervision information received in asynchronous cells from the call controller 91, is translated into signalling and supervision bits and inserted into the appropriate channel of the destination TDM loop 119. The peripheral group controller 109 also recognizes D channel data transmissions other than telephony signalling and supervision bits. The controller 109 assembles cells from such data as it is received from individual sources, terminals or trunks, into respective asynchronous payload cells along with destination headers. Asynchronous data transmitted from any of the individual sources is similarly assembled into asynchronous payload cells. The asynchronous payload cells are transmitted via the link same link 519 as are the DS0 payload cells. In contrast to the DS0 octets the asynchronous payload octets are transmitted and received by the peripheral group controller 109 in cells exclusive to the individual source and destination. The peripheral group unit 107 will also advantageously provide typical telephony functions such as voice messaging, voice conferencing, audible progress tones, and DTMF and MF signalling tones. The others of the peripheral group units 104–106 may be similar to the peripheral group unit 107, or may be limited to collecting and distributing asynchronous payload cells, as may be exchanged with several local area networks or a host computer. On the other hand one or more of the peripheral group units 104–106 may be devoted to several wide band synchronous video applications, which may also provide value added service features in cooperation with an information storage and forward or retrieval facilities somewhat similar to facilities 93 or the facilities 83 in FIG. 27.

In this description example embodiments incorporating inventions as claimed in the appended claims have been disclosed. A reading of this disclosure will suggest various other embodiments to persons of skill in the STM and ATM telecommunications fields. Such other embodiments are within the spirit of the inventions defined in the claims.

What is claimed is:

1. A telecommunications apparatus for transporting packets having either of isochronous units of payload data and asynchronous units of payload data, between receiving and transmitting ports, comprising:

buffer means for asynchronously queuing units of payload data received from the receiving ports and for subsequently transmitting the queued units of payload data in a time division multiplex (TDM) format of a first data stream; and a timeslot interchanger for reordering a time defined sequence of isochronous units of payload data from the first data stream into a second time defined sequence of isochronous units of payload data in a second data stream of said TDM format;

means for assembling an outgoing data stream by transferring each payload occurrence of isochronous units from said TDM format in the second data stream, into the corresponding TDM location of a first data stream and for transmitting the outgoing data stream toward the transmitting ports.

2. A telecommunications apparatus as defined in claim 1 further comprising:

means for stuffing at least one data unit into each packet with an odd number of data units being received at one of the receiving ports, to generate a stuffed packet with an even number of data units; and means for removing each stuffed data unit when the stuffed packet is being received at one of said transmitting ports, to regenerate a packet with said odd number of data units.

3. A method for transporting packets having either of isochronous units of payload data and asynchronous units of payload data, between receiving ports and transmitting ports, comprising the steps of:

asynchronously queuing received packets from the receiving ports for time division multiplex (TDM) transmission toward a transmitting port of destination;

reordering a sequence the isochronous units having been queued, into a second sequence, for TDM transmission during a frame period toward a transmitting port of destination;

TDM transmitting the asynchronous units in packets and the reordered isochronous units in packets toward the transmitting ports of destination;

whereby the isochronous units of payload data are time switched during transport between the receiving ports and the transmitting ports.

4. A method as defined in claim 3 wherein the packets are in accordance with a 53 octet ATM cell standard, the method comprising the further steps of:

stuffing an octet into each ATM cell to generate a 54 octet cell prior to the step of asynchronously queuing a received packet, and removing the stuffed octet when it is received at one of said transmitting ports to regenerate a standard ATM cell.

5. A telecommunications facility for transporting data packets having headers and payloads between a plurality of input ports and a plurality of output ports, comprising;

a concentrator for receiving data packets from the plurality of input ports and for multiplexing the payloads into an incoming data stream and multiplexing the headers into an incoming header stream;

a distributor for directing outgoing headers from an outgoing header stream along with respective payloads from an output data stream to those of a plurality of output ports to which the data packets are destined;

a memory controller being responsive to information contained in the headers in the incoming header stream, for generating queue control information for relating each data packet to one of the plurality of output ports, for generating the outgoing headers in the outgoing header stream for data packets destined for any of the plurality outport ports, and for generating scheduling information;

a buffer for receiving the incoming data stream and being responsive to the queue control information for queuing the payload of each related data packet into a queue associated with the output port for which the payload is destined, and for subsequently selecting and transferring queued payload data units of each data packet into an intermediate data stream;

timeslot switching means for receiving a frame of payloads from the intermediate data stream and in response to timeslot switching information, for reordering data units from selected payloads into a switched data stream, and in response to the scheduling information from the controller for multiplexing reordered data units of a preceding frame of payloads from the switched data stream with the unselected payloads of data from the intermediate data stream into the outgoing data stream.

6. A telecommunications facility as defined in claim 5 being limited to transporting data packets of a fixed length, each consisting of a predetermined plurality of header data units followed by a predetermined plurality of payload data units, the header data units each including a source indication as to whether or not one or more of the payload data units is from a synchronous source; and wherein the memory controller is responsive to each source indication for generating the scheduling information; and wherein said timeslot switching means is limited to receiving those payloads which include at least one data unit from a synchronous source as these payloads occur throughout a frame period, in response to the scheduling information.

7. A telecommunications facility as defined in claim 6 being further limited to transporting any data packet with a payload of at least one asynchronous data unit to the exclusion of any isochronous data unit, and to transporting any data packet with a payload of at least one isochronous data unit to the exclusion of any asynchronous data unit.

8. A method for transporting data packets having headers and payloads between a plurality of input ports and a plurality of output ports, comprising the steps of;

receiving data packets from the plurality of input ports and multiplexing the payloads into an incoming data stream and multiplexing the headers into an incoming header stream;

generating queue control information for relating each received data packet to one of the plurality of output ports, in response to information contained in the headers in the incoming header stream;

selecting and queuing the payloads of data packets from incoming data stream into queues associated with the output ports for which the payloads are destined, subsequently selecting and transferring queued payload data units of each data packet into an intermediate data stream, in response to the queue control information;

in response to information contained in the headers in the incoming header stream generating an outgoing header stream of outgoing headers;

receiving a frame of payloads data units from the intermediate data stream and in response to timeslot switching information, reordering selected data units in the frame into a switched data stream;

multiplexing the unselected payloads of data from the intermediate data stream with payloads of a preceding frame from the switched data stream into an output data stream; and a distributing outgoing headers from the outgoing header stream in association with respective payloads from the output data stream to at least one port of a plurality of output ports for which the payloads are destined.

9. A method of operating a telecommunications switching facility for receiving and transmitting ATM cells having either of isochronous payload data and asynchronous payload data between a plurality of ATM ports; the method comprising the steps of:

receiving incoming headers from the plurality ATM ports in a predefined cyclic order;

serially transferring incoming payload octets of incoming ATM cells from receiving ones of the plurality of ATM ports into receive TDM timeslots exclusively preallocated to each of the ATM ports, elastically queuing cell payloads from the receive TDM timeslots and subsequently reading octets of the elastically queued cell payloads into intermediate TDM timeslots being exclusively preallocated to each of the ATM ports;

accepting the payload octets in a sequence in which said payload octets appear in the intermediate TDM timeslots, throughout a predefined periodic frame occurrence, and presenting selected ones of said octets in a reordered sequence in isochronous TDM timeslots;

multiplexing octets from either of the intermediate TDM timeslots and the isochronous TDM timeslots, into transmit TDM timeslots;

generating outgoing header octets, in response to those of the incoming headers which meet predetermined parameters, into header TDM timeslots, in synchronism with the transmit TDM timeslots;

serially transferring payload octets from the transmit TDM timeslots and header octets from the header TDM timeslots to the respective payload and header portions of an outgoing ATM cell for which the payload octets are destined;

whereby a data sample of an isochronous payload having been received in one of the payload octets of an ATM cell during one of said periodic frame occurrences is retransmitted in a selectable one of the payload octets of a full frame of octets within a following periodic frame occurrence.

10. A telecommunications switching facility for receiving and transmitting ATM cells having either of isochronous payload data and asynchronous payload data between a plurality of ATM ports; the telecommunications switching facility comprising;

a receive TDM bus for transporting payload octets from ATM cells in time division multiplexed (TDM) frame defined timeslots;

an intermediate transfer bus for transporting payload octets destined for ATM cells in TDM frame defined timeslots;

a transmit TDM bus for transporting payload octets to ATM cells in TDM frame defined timeslots;

a receive header bus for transporting header octets from ATM cells;

a transmit header bus for transporting header octets to ATM cells;

an asynchronous buffer having a plurality of FIFO queue elastic storage functions for queuing cell payloads from the receive TDM bus, and for reading octets of cell payloads from the elastic storage queuing functions onto the intermediate transfer bus;

switch means for accepting the payload octets in a sequence in which said payload octets appear on the intermediate transfer bus, throughout a predefined periodic frame occurrence, and for presenting selected ones of said octets in a reordered sequence throughout a subsequent one of the predefined periodic frame occurrences via an isochronous payload bus;

multiplexing means for passing octets from either of the intermediate transfer bus and the isochronous payload bus, into the TDM frame defined timeslots of the transmit TDM bus an access unit including;

incoming header transfer means for transferring header octets from the plurality ATM ports to the receive header bus in a predefined cyclic order, a control means being responsive to a header from the receive header bus, which meets predetermined parameters, for transmitting a header onto the transmit header bus;

outgoing header transfer means for transferring header octets from the transmit header bus to the plurality of ATM ports in a predefined cyclic order, incoming payload transfer means for serially transferring payload octets of incoming ATM cells from receiving ones of the ATM ports into receive TDM bus timeslots exclusively preallocated to each of the ATM ports, and outgoing payload transfer means for serially transferring payload octets destined for outgoing ATM cells from transmit TDM bus timeslots exclusively preallocated to each of the ATM ports;

whereby a data sample of an isochronous payload having been received in one of the payload octets of an ATM cell during one of said periodic frame occurrences is retransmittable as any one of the payload octets of a full frame of octets within a next following periodic frame occurrence.

11. A telecommunications switching facility comprising;

a memory controller;

a plurality of ports (511–519) for receiving and transmitting ATM cells having either of isochronous payload data and asynchronous payload data and;

an asynchronous buffer (560) for queuing a received ATM cell in relation to a destination one of the plurality of ports and for transmitting the queued cell at a time designated for receipt at the destined one of the ports in response to addressing and control signals from the memory controller;

switch means (520) being responsive to payload data having been transmitted from the asynchronous buffer during a frame period (125 $\mu$s), for storing the payload data in a first sequence of data storage locations; and for reproducing said stored data in second sequence, wherein one of the first sequence and the second sequence is of a fixed order and the other of the sequences is variable in order; and multiplexing means (722, 723) for passing a cell payload from either of the asynchronous buffer and a cell payload retransmitted from the storage locations in the second sequence to the destination one of the plurality of ports;

whereby a data sample having been transmitted in one of the payload octets of an ATM cell is retransmittable in any one of the payload octets of a full frame of octets within a time period of less than two frame periods from the moment of its storage to its port of destination.

12. A telecommunications switching facility as defined in claim 11 further comprising;

port access means (500) for transferring the ATM cell payload data octets between the buffer means and the ports in a time division multiplex TDM signal format, and for transferring the ATM cell payload data between the multiplexing means and the ports in a time division multiplex TDM signal format.

13. A telecommunications switching facility as defined in claim 12, wherein the port access means includes lower and upper access units, each comprising;

a plurality of pairs of incoming octet latches(601608) for transferring octets being serially receiving from a group of a corresponding plurality of the ports in octet pairs onto a corresponding plurality of buses;

a payload multiplexer (610–612, 728) for interleaving the octet pairs from the plurality of buses into a time division multiplex (TDM) format in response to a repeating sequence of a corresponding plurality of port payload selection signals;

a header multiplexer (606, 727) for interleaving the octet pairs from the plurality of buses into a time division multiplex (TDM) format in response to a repeating sequence of a corresponding plurality of port header selection signals.

14. A telecommunications switching facility as defined in claim 13, further comprising;

a sequencer (709), being responsive to occurrences of a periodic frame signal and a periodic clock signal for repetitively generating said plurality of sequences of port payload selection signals onto a corresponding plurality of payload selection leads, and for repetitively generating said plurality of sequences of port header selection signals onto a corresponding plurality of header selection leads, such that an assertion interval of any one of the port header selection signals is mutually exclusive of an assertion interval of any one of the others of the port header selection signals and mutually exclusive of payload selection signals for the same port;

whereby the lower and upper access units each transfer two payload octets from alternate pairs of the ports in alternate odd and even TDM timeslots.

15. A telecommunications switching facility as defined in claim 12, wherein the asynchronous buffer comprises:

first and second random access memories (RAM)s (741, 742), each RAM having a write port for storing octet pairs at address defined storage locations and a read port for reproducing the octet pairs from said address defined storage locations;

an ingress commutator means (FIG. 13) for presenting the octets, from 108 timeslots in a port of origin sequence repeated during each of 54 subframes per frame period, to the write ports; and an egress commutator means (FIG. 15) for transferring octets, having been reproduced at either of the read ports, onto a predetermined part of an intermediate TDM bus (547) in odd ones and even ones of said time slots.

16. A telecommunications switching facility as defined in claim 11, wherein the memory controller comprises:

write means being responsive to clock and frame signals for generating write memory pointers; and read means being responsive to switching information as well as said clock and frame signals for generating read memory pointers, the telecommunications switching facility further comprising;

a first connection memory for storing first timeslot switching instructions at address defined storage locations, and for reproducing the first timeslot switching instructions from said address storage locations;

a second connection memory for storing second timeslot switching instructions at address defined storage locations, for reproducing the second timeslot switching instructions from said address storage locations;

first and second data memories each having identical address defined storage locations for storing pairs of octets;

an ingress means being responsive to an occurrence of the frame signal and a sequence of the write memory pointers for depositing a frame of octets of said payload data identically in a one half of said identical address defined storage locations in the first and second data memories;

an egress means being responsive to an occurrence of the frame signal and to each read memory pointer for causing a corresponding series of the first timeslot connection addresses to be reproduced by the first connection memory and a corresponding series of the second timeslot connection addresses to be reproduced by the second connection memory;

means for coupling the first and second timeslot addresses to the first and second data memories respectively, whereby first and second frames of octet pairs of reordered first and second sequences are reproduced by the first and second data memories; and means responsive to a portion of each of the first and second timeslot connection addresses for selectively passing one octet of each of said octet pairs to provide said stored data to said multiplexing means.

17. A telecommunications apparatus as defined in claim 1 wherein said packets are in accordance with a 53 octet ATM cell standard, wherein each ATM cell includes a cell header and either of isochronous units of cell payload data and asynchronous units of cell payload data, the telecommunications apparatus further comprising;

a controller means being responsive to information contained in a cell header for simultaneously issuing an egress buffer address pointer and an egress timeslot interchanger address pointer, for causing the buffer means to transmit a queued isochronous payload data, corresponding to said cell header, in the first data stream and for causing the timeslot interchanger to provide a corresponding cell payload of isochronous reordered data in the second data stream;

whereby the assembling means is provided with a cell payload in the second data stream, at an appropriate time for transmission in the outgoing data stream while at the same time the timeslot interchanger is provided with a cell payload from the first data stream.

18. A telecommunications apparatus as defined in claim 11 wherein the memory controller comprises;

means being responsive to information contained in a cell header for simultaneously issuing an egress buffer address pointer and an egress switch address pointer, for causing the asynchronous buffer to transmit a queued isochronous payload data for a cell corresponding to said cell header, and at the same time for causing the timeslot interchanger to provide a corresponding cell payload of isochronous reordered data in said second sequence.

19. A telecommunications apparatus as defined in claim 16 wherein the read means in the memory controller comprises;

means being responsive to information contained in a cell header for simultaneously issuing an egress buffer address pointer and an egress switch address pointer, for causing the asynchronous buffer to transmit a queued isochronous payload data for a cell corresponding to said cell header, and at the same time for causing the timeslot interchanger to provide a corresponding cell payload of isochronous reordered data in said second sequence.

20. A switching system for accommodating both asynchronous and isochronous telecommunications traffic comprising;

means for receiving ATM cells from ports of origin and organizing the payloads of the ATM cells into frames of timeslots in a time division multiplex (TDM) transmission medium;

means for reorganizing ATM cells from the TDM transmission medium and distributing the ATM cells to ports of destination; and a timeslot switching apparatus including;
means for collecting frames of payloads, having datas of isochronous origins, from the time division multiplex (TDM) transmission medium,
means for reordering the datas of a collected frame of payloads to produce reordered payloads, and
means for substituting the reordered payloads for the corresponding payloads in the next frame of payloads in the transmission medium;

whereby a delay introduced by the switching system into the transmission of a telephone conversation is of a duration of less than two frame periods.

21. An ATM switching facility comprising:

a switching system having a plurality of ATM ports and a time switch means for providing voice band connections between telephony lines and trunks for servicing telephony terminal apparatus and interoffice telecommunications;

at least one peripheral group unit for interfacing any of the telephony lines and trunks with one of the ATM ports and for generating and for receiving signalling and supervision information on behalf of said any of the telephone lines and trunks; and a call controller being coupled to the switching system via one of said ATM ports and being responsive to receiving signalling and supervision information via said one ATM port for transmitting timeslot switching information via said one ATM port for controlling the time switch means to set up and tear down telephone calls between any of said lines and trunks.

22. An ATM switching network comprising:

a first switching system having a plurality of ATM ports and a time switch means for providing voice band connections between first telephony lines and trunks for servicing telephony terminal apparatus and interoffice telecommunications;

at least one peripheral group unit for interfacing any of the telephony lines and trunks with one of the ATM ports of the first switching system and for generating and for receiving signalling and supervision information on behalf of said any of the first telephone lines and trunks;

a second switching system having a plurality of ATM ports and a time switch means for providing voice band connections between second telephony lines and trunks for servicing telephony terminal apparatus and interoffice telecommunications;

at least one peripheral group unit for interfacing any of the telephony lines and trunks with one of the ATM ports of the second switching system and for generating and for receiving signalling and supervision information on behalf of said any of the second telephone lines and trunks;

an ATM trunk being connected between ATM ports of the respective first and second switching systems for coupling ATM cells therebetween including ATM cells with signalling and supervision information; and a call controller being coupled to one of the first and second switching systems via a respective one of said ATM ports and being responsive to receiving signalling and supervision information via said one ATM port for transmitting timeslot switching information via said one ATM port for controlling the time switch means respectively of the first and second switch means to set up and tear down telephone calls between any of said lines and trunks;

whereby the control functions of a call controller are shared between a plurality of the switching systems in the ATM switching network without physical geographical constraint.

23. An ATM switching network as defined in claim 22 comprising:

an ATM switch node, at least one ATM trunk coupling each of the switching systems with the ATM switch node and wherein the call controller is a central call controller being coupled with the time switch means via the ATM node.

* * * * *